(12) United States Patent  
Zhu

(10) Patent No.: US 7,806,796 B2
(45) Date of Patent: Oct. 5, 2010

(54) POWER SET FOR VEHICLES

(76) Inventor: Raphael Zhu, Ste 702 Power Creative Building #E, Beijing (CN)

( * ) Notice: Subject to any disclaimer, the term of this patent is extended or adjusted under 35 U.S.C. 154(b) by 95 days.

(21) Appl. No.: 12/231,795

(22) Filed: Sep. 5, 2008

(65) Prior Publication Data

US 2009/0055061 A1    Feb. 26, 2009

Related U.S. Application Data

(63) Continuation of application No. PCT/CN2007/000821, filed on Mar. 14, 2006.

(51) Int. Cl.
*F16H 47/04* (2006.01)
(52) U.S. Cl. .......................................... 475/73; 475/78
(58) Field of Classification Search ................ 475/72, 475/73, 76, 78
See application file for complete search history.

(56) References Cited

U.S. PATENT DOCUMENTS 4,313,351 A * 2/1982 Hagin ........................ 475/80

* cited by examiner

*Primary Examiner*—Sherry L Estremsky
*Assistant Examiner*—Edwin A. Young
(74) *Attorney, Agent, or Firm*—Clement Cheng

(57) ABSTRACT

A power device for motor vehicles installed on a motor vehicle with an internal combustion engine is composed of a first variable displacement hydraulic activator (107), a second variable displacement hydraulic activator (108), a planetary gear mechanism (103) and a mechanical transmission (104). The power device further includes a hydraulic control device (109) and an electronic control device (112) which are used to control the first and second variable displacement hydraulic activators. The control device may carry out the following controls, that is, during the period when the engine outputs power, part of mechanical energy is converted into electric energy via the motor to be stored in the chargeable cell when the power requirement from the motor vehicle increases.

9 Claims, 17 Drawing Sheets

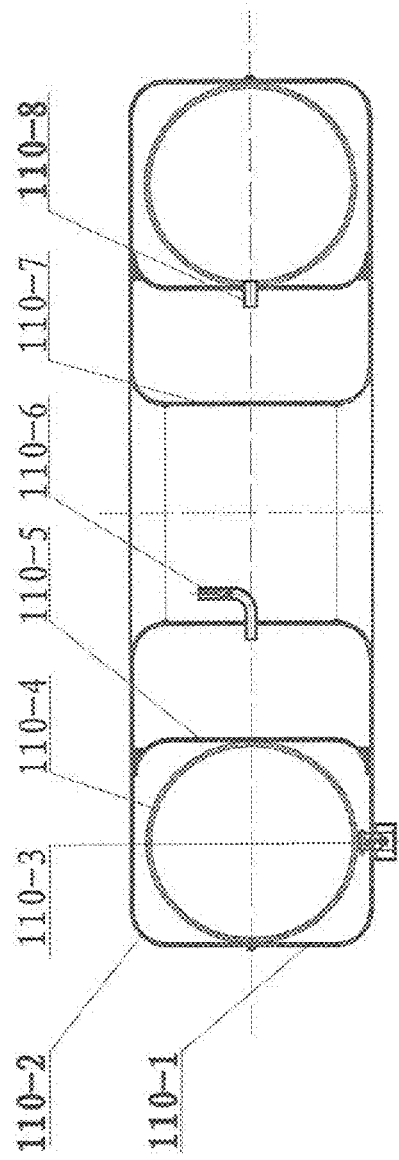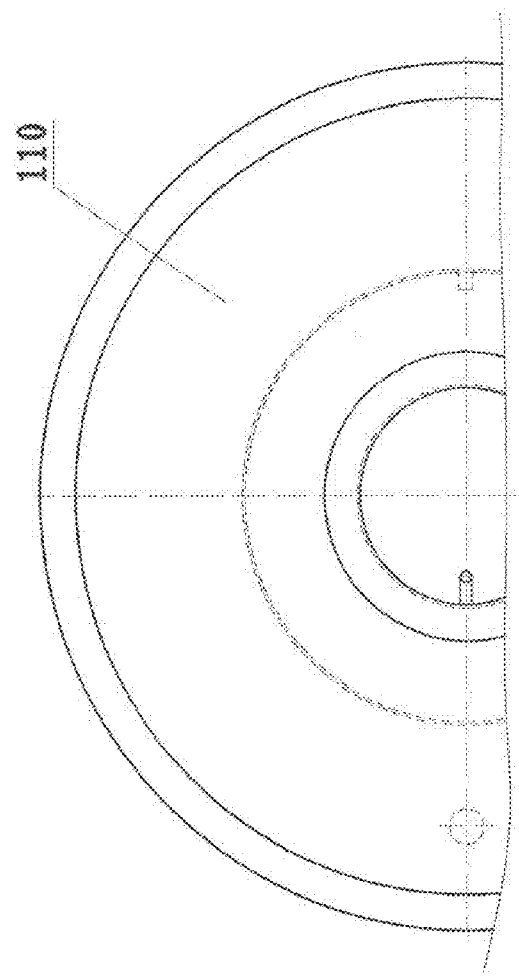

POWER SET FOR VEHICLES

This application is a continuation of and claims priority from and also hereby expressly incorporates by reference in its entirety, PCT application PCT/CN 2007/000821 POWER SET FOR VEHICLES published Sep. 27, 2007 with publication number WO 2007/107085 which in turn claims priority from Chinese application POWER SET FOR VEHICLES filed Mar. 14, 2006 having Chinese application number 20060057549.X both to same inventor ZHU, Raphael, the pair of applications of which are expressly incorporated herein by reference in their entirety.

FIELD

The present invention relates to a device used by motor vehicles for power transmission, transition, storage and usage, particularly to a mechanically, hydraulically and electrically integrated power device for motor vehicles which can realize continuously variable transmission and various power hybrid and circulatory driving.

BACKGROUND

According to incomplete statistics, there are more than 0.8 billion motor vehicles around the world, all of which consume more than 1 billion tons of petroleum per year. Furthermore, these figures are increasing with year. The exhaust greenhouse gas $CO_2$ and various poisonous substances bring about increasingly serious environmental pollution and damage. On the other hand, petroleum resources all over the world can only last for the next few decades. Thus, intensive attention has been paid to energy saving automobiles to address the problems of pollution and energy shortage due to automobile booms.

According to statistics from DOE of United States, only 15% of the energy of the gasoline in an automobile tank is used to drive the automobile to travel or to power other useful accessories such as an air conditioner. The remainder energy is wasted. Part of the load and energy consumption of an automobile is to overcome the rolling friction between the tires and the ground, which is proportional to the overall weight of the automobile and the rolling friction coefficient, with the consequential required power slightly increasing with increases in automobile velocity. Another part of it is to overcome the wind drag due to the movement of the automobile, which is proportional to the square of the velocity, with the consequential required power being proportional to the cube of the velocity. A third part of it is used to start, accelerate and climb so as to provide power necessary to increase its kinetic or potential energy. This portion of kinetic or potential energy is transited into friction heat in braking processes. In city road conditions, the energy consumption at low velocities and low loads and at standby accounts for 17.2%, the energy consumed by the generator and the compressor of the air conditioner accounts for 2.2%, the loss in transmission accounts for 5.6%, braking consumption accounts for 5.8% and loss due to rolling friction and aerodynamic drag accounts for 6.8%. Only 12.6% of heat energy in gasoline is consumed during traveling. If the energy consumption at low velocities and low load, at standby, and at braking, which totally accounts for 23%, is reduced by one half, then 50% energy could be saved. Therefore, there is a great potential to save energy through advanced techniques.

The predominant power device of motor vehicles is an internal combustion engine, especially, a gasoline engine, whose dynamic characteristics presents a rotation speed of 600-6000 rpm, a substantially constant (slightly convex) torque profile vs. rotation speed, and an approximately linear proportional torque profile vs. throttle open degree. Universal characteristics of an internal combustion engine demonstrate that it presents a high efficiency only when the rotation speed and load is in a certain range, and that its efficiency may be significantly decreased in case of low rotation speed and low load. Moreover, characteristics of a gasoline engine and those of a diesel engine are slightly different, e.g., the higher efficiency ranger for a diesel engine is relatively broader. In rating conditions, the average effective efficiency of the engine itself is only 37.6% (218 g/kwh). In city traffic conditions, most working periods of the engine are in low load state, e.g., in a state that the load is about 10-30% of the rating load and the average efficiency of the engine is only 16-18% (480 g/kwh).

Approaches for saving energy and decreasing emissions mainly include improving the heat efficiency of the engine itself (such as the technique of a diesel engine with a high compression ratio), decreasing the power consumption due to drag (for example, lowering the vehicle weight, decreasing the wind drag and the rolling drag), employing new power and new energy (such as electricity, hydrogen fuel cells and methanol), improving the energy efficiency of the whole vehicle through changing the transmission manner (such as taking use of transmissions of higher efficiency, adopting continuously variable transmission, employing hybrid power, and regenerating braking energy). However, no excellent energy-saving approaches have been developed for hundreds of million vehicles that have been put into use nowadays.

The present invention fulfills the purposes of saving energy and decreasing emissions mainly through improving the energy efficiency of the whole vehicle, which is realized by changing the transmission manner, and through employing electric technologies.

In an automobile power system, a transmission plays a role only second to that of the engine. According to their operating and transmission manners, automobile transmissions may be classified into two categories, that is, manual/automatic stepped transmissions and continuously variable transmissions. A manual stepped transmission itself is of a higher efficiency. However, it is difficult to optimize its cooperation with the internal combustion engine, leading to a low overall efficiency; and frequent shifting is a labor-intensive burden. An automated mechanical transmission (AMT), which may be employed to replace manual manipulations, imposes a higher requirement on intelligentized control of the system. Even an automatic transmission (AT), which is composed by a hydraulic torque converter and a planetary gear train, may increase the engine efficiency, its efficiency is relatively low, its control system is complicate, and its manufacture is difficult. A continuously variable transmission is an ideal transmission that is pursued for a long time. In some continuously variable transmissions, such as those of a chain or steel belt type, continuously variable transmission is realized via friction force, such that the efficiency is greatly increased. However, their ranges of speed shifting and torque converting are limited due to the limitations on material properties and minimal curvature of steel belts, thus they still need to function in cooperation with hydraulic torque converters or starting clutches. In some of them, a hydraulic variable displacement pump/motor is employed to constitute a fully hydraulic continuously variable transmission system, whereas the overall efficiency of the system is less than 80% even if an individual pump or motor has efficiency up to 90%. As an improvement, U.S. Pat. No. 6,145,409 (entitled by Hybrid Gearbox), Komatsu Ltd. in Japan and some universities in China propose to carry out multiple step continuously variable transmission in a mechanical-hydraulic power split manner, that is, they propose a power split transmission solution which combines hydraulic continuously variable shifting and mechanical transmission. Even though this approach achieves an excellent energy-saving effect, it can only be applied to coaches, school buses, tractors, and mobile machinery shops for special purposes due to its large volume and high weight.

There are three challenges associated with currently widely-used motor vehicles which employ internal combustion engines for power, that is, the low efficiency (no matter what transmissions are employed) in low load conditions (such as the conditions of uniform motions at low velocities), kinetic energy regeneration during braking and the contradiction between the system dynamics and economy, which inspire a hybrid mechanical-electrical power mode and a hybrid mechanical-hydraulic power mode.

Hybrid mechanical-electrical driving systems can be classified into three categories according to the cooperation manner of the mechanical system and the electrical system, that is, a serial mode, a parallel mode and a hybrid mode. According to the relative extent of electrical power, the systems may be classified into strong hybrid ones and weak hybrid ones. In weak hybrid systems, the released electrical power is only used to control the starting and shutdown of the engine and to aid in accelerating, thus the energy-saving effect is limited. By contrast, strong hybrid systems may independently drive vehicles to travel via electrical power. For general cars in urban traffic conditions, this brings about a fuel consumption of 3.5-5.5 L per one hundred kilometers (decreased by 30-50%) and a 90% reduction in emission. Electrical power is mainly used in low speed and low load conditions, and the engine is started once beyond a certain velocity. Since it makes use of a motor characteristic that the torque is relatively large in low speed conditions so as to directly drive the automobile to start and to accelerate, the driving current is large and the efficiency is low at this time. Its energy transfer chain of the electrical power is very long, that is, from engine to generator, to convertor, then charging and discharging the cell pile, then to convertor, to motor, and finally to automobile, thus the efficiency of utilizing electrical power can only amount to 70%. In high speed conditions, the motor must participate in operation, leading to a decreased overall efficiency in such conditions. During automobile braking, in order for kinetic energy to be efficiently regenerated, motors of large power and the cell pile capable of being repeatedly charged and discharged with large currents should be employed, thus resulting in a very high cost.

Besides the hybrid mechanical-electrical mode, a hybrid mechanical-hydraulic driving method is also applicable. Since the loss of the hydraulic energy storage is low, its power density is large, the regeneration rate of a hydraulic system is higher than that of an electrical system, hydraulic techniques are fully developed, and at the same time hydraulic systems have long service life and low cost, researchers in Europe and Japan conducted numerous experiments to explore this technique in 1970s during which period a global energy crisis prevailed. However, the developments were below expectations due to the limitations from the state of arts at that time. Nevertheless, some researchers in American have been keeping researching since then. Hybrid mechanical-hydraulic systems can also be classified into a serial mode and a parallel mode. In the serial mode, such as Hydraulic Launch Assist (HLA) which has been tested by U.S. Environmental Protection Agency, FORD and EATON, a hydraulic pump is serially provided in the original transmission system to regenerate kinetic energy during braking, which is to be released during restarting of automobiles. It is reported that this may regenerate 60% kinetic energy during braking, the energy consumption in urban traffic conditions is reduced by 25-35%, and emission is decreased by 50%. Similar systems are also disclosed in CN patent 200420040920.8, entitled by "hydraulic hybrid power transmission device of a serial mode for buses". However, energy-saving effect of serial systems in high velocity conditions is not significant. In a parallel mode, for example, as disclosed in U.S. Pat. No. 6,719,080 (entitled by "Hydraulic Hybrid Vehicle") and CN patent 01803550 (entitled by "Vehicles Driven in a Hydraulic Hybrid Mode"), both granted to U.S. Environmental Protection Agency, and CN patent 200420040925.0 (entitled by "Hydraulic Hybrid Power Transmission Device of a Serial Mode for Bus"), there are provided at least two hydraulic pump/motor and two storages of higher and lower pressure. In this mode, shifting and transmission are performed completely via hydraulic means. Even though the efficiency of the engine is greatly improved, the efficiency of hydraulic transmission is low, which counteracts part of energy-saving effect. As improvements to these systems, U.S. Pat. Nos. 4,441,573, 5,088,041 and 5,495,912 proposed various mechanical-hydraulic hybrid driving mechanisms and a variety of energy management methods, such as a dual-engine mode and a multi-stage pressure mode, etc. Among others, a more advanced technique is a dual-mode mechanical-hydraulic hybrid driving mode, that is, continuously variable transmission is performed completely via hydraulic means in low velocity conditions, and purely mechanical transmission is employed in high velocity conditions, with switching therebetween being carried out by two clutches. This approach may improve the energy-saving effect, nevertheless to a limited extent in that the efficiency of hydraulic transmission is low in low velocity conditions and the contradiction between system dynamics and economy remains unsettled due to purely mechanical transmission in high velocity conditions. In China, School of Mechanical and Vehicular Engineering, Beijing Institute of Technology conducted numerous theoretical researches and explorations on hybrid power and continuously variable transmission via a mechanical-hydraulic split power manner, and achieved some simulation results.

In summary, the three key challenges confronting energy-saving could not be solved through employing a pure automobile transmission, whatever it is a manual transmission, an automatic transmission or a continuously variable transmission. In a mechanical-electrical hybrid driving manner, even though the energy-saving effect is significantly improved, the cell property and system cost become key restrictions to its development. There are many problems to be solved, such as realizing quick charging and discharging cells, improving the energy storage efficiency and extending the service life of cells; in addition, the driving system is complicated, and required mechanical-electrical switching control systems, cell piles and high capacity motors are of high costs; furthermore, it is impractical to retrofit about 0.8 billion vehicles, which are in use throughout the world, in this manner for the purpose of saving energy. The prior art mechanical-hydraulic hybrid driving mode still bears the disadvantages of low specific energy and low transmission efficiency of hydraulic systems. Therefore, the accordingly designed structures are complicated, heavy and bulky, and thus can only be applied to large-scale vehicles that frequently travel in urban areas, for example, such buses, mail cars and garbage trucks, etc. The overall energy-saving effect of the system is not as significant as expected. International automobile industry is currently unanimously optimistic about plug-in mechanical-electric hybrid automobiles in that this solution may enhance energy-saving effect, lower emission and conserve environment. However, a challenge is how to reduce its cost. The object of the present invention is to solve all these problems.

SUMMARY

The objects to be realized by the invention are

1. When the automobile is in a low velocity state, such as in a city work condition or in a traffic condition on a high way, the engine may operate at low fuel consumption and with low emission;

2. The engine may automatically shut down when the automobile stops and automatically start when required, so as to reduce the fuel consumption in idle state.

3. When the automobile travels at a low velocity and a small load, the electric energy introduced via a plug-in power supply may be employed to assist in traveling.

4. The engine may operate at a high efficiency when the automobile travels within a median and high velocity range, such that the contradiction between automobile dynamics and economy is alleviated.

5. The braking kinetic energy may be regenerated and recycled efficiently.

6. The transmission system is of high efficiency in various operation conditions.

7. The system is small and light such that installation and maintenance thereof are facilitated, may be applied and mounted in various automobiles, in particular, in cars which can only afford limited spaces, and also may be employed to retrofit the prior art automobiles for the purpose of energy-saving.

8. The system is cost economic and has a long service life and a high reliability.

The technical solutions employed in the invention to achieve the above object are as follows. In an automobile with an internal combustion engine, two variable displacement hydraulic activators, a planetary gear train and a transmission gear set are employed as main components to constitute a stepped CVT (continuously variable transmission) system in which the hydraulic system and the mechanical system are separated. The system is equipped with a hydraulic energy storage and a cell pile as an energy-storing device, and an electrical motor/generator as an assisting power device. The cooperative integration of mechanical, hydraulic and electrical techniques and organized combination of two functions of continuously variable transmission and hybrid power driving are realized by means of an energy management system. In detail, the invention provides, A power device for motor vehicles, comprising a planetary gear mechanism, which has an input, an output and a control terminal, wherein the input is connected to the output of the engine, the output is connected to the power output shaft of the power device for motor vehicles via a mechanical transmission mechanism;

a first variable displacement hydraulic activator, which is connected to the control terminal of the planetary gear mechanism and is connected to the oil tank via hydraulic lines;

a second variable displacement hydraulic activator, the rotation shaft of which is connected to the power output shaft of the power device for motor vehicles, and which performs power input or output via the power output shaft and is connected to the first variable displacement hydraulic activator and the oil tank via hydraulic lines, respectively;

an electronic control device, which collects operation parameters of the automobile and control parameters over the automobile, and output control signals according to these parameters; the first and second variable displacement hydraulic activators carries out variable displacement adjustments in response to the control signals from the electronic control device;

a hydraulic control device, which is arranged on the hydraulic lines and controls the operating states of the first and second variable displacement hydraulic activators in response to the control signals from the electronic control device.

In the invention, as an alternative example of the planetary gear mechanism, the planetary gear mechanism is a single row NGW or NW planetary gear mechanism; the single row planetary gear mechanism consists of a sun gear, a planet gear and planet bracket, and a toothed ring, wherein the sun gear is the control terminal, the planet bracket and the toothed ring are respectively the output or the input; between any two of the input, output and control terminal is at least provided with one first clutch; the first clutch carries out clutching actions in response to the control signals from the electronic control device so as to regulate the planetary gear mechanism to switch between different transmission ratios.

In the invention, as another alternative example of the planetary gear mechanism, the planetary gear mechanism is a serial two or more row planetary gear mechanism; between any two of the input, output and control terminal of each row planetary gear mechanism is provided with a first clutching device; and the serial two or more row planetary gear mechanism is provided with at least two control terminals, one of which is connected to the first variable displacement hydraulic activator, and the other of which is connected to the casing of the power device for motor vehicles via a second clutching device; the first and second clutching device carry out clutching actions in response to the control signals from the electronic control device so as to regulate the planetary gear mechanism to switch between different transmission ratios.

In the invention, the mechanical transmission consists of a parallel two or more stage shifting gear pair; between the two or more stage shifting gear pair and the output of the planetary gear mechanism is respectively provided with an overrunning clutch; and between the parallel two or more stage shifting gear pair is respectively provided with a second clutching device; the overrunning clutch and the second clutching device adjust the transmission ratios of the mechanical transmission mechanism, respectively. The overrunning clutch is a wedge-like overrunning clutch. The second clutching device is a tooth embedded electromagnetic clutch or a tooth embedded manual clutch, wherein the tooth embedded electromagnetic clutch carries out clutching actions in response to the control signals from the electronic control device.

In the invention, as an alternative, the first variable displacement hydraulic activator is a variable displacement pump, and the second variable displacement hydraulic activator is a hydraulic variable displacement motor. As another alternative, the first variable displacement hydraulic activator is a duplex bidirectional variable displacement hydraulic pump/motor, and the second variable displacement hydraulic activator is a duplex bidirectional variable displacement hydraulic pump/motor.

In the invention, the hydraulic control device consists of a first electromagnetic directional valve connected to the high pressure oil port of the first variable displacement hydraulic activator and a second electromagnetic directional valve connected to the high pressure oil port of the second variable displacement hydraulic activator; the first electromagnetic directional valve communicates the high pressure oil port of the first variable displacement hydraulic activator with the hydraulic lines which are directly connected to the oil tank or with the hydraulic lines which is connected to the second electromagnetic directional valve in response to the control signals from the electronic control device; the second electromagnetic directional valve communicates the high pressure oil port of the second variable displacement hydraulic activator with the hydraulic lines which are directly connected to the oil tank or with the hydraulic lines which is connected to the second electromagnetic directional valve in response to the control signals from the electronic control device.

The hydraulic lines between the first and second electromagnetic directional valves are connected to the oil tank via a relief valve.

In the invention, the high pressure oil port of the first variable displacement hydraulic activator and the high pressure oil port of the second variable displacement hydraulic activator are respectively connected to the oil tank via check valves so as to form a hydraulic line of supplying oil.

In the invention, the low pressure oil port of the first variable displacement hydraulic activator and the low pressure oil port of the second variable displacement hydraulic activator are connected via the hydraulic lines and are connected to the oil tank.

In the invention, a heat sink is provided in the hydraulic line between the low pressure oil port of the first variable displacement hydraulic activator and the low pressure oil port of the second variable displacement hydraulic activator.

In the invention, the oil relief ports of the first and second variable displacement hydraulic activators are each connected to the oil tank via a filter.

In the invention, a hydraulic energy storage is provided in the hydraulic lines between the first variable displacement hydraulic activator and the second variable displacement hydraulic activator; when the first variable displacement hydraulic activator and/or the second variable displacement hydraulic activator convert/converts mechanical energy into hydraulic energy, the hydraulic energy storage stores hydraulic energy output from the first variable displacement hydraulic activator and/or the second variable displacement hydraulic activator; when the first variable displacement hydraulic activator and/or the second variable displacement hydraulic activator convert/converts hydraulic energy into mechanical power, the hydraulic energy storage outputs hydraulic energy out of the first variable displacement hydraulic activator and/ or the second variable displacement hydraulic activator.

In the invention, the hydraulic energy storage is connected to the electromagnetic directional valve via a control valve which switches between unilateral connection and direct connection in response to the control signals from the electronic control device.

In the invention, the hydraulic energy storage is a split energy storage, which consists of two pressure vessels with the gas ways thereof being communicated; one of the two pressure vessel is provided with an airbag therein.

In the invention, a stop valve that controls whether the hydraulic energy storage communicates the first and second electromagnetic directional valves is provided in the hydraulic lines between the first and second electromagnetic directional valves; the stop valve carries out connection and disconnection actions in response to the control signals from the electronic control device.

In the invention, the power device for motor vehicles further comprises a hydraulic direction-changing assisting system, the high pressure oil input of which is connected to the hydraulic energy storage.

In the invention, the power device for motor vehicles further comprises a hydraulically driven air conditioner compressor, the high pressure oil input of which is connected to the hydraulic energy storage.

In the invention, the power device for motor vehicles further comprises a hydraulic braking assisting system, the high pressure oil input of which is connected to the hydraulic energy storage.

In the invention, the electronic control device has a universal characteristic profile of the engine stored therein, and includes a position sensor which collects the position parameter of the ignition switch of the automobile, a position sensor which collects the position parameter of the accelerator, a position sensor which collects the position parameter of the mechanical braking pedal, an automobile velocity sensor which collects the parameter of the automobile velocity and the engine rotation speed sensor which collect the parameter of the engine rotation speed.

In the invention, the electronically controlled sensors further includes displacement sensors which collect the displacement parameters of the first and second variable displacement hydraulic activators, respectively.

In the invention, the electronically controlled sensors further include a pressure sensor which collects the parameter of the pressure of lubricant.

In the invention, the power device for motor vehicles further includes a hydraulic braking assisting pedal, the position parameter of which is input into the electronic control device via the position sensor.

In the invention, the electronic control device further includes a temperature sensor which collects the temperature of the cooling water in the engine.

In the invention, the power device for motor vehicles further includes a motor which is connected to the power output shaft of the power device for motor vehicles, and a motor controller; the motor is supplied with electricity via a chargeable cell; the chargeable cell is connected to an onboard cell manager; and the motor controller and the onboard cell manager control the motor and the chargeable cell, respectively, in response to the control signals from the electronic control device.

In the invention, the chargeable cell is connected to a plug-in power supply via an onboard smart charger.

In the invention, the plug-in power supply is a power supply in a parking lot with functions of electricity metering and toll tallying.

In the invention, the electronic control device may carry out the following controls, that is, the electronic control device controls the hydraulic control device such that the lines between the first and second variable displacement hydraulic activators communicates, and regulates the displacement adjustments of the first and second variable displacement hydraulic activators such that the first variable displacement hydraulic activator outputs pressurized oil and the rotation shaft of the second variable displacement hydraulic activator is driven to rotate, in this way, the power output of the power output shaft which is connected to the rotation shaft amounts to the sum of the driving torque of the planetary gear driving mechanism and the torque output from the second variable displacement hydraulic activator so as to drive the automobile to travel with torque variation and speed adjustment.

In the invention, the electronic control device may carry out the following controls, that is, when the automobile is started and accelerated and the accelerator is stepped on, the electronic control device controls the first electromagnetic directional valve and the second electromagnetic directional valve to communicate the hydraulic lines of the first and second hydraulic activators, and cooperatively adjusts the accelerator of the automobile and the engine throttle; the electronic control device obtains the value of the engine output torque from the universal characteristic profile of the engine according to the opening degree of the throttle and the rotation speed of the engine, calculates the torque of the sun gear according to the torque relationship equations for the planetary gear train, calculates the displacement value of the first hydraulic activator under the rating pressure; the electronic control device outputs signals to control the variable displacement mechanism of the first hydraulic activator, and the first variable displacement hydraulic activator outputs pressurized oil accordingly, the rotation shaft of the second variable displacement hydraulic activator is driven to rotate and output torque, the output of the rotation shaft amounts to the sum of the driving torque of the planetary gear train and the torque output from the hydraulic motor; the automobile is accelerated, and the displacement of the second hydraulic motor is automatically controlled by the pressure at the high pressure oil port, that is, its displacement increases if the pressure increases and decreases if the pressure decreases, and when the pressure is 0, the displacement is 0.

In the invention, when the automobile velocity reaches a predetermined value, the control device performs the following controls, that is, the second electromagnetic directional valve is controlled such that the second variable displacement hydraulic activator is directly connected to the oil tank and thus the connection to the first variable displacement hydraulic activator is disconnected, in this way, the first variable displacement hydraulic activator is braked, and the control terminal of the planetary gear mechanism is locked and the planetary gear mechanism performs transmission at a fixed speed ratio; or the control device controls the clutching device in the planetary gear mechanism such that the planetary gear mechanism performs transmission as a rigid body.

In the invention, when the automobile velocity reaches a predetermined value, the control device controls the second clutching device of the two or more stage shifting gear of the mechanical transmission mechanism to carry out clutching actions so as to switch speed ratios.

In the invention, the control device may carry out the following controls, that is, when the load of the motor vehicle is relatively low, part of the mechanical power output from the planetary gear mechanism is transferred to the power output shaft via the mechanical transmission device to drive the motor vehicle to travel, another part controls the first variable displacement hydraulic activator and/or the second variable displacement hydraulic activator so as to convert mechanical energy into hydraulic energy to be stored in the hydraulic energy storage; when the power requirement from the motor vehicles increases, the hydraulic control device controls the first variable displacement hydraulic activator and/or the second variable displacement hydraulic activator so as to convert hydraulic energy stored in the hydraulic energy storage into mechanical energy, in this way to assist the engine to drive the motor vehicle to travel; alternatively, when the hydraulic energy stored in the hydraulic energy storage hits a predetermined upper limit value, the power output from the engine is interrupted, and the first variable displacement hydraulic activator and/or the second variable displacement hydraulic activator are/is directly controlled by the hydraulic control device so as to convert hydraulic energy into mechanical energy, in this way to drive the motor vehicle to travel; when hydraulic energy stored in the hydraulic energy storage could not meet power requirements, the power output from the engine is resumed, and a next conversion cycle between hydraulic energy and mechanical energy is started.

In the invention, the control device may carry out the following controls, that is, during the period when the engine outputs power, part of mechanical energy is converted into electric energy via the motor to be stored in the chargeable cell; when the power requirement from the motor vehicle increases, the motor is controlled via the motor controller to convert electric energy into mechanical power, in this way to assist the engine to drive the motor vehicle to travel; or alternatively, during the period when the engine stops outputting power, the motor is controlled to output mechanical power to drive the motor vehicle to travel.

From the kinetic point of view, the main principle for speed variations and torque adjustments in the above power device for motor vehicles of the invention is, on the one hand, to make use of the differential transmission function of the planetary gear train to perform speed variation through the variable displacement hydraulic mechanism controlling the planetary gear train, and, on the other hand, to use the continuous shifting characteristic that the hydraulic transmission presents by itself to carry out speed variations. From the point of view of energy stream, the principle is to decompose the input energy via the planetary gear train in such a way that part of it is transferred to the output via the planetary gear train itself, and another part, which is directed to the CVT, may either be directly synthesized at the output (that is, the speed shifting transmission is realized in a split way), or be temporarily stored by the energy storage and released when necessary (that is, hybrid power driving is realized). However, since the proportional relationship between the torques of the sun gear, the planet bracket and the toothed ring is fixed, the torque is fixed even though the speed is variable. Thus, it is necessary to provide a corresponding torque variator to match it, in order to meet the intricate requirements due to the load variations of the automobile. In conventional approaches to realize this, a hydraulic torque variator is employed and the transmission pathway is changed. In the invention, the mechanism of speed shifting and torque variation of the variable displacement hydraulic pump-variable displacement motor is employed to cooperate with the planetary gear train. The torque ratio of the variable displacement hydraulic pump-variable displacement motor is equal to the ratio of their displacements, which can be adjusted within a large interval from 0 to infinity theoretically, and its maximal output torque depends on the maximal allowable torque of the hydraulic motor.

The expressions "connection" and "fixed connection" and the variations thereof as used in this description refer to a coaxial and synchronous connection in which two connected components could not move relative to each other (such as connection via couplings and connection formed by flat keys or splines and collars), or an abaxial transmission connection with a fixed rotation speed ratio (such as transmission connection via gears, belt wheels or sprocket wheels). The expressions "circumferentially fixed connection" and variations thereof refer to a coaxial and synchronous connection in which two connected components could not carry out relative angular displacements therebetween, or an abaxial transmission connection with a fixed rotation speed ratio; nevertheless the axial sliding therebetween is allowable, for example, such as a connection via a sliding track or spline.

The operating mode and characteristics of the inventive device are as follows.

1) When the automobile travels in low velocity ranges, the circulatory operating mode, that is, the engine being started, operating at high efficiency, then shutting down or assuming an idle state, then employing hydraulic or electrical driving, and the engine being restated, is employed, such that the engine operates at a high efficiency. Since the stored energy that is in a hydraulic form or in an electrical form may as assistant energy, problems are solved that, in the situation that the automobile is stopped and the engine is shut down so as to save energy, it is not easy to control the timing of shutting down in the case of automatic control, and it is also troublesome to carry out manual control in that the motor should be frequently started, thus the efficiency is low, the service life of the cell or the motor is reduced and the exhaust emission is increased.

2) When the automobile travels in travels in medium and high velocity ranges, the direct mechanical transmission with a large speed increase is employed such that the engine operates at high efficiency within the vicinity of the minimal speed rotation. When the automobile needs large torques such as in the situations of accelerating and climbing up a slope, assistant power is first provided through hydraulic activators and the transmission ratio is then quickly decreased to increase the output torque so as to meet the power requirements of the system.

3) In conventional approaches, when the automobile needs to slow down, it is difficult for the automobile to slide at neutral shift due to limitations from mechanism and safety, thus energy is wasted since the engine functions to brake. However, in the invention, the fuel consumption is decreased because sliding at neutral shift could be carried out automatically on the premise of safety.

4) When the automobile is stopped, the engine will automatically shut down.

5) When the automobile is braking, both the hydraulic activators and the electrical motors may function to brake so as to regenerate kinetic energy of the automobile.

The engine, hydraulic activators and the electrical motor may all operate within their individual high efficiency intervals in various operating conditions through application of the above mechanisms and proper cooperation of the above structures.

The energy-saving effects of the invention are as follows.

1. An increased heat conversion efficiency of the engine

Since the rotation speed of the engine and the velocity of the automobile no longer bear a fixed ratio therebetween, the engine may regularly operates within such speed and load ranges that allow for high efficiency and low emission. Particularly in the situations of low velocity and low load, the circulatory operation mode in which the engine is started, and then is shut down/idle is employed, such that energy that will be wasted otherwise will be utilized through the hydraulic and electric systems so as to improve the heat conversion efficiency of the engine significantly.

2. An decreased energy consumption in idle and sliding states of the automobile.

Through such a shifting device, a two-mode circulatory driving manner could be employed such that the engine could still operate with a load or be shut down when the automobile is stopped, and the hydraulic or electrical energy that has been regenerated may be employed to drive the automobile to travel forward. In addition, when necessary, the engine could be started quickly and conveniently through the hydraulic system. In this way, the energy consumption of the engine in idle states is reduced, while at the same time, a series of problems, arising from the fact that the engine needs to be frequently restarted in situations where the pure manner that the engine will shut down if only the automobile stops is employed, are circumvented. The additional engine motoring energy loss resulting from impossibility of the conventional transmission that frequent shifting to neutral shift is not possible is reduced on the premise of safety.

3. An decreased loss in transmission chain.

Very high transmission efficiency could be achieved in a very broad speed range through appropriate designs of the transmission. Furthermore, a hydraulic toque variator and a clutch of a friction type, which are of low efficiency, are dispensed with, thus the energy loss arising from the control mechanisms and the engine to switch between operation conditions is reduced.

4. Regeneration of kinetic braking energy.

A large part of kinetic energy of the traveling automobile is regenerated and will be utilized when the automobile is restarted. This is achieved by the hydraulic motors and the hydraulic energy storage which serve as braking assistant mechanisms. Since the power of the hydraulic motors may be very high, and the energy-storing speed and efficiency of the hydraulic energy storage are higher than those of the cell pile, the regeneration ratio of kinetic energy is higher than in case of regenerating via electrical energy. Furthermore, the energy consumption of the engine may be further reduced through replacing the prior art mechanic compressor with the hydraulic air conditioner compressor and replacing the existing hydraulic direction-changing assisting pump with the hydraulic direction-changing assisting device of the invention.

The environment-conservation effects of the invention are as follows.

1. The emission exhausted from the engine is lowered since the engine is frequently kept operating within a high efficiency and low emission range.

2. Since a two-mode operation manner is employed in low speed city road conditions, high pollution due to the state in which the automobile is stopped and the engine is idle is avoid, furthermore, addition pollution due to frequent starting of the engine after the automobile is stopped and the engine is shut down is eliminated.

3. The exhaust emission and noise level are significantly decreased since the automobile travels mainly via electrical driving in urban areas through a plug-in charging mode.

4. The fuel consumption is reduced to about one half, and at the same time the exhaust emission is also halved.

As compared with the prior art, the invention possesses the following properties.

1. As compared with various prior art transmissions, the three challengers that conventional transmissions could not solve, that is, regeneration of braking energy, low efficiency of engine in low speed and load situations, and contradiction between dynamics and economy of the engine at high speeds, are resolved through hybrid power driving. In addition, continuously variable shifting of high efficiency within a large range form 0 to the maximal velocity is achieved, which could not achieved through the prior art transmissions. Even compared with a stepped CVT system in which the hydraulic system and the mechanical system are separated, the device according to the invention only needs a two-stage shifting mechanism to achieve four high efficiency nodes.

2. As compared with the prior art mechanic and electrical hybrid power, the device according to the invention does not need a high-power motor, a cell pile and a controller that are expensive to achieve the same energy-saving effect. Instead, the cost is significantly decreased through employing the mechanical and hydraulic transmission as a main approach and electrical power device which may be flexibly deployed as a secondary approach. In addition, the specific power of the hydraulic power device is much higher than that of the electrical power device, thus the device of the invention has a small profile and a low weight, making it easy to install. In particular, it can be embodied in the prior art automobile models without significant retrofits. Therefore, the costs of developing a new automobile model and retrofitting an existing automobile are reduced. Nevertheless, this can not be realized through the prior art mechanical and electrical hybrid technique.

3. As compared with the prior art mechanical and electrical hybrid technique, the advantages of the device are as follows. 1) The technique of hybrid connection, power splitting and stepped transmission is employed to solve problems that it is difficult to achieve high efficiency transmission in various operating conditions because the hydraulic loop is of low efficiency and that the structure is complicated, whatever a serial connection, a parallel connection or a hybrid two-mode driving manner is employed. 2) Electrical driving of high specific energy and hydraulic driving of high power are incorporated with the internal combustion engine to constitute tri-form hybrid power driving, and advantages are strengthened with disadvantages being offset, thus achieving best energy-saving effects. The defect that the engine has to be frequently started since the pure mechanical and hydraulic hybrid driving manner can only serve as an assist in starting and may not realize circulatory driving due to its low specific energy.

In the design ideas of the above device, the control mechanism is relatively complicated. However, the actual structure and the manufacture are relatively simply and easy, and main components are already-existing well-developed industrial products. Large power motors and large power control mechanisms of special structure and large capacity cell piles with very rapid charging and discharging properties are dispensed with, such that even the overall cost is lower than the automatic transmission, even higher than that of the manual transmission. In addition, its cost is much lower than the prior art mechanical and electrical hybrid driving device with the same energy-saving effect.

The invention proposes, according to the load profile of an automobile and the dynamic characteristics of an engine, a device for the purpose of saving energy through a mechanical, electrical and hydraulic tri-form hybrid driving technique. It is characterized by its relatively simple structure, low cost and small volume. Its manufacture is easy, and its manipulation is convenient. It is suitable for various load variations, and can match with engine characteristics in a proper and optimal manner and allow the engine to frequently operate at high efficiency and with low emission. It has good dynamics and makes driving comfortable. In addition, it is realized that the engine may be shut down when the automobile stops, braking energy may be regenerated, continuously variable transmission may be performed at high efficiency and energy from a plug-in power supply may be used to assist in driving. The device may be substituted for currently onboard transmissions, such that prior art automobiles can be retrofit to save energy and the new automobiles with this device can be driven in an energy-saving manner.

DRAWINGS

FIG. 16 is a front illustration showing structures of a low pressure energy storage and a closed oil tank according to embodiment 2 or 3 of the invention;

FIG. 17 is a top view showing structures of a low pressure energy storage and a closed oil tank according to embodiment 2 or 3 of the invention.

DETAILED DESCRIPTION OF EMBODIMENTS

Figure 1:
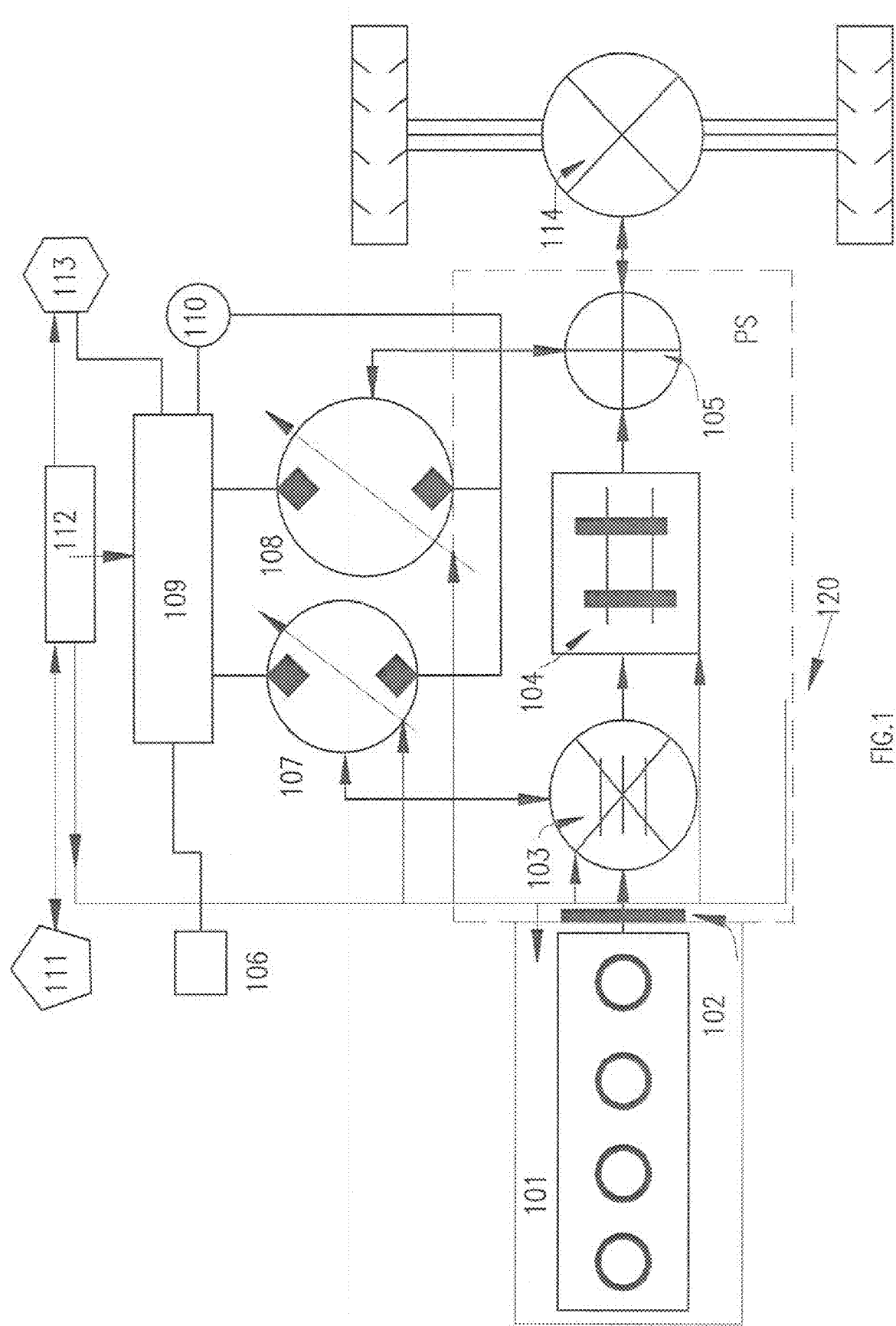
FIG. 1 is an illustration showing the structural principles of a continuously variable transmission according to an embodiment 1 of the invention.
Figure 2:
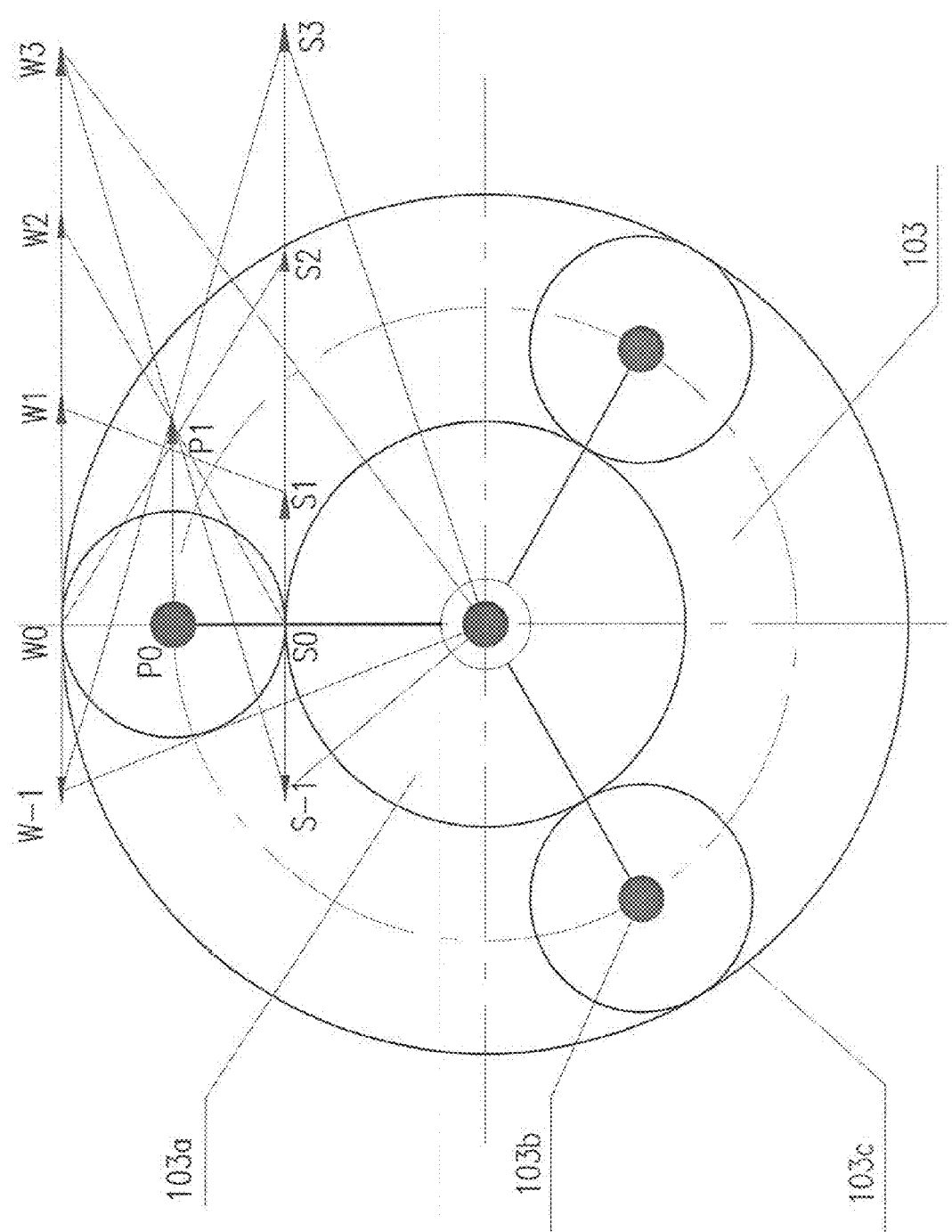
FIG. 2 is an illustration showing the structural and speed variation principles of an NGW planetary gear train.

Embodiment 1, a Continuously Variable Transmission of the Invention

As shown in FIGS. 1 through 8 and FIG. 18, the continuously variable transmission of the invention is mainly comprised of an internal combustion engine 101, a flying wheel 102, a differential planetary gear train 103 with a locker, a mechanical transmission mechanism 104, a power synthesizer and main reducer 105, an optional miniature hydraulic energy storage 106, a first variable displacement hydraulic activator 107, a second variable displacement hydraulic activator 108, a hydraulic controller 109, a miniature low-pressure oil tank 110, a sensing and controlling means 111, an electronic control unit 112, an accessory device 113, a differential 114 and a casing 120.

Connecting relationships of individual components of the inventive device are indicated as follows. The output shaft of the internal combustion engine 101 is fixedly connected to the input of the differential planetary gear train 103 via the flying wheel 102; the output of the differential planetary gear train 103 is fixedly connected to the input shaft of the mechanical transmission mechanism 104; the output shaft of the mechanical transmission mechanism 104 is fixedly connected to the power synthesizer and main reducer 105 and the driving mechanism 114 in this order; the control terminal of the differential planetary gear train 103 is fixedly connected to the power shaft of the first variable displacement hydraulic activator 107, and the power shaft of the second variable displacement hydraulic activator 108 is fixedly coupled to the power synthesizing shaft of the power synthesizer and main reducer 105; the flying wheel 102, the differential planetary gear train 103, the mechanical transmission mechanism 104, the power synthesizer and main reducer 105 and the differential 114 are all mounted in the casing 120.

The high pressure terminal of the first variable displacement hydraulic activator 107, the high pressure terminal of the second variable displacement hydraulic activator 108, the hydraulic mechanism of the accessory device 113 are each connected to the optional hydraulic energy storage 106 and the hydraulic oil tank 110 through hydraulic pipelines via the hydraulic controller 109; and the low pressure terminal of the first hydraulic variable displacement activator 107, the low pressure terminal of the second variable displacement hydraulic activator 108 and the low pressure oil tank are connected to each other via hydraulic pipelines.

The electronic control unit 112, the sensing and controlling means 111, the accessory device 113 and the all other components in the system which are necessary to be controlled are connected to each other via signal lines or control lines.

The device according to the present invention will be grouped as four sub-systems, i.e., a mechanical system, a hydraulic system, an accessory system and an electrical control system, so as to facilitate explaining the structural principles and the operating manner of the invention in more detail.

The mechanical system of the invention is comprised of the internal combustion engine 101, the flying wheel 102, the differential planetary gear train 103, the mechanical transmission mechanism 104, the power synthesizer and main reducer 105, and the differential 114, wherein the internal combustion engine 101 may be a gasoline engine or a diesel engine. For the automobiles with the same power settings, an engine with a lower displacement could be employed to improve its load ratio and efficiency in that there is addition power in the invention. The main shaft of the internal combustion engine is arranged with a one-way clutch 101a to prevent reverse rotation, and an end surface thrust bearing to receive the axial force that may be experienced.

Figure 3:
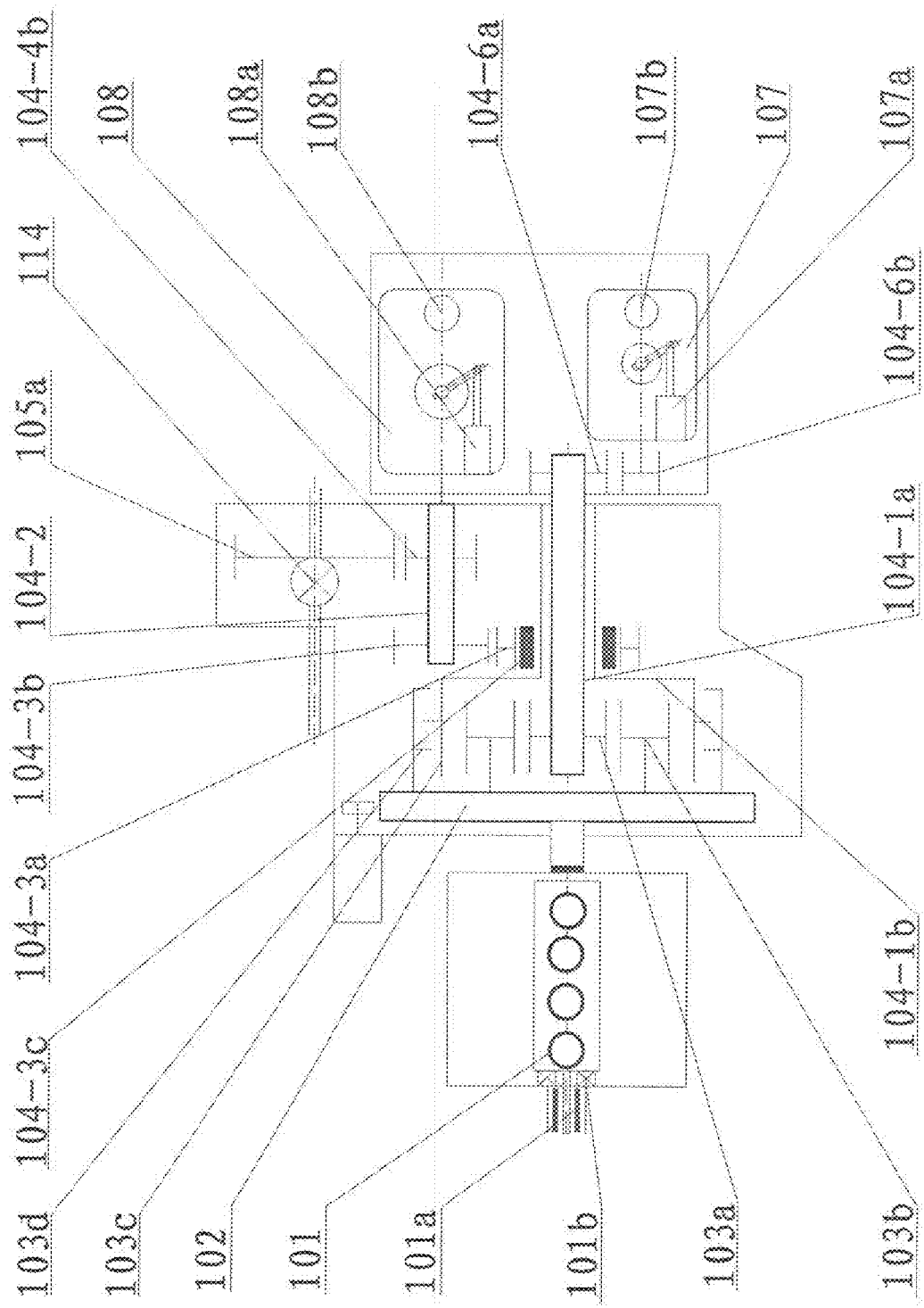
FIG. 3 is an illustration showing the mechanical structures of a CVT of embodiment 1 which carries out one-stage transmission.
Figure 4:
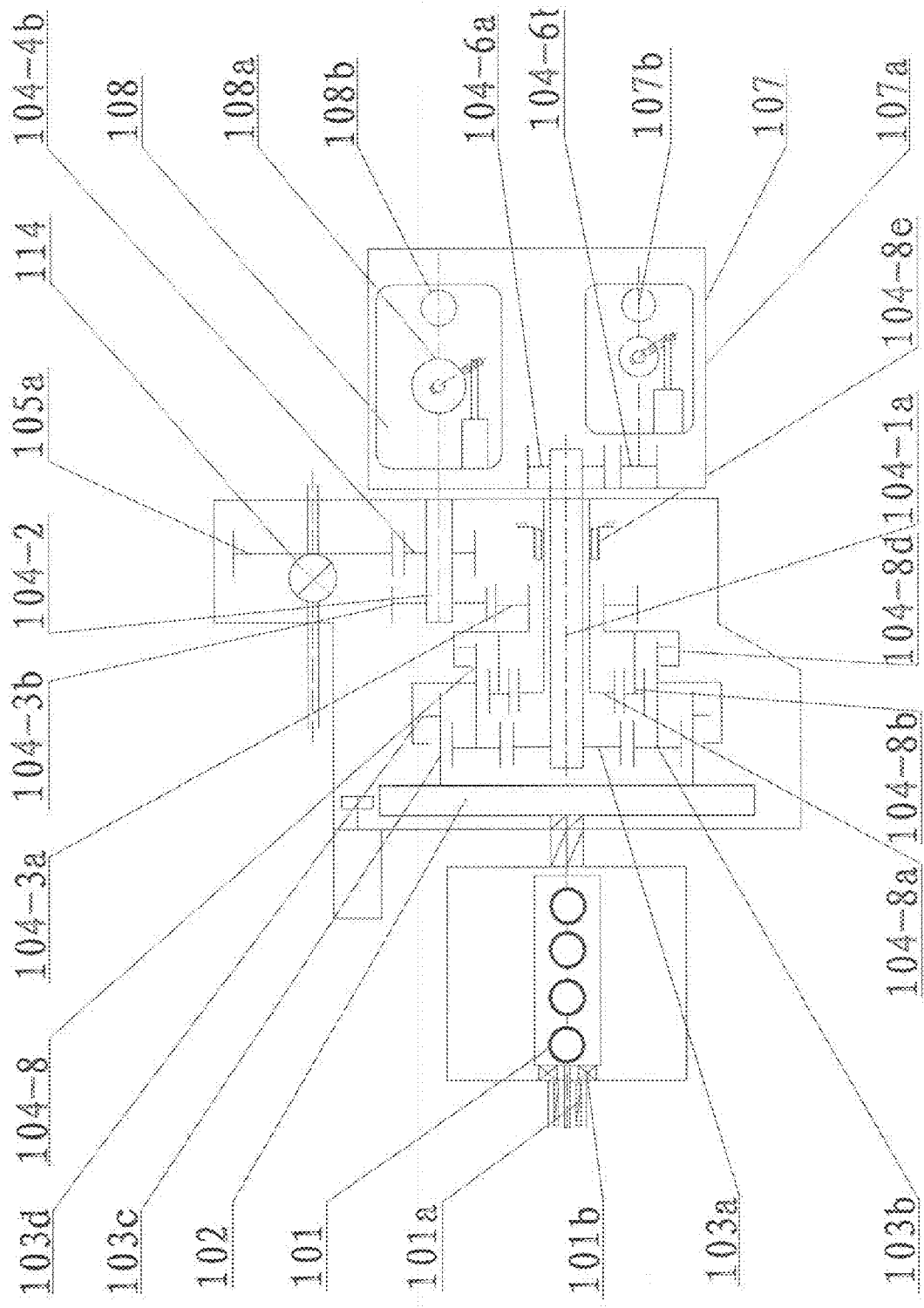
FIG. 4 is an illustration showing the mechanical structures of the CVT of embodiment 1 which employs a double-row planetary gear train.
Figure 5:
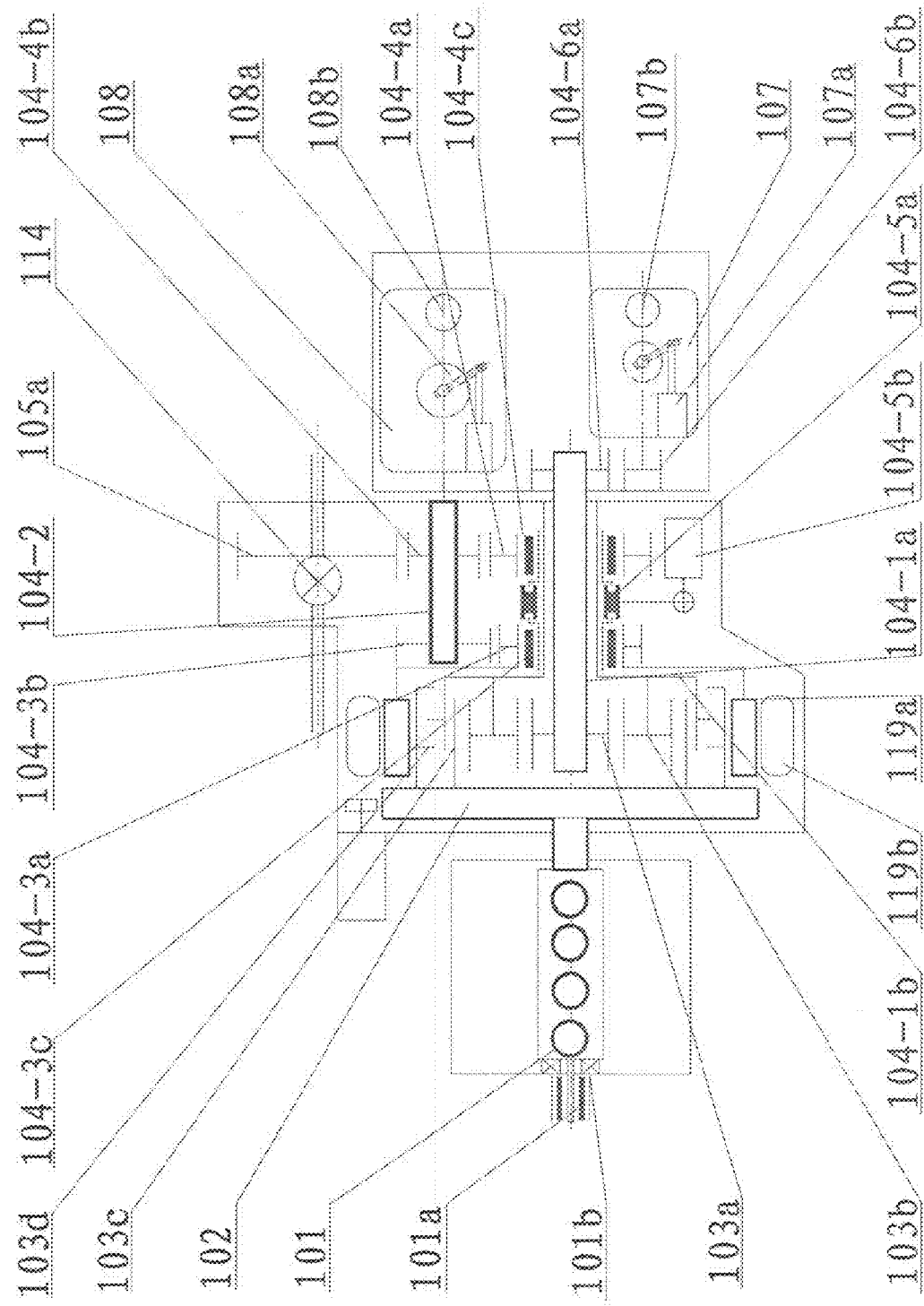
FIG. 5 is an illustration showing the mechanical structures of the transmission mechanism with a two-stage gear train according to the invention.

Preferably, the differential planetary gear train 103 is of a single row NGW or NW type (as shown in FIG. 3 and FIG. 5), and may be of other types, such as a double row or a multi-row parallel planetary gear mechanism (as shown in FIG. 4), or be of Simpson or Ravigneaux type, etc. The structure and shifting principle of the single row NGW planetary gear train is referred to FIG. 2. It is comprised of three components, i.e., a sun gear 103a, a planet gear and planet bracket 103b, a toothed ring 103. When the rotation speed p1 of the planet bracket 103b is kept unchanged, sequentially increasing the rotation speed of the sun gear from S-1 to S0, S1, S2 and to S3 leading to reduction of the rotation speed of the toothed ring from W3 to W2, W1, W0 and to W-1 accordingly. The three components of the planetary gear train may respectively serve as the input, output and control terminal in the system so as to form six different connection manners. In the invention, two manners in which the sun gear 103a is taken as the control terminal are preferably employed, that is, manner 1 in which the planet bracket 103b of the planetary gear train serves as the input and the toothed ring 103c as the output, and manner 2 in which the toothed ring 103c of the planetary gear train serves as the input and the planet bracket 103b as the output. The output shaft of the engine is fixedly connected to the input of the planetary gear train via the flying wheel, such that the power of the engine is input from the planetary gear train and is output from the output of the planetary gear train. Between any two of the three components of the active components is provided with a planet gear lock clutch 103d, which is controlled via an electromagnetic way or via a hydraulic way, so as to carry out disengagement and engagement of the planetary gear. When the lock clutch (referred to the locker in the sequel) is locked up, the planet gear rotates as a highly rigid body. When the locker is released, the planet gear rotates in a differential way so as to realize movement decomposition or composition.

The mechanical transmission mechanism 104 is a single stage or multi-stage mechanism with an automatic overrunning transmission function. By an automatic overrunning function it is indicated that the rotation speeds of the output devices are allowed to exceed the rotation speeds of the input devices to rotate freely, in this way to realize power transmission, transfer, interruption or overrunning between the differential planetary gear train 103 and the power synthesizer and main reducer 105. The purpose of employing an overrunning transmission is to (1) automatically perform sliding at neutral in traveling process and avoid friction loss of the first variable displacement hydraulic activator 107 at neutral, (2) to make the first variable displacement hydraulic activator 107 start the engine and smoothly change into transmission operation so as not to affect the traveling of the automobile, and (3) to isolate power input and output so as to facilitate shifting. The automatic overrunning function may be dispensed with only when the first variable displacement hydraulic activator 107 employed is specially designed to have a very small neutral drag torque and a very small moment of inertia as well. The purpose of employing a multi-stage transmission mechanism is twofold. On the one hand, when the energy stream in the link of speed and power adjustment account for a large percentage and the efficiency of the link is lower, it is provided a multi-stage transmission mechanism to improve the overall efficiency, to realize step-wise continuously variable shifting and to reduce the ratio of the energy stream in the link for speed and power adjustment; on the other hand, due to the limitations of the configuration dimensions, a multi-stage transmission is employed when the torque of the link for speed and power adjustment could not match the system requirements so as to lower the torque requirements from the components for speed and power adjustment, in this way to decrease the weight and dimension of the components for speed and power adjustment to facilitate the installment of the system. For small scale automobiles, it is sufficient to adopt a 1-2 step transmission, for example, a two-step transmission with a high speed shift and a low speed shift. Large scale automobiles may adopt continuously variable transmission with 2-4 shifts, e.g., the number of shifts is generally one fifth to one third of the original number of shifts of the automobile.

The transmission mechanism employs gear train transmission or planetary gear train transmission. Gear train transmission may employ a single stage transmission gear pair (see FIG. 3) or a multi-stage transmission gear pair with synchronous clutch control, wherein each transmission gear pair is provided an overrunning clutch (see FIG. 4).

Refer to FIG. 3 for a continuously variable transmission which employs a single stage transmission gear pair. The reference numerals in the figure and the components they represent respectively are listed as follows.

101—an internal combustion engine,
101a—a one-way clutch,
101b—an end surface thrust bearing,
102—a flying wheel 102,
103a—a sun gear in a planetary gear train,
103b—a planet bracket in a planetary gear train, 103c—a toothed ring in a planetary gear train,
103d—a planetary gear locker,
104-1a a first transmission shaft,
104-1b an output sleeve of a planetary gear,
104-2 a second transmission shaft/power output shaft,
104-3a—a driving gear in the mechanical transmission system,
104-3b—a driven gear in the mechanical transmission system,
104-3c—an overrunning clutch,
104-4b—a driving gear of a main reducer,
105a—a driven gear of the main reducer,
114—a differential,
107—a first variable displacement hydraulic activator,
107a—a transmission mechanism of the first variable displacement hydraulic activator,
107b—an oil port of the first hydraulic activator,
108—a second variable displacement hydraulic activator,
108a—a transmission mechanism of the second variable displacement hydraulic activator,
108b—an oil port of the second hydraulic activator,
104-6a—a driving gear of the first variable displacement hydraulic activator,
104-6a—a driven gear of the first variable displacement hydraulic activator.

In this device, the output shaft of the engine is fixedly connected to the planet bracket 103b of the planetary gear train via a flying wheel; the tooted ring 103c is connected to the output sleeve of the planetary gear so as to transfer power to a second transmission shaft via a one-way clutch and the transmission gear pair, and is connected to the second variable displacement hydraulic activator. The first variable displacement hydraulic activator is connected to the sun gear of the planetary gear train via the gear pairs 104-6a and 104-6b.

Refer to FIG. 4 for a continuously variable transmission which employs two-stage transmission gear pairs. The reference numerals in the figure and the components they represent respectively are listed as follows.
104-3c—an overrunning clutch with end surface teeth on inner ring thereof,
104-4a—a driving gear of the second transmission gear pair of the mechanical transmission mechanism,
104-4b—a driven gear of the second transmission gear pair of the mechanical transmission mechanism,
104-5a—a sliding ring with teeth on either side of a tooth-embedding type clutch,
104-5b—a control mechanism of the tooth-embedding type clutch,
104-4c—an overrunning clutch with end surface teeth on the inner ring thereof,
119a—a rotor of the driving motor,
119b—a stator of the driving motor.
Other reference numerals are referred to FIG. 3.

In this device, the output shaft of the engine is fixedly connected to the toothed ring 103c of the planetary gear train via a flying wheel; the planet bracket 103b is connected to the output sleeve of the planetary gear so as to transfer power to a second transmission shaft via a one-way clutch and the two-stage transmission mechanism, and is connected to the second variable displacement hydraulic activator. The first variable displacement hydraulic activator is connected to the sun gear of the planetary gear train via the gear pairs 104-6a and 104-6b.

Since the engagement and disengagement of the two-stage shifting gear in this device are carried out in an unloading state, therefore a tooth-embedding type electromagnetic clutch with a synchronizer is employed. Its structure is simple and its operation is convenient. An overrunning clutch is also referred to as a one-way clutch, which may be a wedge-like, a ratchet wheel-like or a roller-like clutch, etc. among which the wedge-like clutch bears best technical properties.

The transmission mechanism may also employ a planetary gear train (see FIG. 5). The reference numerals in the figure and the components they represent respectively are listed as follows.
104-8a—a sun gear of the transmission planetary gear train,
104-8b—a planet bracket of the transmission planetary gear train,
104-8c—a toothed ring of the transmission planetary gear train,
104-8d—a locker of the transmission planetary gear train,
104-8c—a one-way clutch of the sun gear of the transmission planetary gear train.

The transmission mechanism may be a single row or a multi-row mechanism. Take a single row planetary gear as an example, two of its three movement components are respectively taken as input and output in comprehensive consideration of transmission ratio matching and requirements on rotation direction. The third component, i.e., the control device, such as the sun gear is provide with a one-way clutch such that the sun gear may only rotate in one direction, that is, it becomes a single stage clutch with an automatic overrunning function; furthermore, there is provided a locker 104-8e between any two of the toothed ring, the planet bracket and the sun gear so as to perform synchronous rigid transmission and variable transmission, and the planetary gear train becomes a two-stage transmission with an automatic overrunning function.

Figure 6:
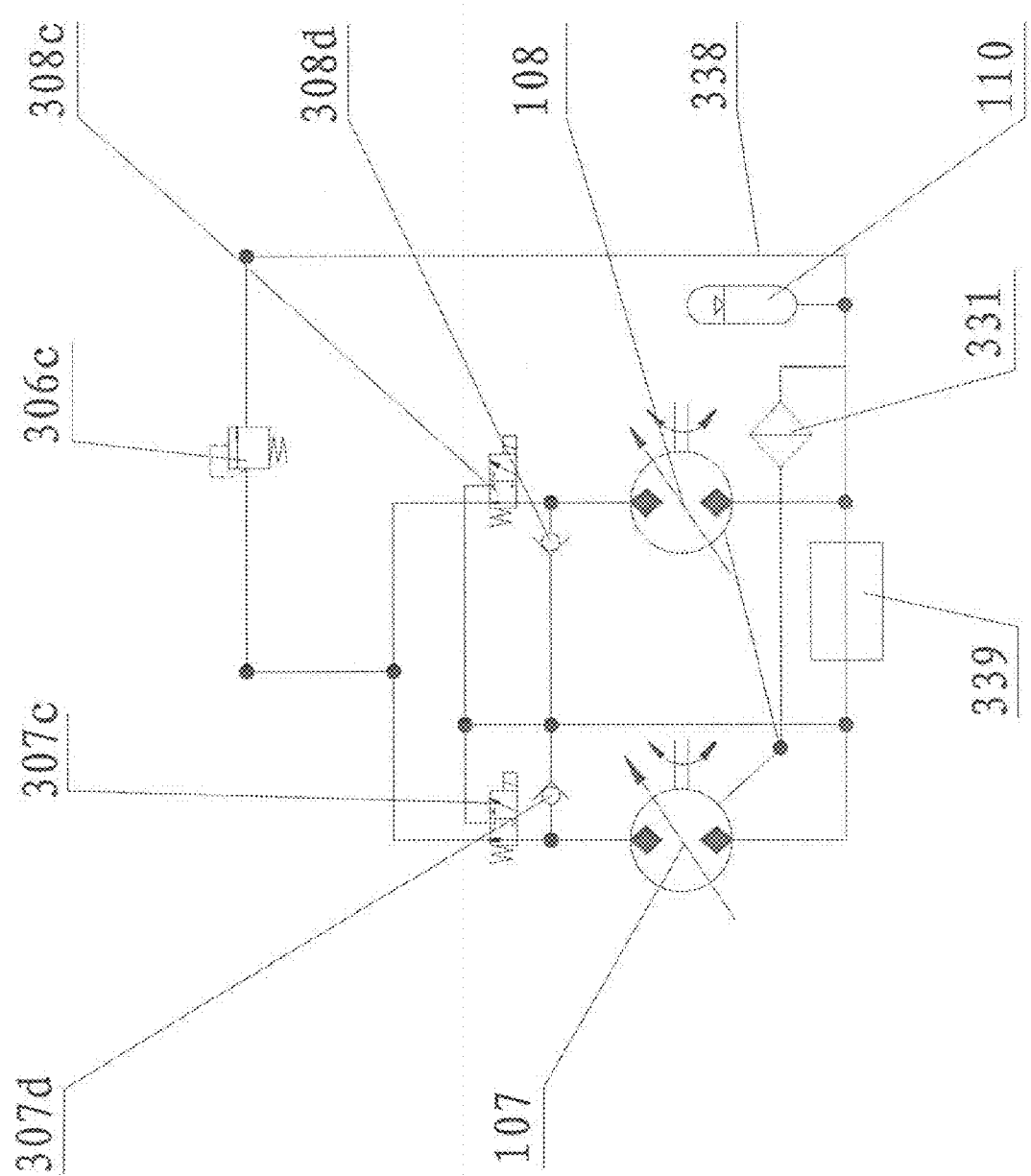
FIG. 6 is an illustration showing the hydraulic system of embodiment 1.

As shown in FIG. 6, the hydraulic system of the present invention includes an optional hydraulic energy storage 106, a first variable displacement hydraulic activator 107, a second variable displacement hydraulic activator 108, a hydraulic controller 109, a low-pressure oil tank 110 and high pressure and low pressure connection pipelines. Among these components, the first variable displacement hydraulic activator 107 and the second variable displacement hydraulic activator 108 are at least a hydraulic pump with a variable displacement; the second variable displacement hydraulic activator 108 may be a variable displacement motor which may perform bidirectional rotations, that is, may perform positive rotation and reverse rotation. Preferably, the first and second variable displacement hydraulic activator are duplex bidirectional variable displacement hydraulic pumps/motors, that is, they can perform positive rotation and reverse rotation, and can serve as both a pump and a motor. The rating torque of the first variable displacement hydraulic activator is 0.2 to 2 times of the rating torque of the engine, and the rating torque of the second variable displacement hydraulic activator is 0.5 to 5 times of the same. The embodiment of the invention employs a variable displacement axial plunger pump/motor of a swash plate type. Due to bidirectional and duplex requirements, its oil-distributing disk assumes a symmetrical structure. And its variable displace swash plate may carry out bidirectional deflection, thus its operation mode and direction switching are very simple. For example, when rotating in a certain direction, the working condition switching between pump and motor may be realized only through reversing its variable displacement swash plate via the variable displacement control mechanism. Moreover, under the rest state, if there is no external power to perform driving, it becomes a hydraulic activator when high pressure oil is introduced into its high pressure terminal and the rotation direction may be changed when the direction of the variable displacement swash plate is changed. The variable displacement mechanism of the hydraulic activator may have various structures, such as a trunnion structure, a pendulous disk structure, etc. The variable displacement controlling and driving may also assume different manners, such as, for a trunnion structure, driving via a hydraulic oil tank, electrical driving though a motor and a worm gear reducer. The control motor may be a step motor, a torque motor, and a DC permanent magnetic motor, etc., detailed descriptions of which are omitted for concision considerations. In the device of the invention, when a close type low pressure oil tank is employed, the oil leakage pressure in the system is also a low pressure, therefore, it is required that the seal over the casing of the hydraulic activator, such as oil seal at the end surfaces be provided with a framework to receive pressure. Naturally the variable displacement pump/motor of other forms which could fulfill the required functions of the invention may also be employed as the hydraulic activator, such as a variable displacement axial plunger pump/motor proposed by the applicant.

In the invention, the two hydraulic activators may be integrated into one piece so as to share one casing such that dimension and weight thereof are reduced.

The hydraulic controller 109 performs communicating, short-circuiting, interrupting, direction changing, security protecting for individual hydraulic components themselves and therebetween. See FIG. 6, the hydraulic controller 109 is comprised of several direction control valves, relief valves and connecting pipelines, that is, including an electromagnetic directional valve 307*ce* in the main oilway of the first variable displacement hydraulic activator 107, a check valve 307*d*, an electromagnetic directional valve 308*c* in the main oilway of the second variable displacement hydraulic activator 108, a check valve 308*d*, a relief valve 306*c*, a filter 331, a low pressure oil tank 110, low pressure pipelines 338, a radiator 339, etc. An alternative solution to the low pressure oil tank is to employ an open oil tank and a pressurized pipe pump.

As shown in FIG. 6, the electromagnetic directional valves 307*c*, 308*c* in the main oilways of the first and second variable displacement hydraulic activators are two-position three-way electromagnetic directional valves with a transfer short-circuiting function, wherein port P is connected to a high pressure source, port T is connected to a low pressure oilway, and port A is connected to a high pressure oil port of the hydraulic activator. The disconnection and connection of the electromagnets cause the high pressure oil port of the hydraulic activators to be connected to the high pressure oilway and the low pressure oilway, respectively. When being connected to the low pressure oilway, the hydraulic activator is equivalently short-circuited and unloaded. The transfer short-circuiting function of this valve, that is, port A and port B are connected with each other, suppresses the impact arising from directional changes so as to protect the hydraulic activators. In order to prevent the high pressure port of the hydraulic activators to be sucked dry, it is arranged that the inlet ports of the check valves 307*d*, 308*d* of the main oilways of the first and second variable displacement hydraulic activators are connected to the low pressure oilway, and that the outlet ports thereof are connected to the high pressure oilway.

The inlet port of the oil filter 331 is connected to the oil relief ports of the first and second variable displacement hydraulic activators, and the outlet port thereof is connected to the low pressure oilway 338. In addition, in the hydraulic system, there is provided a radiator 339 in the pipelines which connect the first and second variable displacement hydraulic activators. The radiator is cooled by the natural gas stream generated during automobile traveling, thus to maintain the temperature balance of the hydraulic oil. The optional miniature hydraulic energy storage is provided upstream of the high pressure oil port of the high pressure relief valve so as to absorb hydraulic impacts in the system.

The accessory system 113 of the inventive device includes a cooling and lubricating system which cool and lubricate the planetary gear train and the mechanical transmission mechanism, etc. This is necessary to ensure the device to operate properly. There is provided in the invention a lubricant pump which is driven by an electrical motor to lubricate individual components through a lubricant tank, a filter and oil pipelines. Among others, it is very vital to lubricate the planetary gear train. In the invention, a lubricant pathway is arranged along the central axis of the first transmission shaft, at the end of which is provided with a rotary oil tapping to be connected to the oil supply pipeline.

Figure 7:
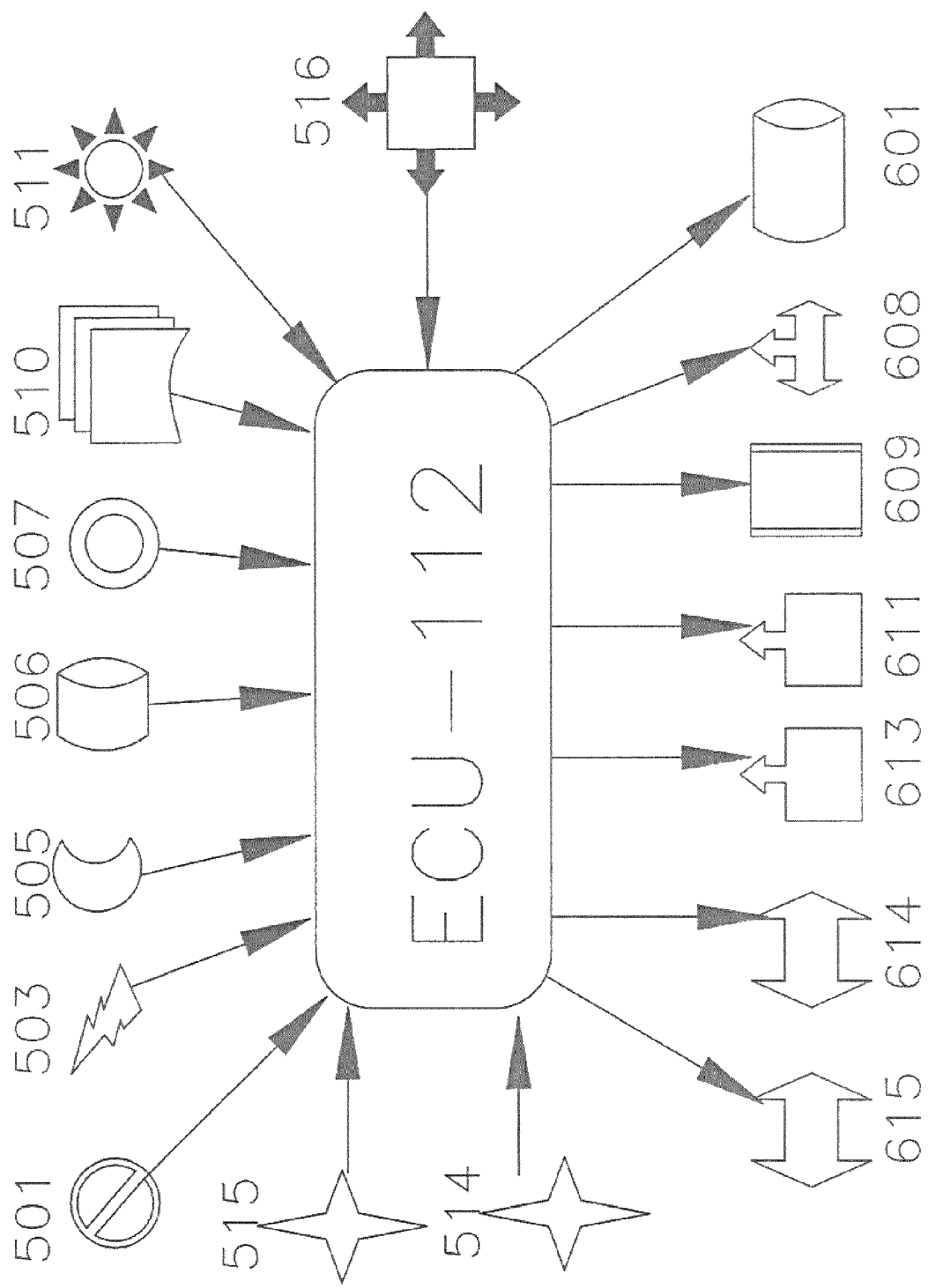
FIG. 7 is an illustration showing the control system of embodiment 1.
Figure 8:
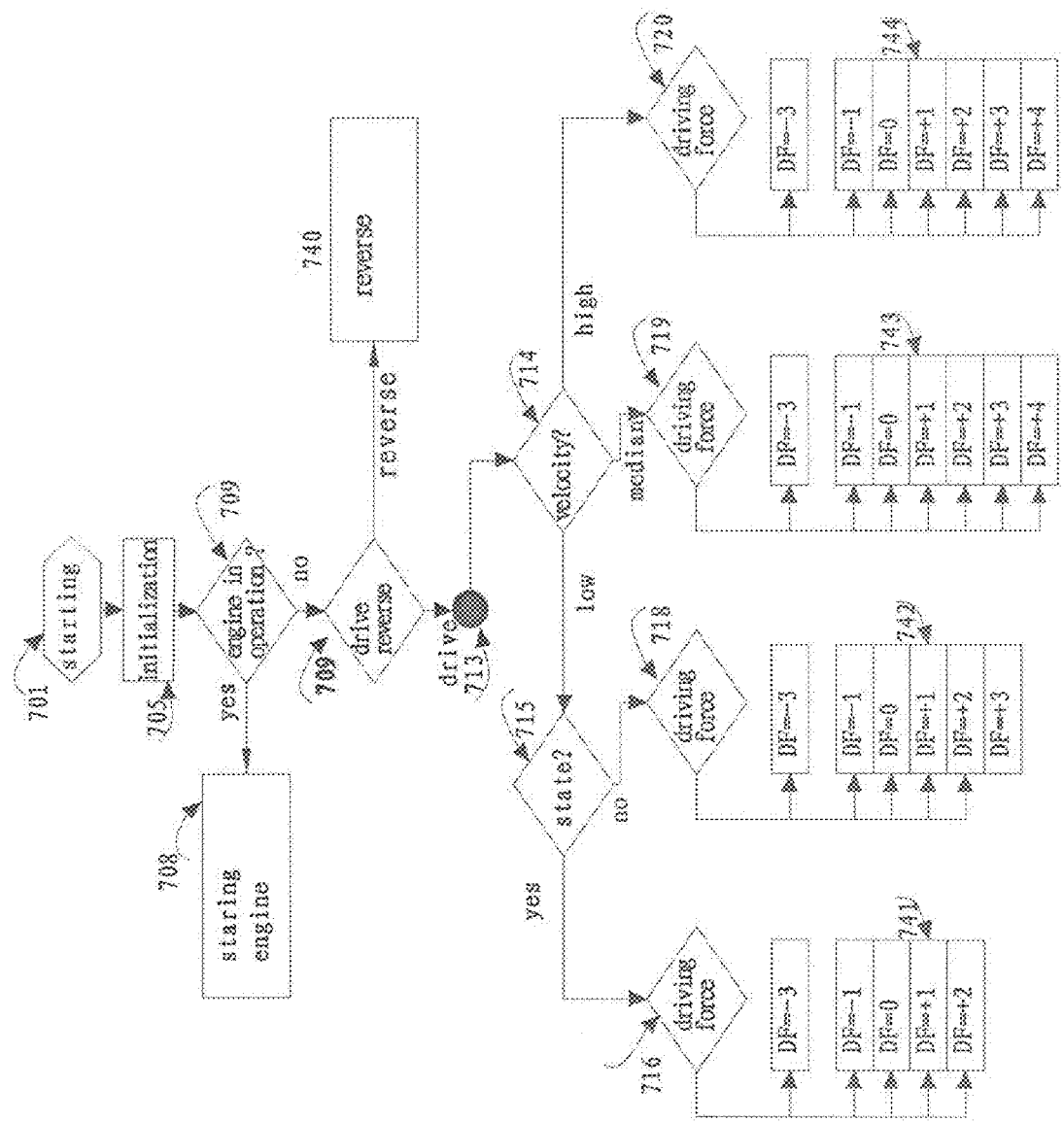
FIG. 8 is a flow chart showing the program of embodiment 1.

The electronic control device of embodiment 1 of the invention, as shown in FIGS. 7 and 8.

The electronic control device of the invention includes sensing and controlling means 111 and an electronic control unit 112.

For the sensing and controlling means 111, its sensing means may perform pressure measuring, temperature measuring, velocity measuring and position measuring, etc. The existing sensors in the automobile may be sufficiently exploited. Its controller, i.e., the control and execution mechanism, includes a relay, electromagnets and miniature electrical motors, etc.

The electronic control unit 112 is comprised of a hardware portion and a software portion. The hardware portion is a PC controller with a CPU which has multiple channels for the output and input of digital and analog variables. The electronic control unit 112 controls the operations of the overall system through the sensing and controlling means 111 collecting individual variable parameters. The software is constituted by an automatic control program and is solidified into the EPROM of the PC, as shown in FIG. 7.

The input parameters to the electronic control unit include 501, an ignition switch of an automobile to control the start of the system and the engine, taking 4 values for a general automobile, i.e., 0 (power off of the overall automobile), 1 (power on of the onboard accessory equipments), 3 (power on of the engine) and 4 (starting an electronic motor for power supply), 503, the position of the accelerator, corresponding to the degree that a driver steps on the accelerator and taking values $DF=-1, 0, 1, 2, 3, 4$, wherein $-1$ represents that the left foot of the driver is taken away from the accelerator, 0 represents gentle stepping on the accelerator, and 4 represents stepping on the accelerator to the full, 505, a mechanical braking pedal on which the driver's right foot steps, 506, the velocity of the automobile, 507, the rotation speed of the engine, 510, the universal characteristic profile of the engine, 511, the lubricant pressure, 514, the displacement of the first variable displacement hydraulic activator, and 515, the displacement of the second variable displacement hydraulic activator.

Herein, when the required driving force, that is, the DF value is to be determined from the positions of the accelerator and the accessory braking pedal, a correction value indicating the stepping speed at these positions should be additionally considered, that is, in the current position range, the DF value should be increased or reduced according to the stepping speed to manifest the true power requirement of the driver.

The universal characteristic profile 510 of an engine, which is solidified in the EPROM, is a universal characteristic matrix specific to the engine. The CPU of the PC obtains the output torque from the matrix on the basis of the rotation speed of the engine and the open degree of the throttle so as to calculate matched displacements of the variable displacement hydraulic pumps.

The output control of the electronic control system includes

601, the electrical motor of the lubricant pump,

608, the electromagnetic tooth-embedded type variable clutch,

609, the electromagnetic clutching locker 103d of the planetary gear,

611, the directional valve 307c in the main oilway of the first variable displacement hydraulic activator,

613, the directional valve 308c in the main oilway of the second variable displacement hydraulic activator,

614, the variable displacement control of the first hydraulic activator, and

615, the variable displacement control of the second hydraulic activator.

The control software of the inventive device includes 18 program modules, and the flow block diagram is illustrated in FIG. 8. The functions of individual modules are as follows.

701, the ignition switch switching from 0 to 1 and the control system being powered to start,

705, the ignition switch switching from 1 to 2, the system being initialized and tested, individual input variable parameters being checked, and the hydraulic pump and the hydraulic activator being short-circuited via the directional valves of the hydraulic pump and the hydraulic activator,

708, determining whether the engine has been started,

709, the engine having been started and determining the operation shift on "D" or on "R",

740, the system entering a reverse driving mode if the operation shift is on

713, the system transiting in combination and the process turning to 714 if the operation shift is on "D",

714, determining the automobile velocity V which may be divided into three ranges, that is, a low velocity range, a median velocity range and a high velocity range. The division of the velocity ranges may be set according to different automobile models and different road conditions in different countries. For example, for cars, the low velocity range may be set as V=0-60 km/h, the median velocity range may be set as V=60-125 km/h, and the high velocity range may be set as V>125 km/h,

715, the low velocity range which consists of two states, the starting state in which the automobile speed increases from 0 to a first velocity node and the low speed state in which the automobile speed lies between the first velocity node and a second velocity node,

716, the starting state of the automobile, the system, according to the position of the accelerator and its speed and the position of the braking pedal, calculates the driving force or determines whether or not to enter the braking configuration, chooses the driving mode.

718, the low speed state of the automobile, the system, according to the positions of the accelerator and its speed and the position of the braking pedal, calculates the driving force or determines whether or not to enter the braking configuration, chooses the driving mode.

719, the median velocity range, the system, according to the positions of the accelerator and its speed and the position of the braking pedal, calculates the driving force or determines whether or not to enter the braking configuration, chooses the driving mode.

720, the high velocity range, the system, according to the positions of the accelerator and its speed and the position of the braking pedal, calculates the driving force or determines whether or not to enter the braking configuration, chooses the driving mode.

741-744, respectively, the starting state, the low speed state, the median velocity range and the high velocity range, wherein the system, according to the required driving force and whether or not it is in braking configuration, operates in different driving mode accordingly.

In addition, the system also includes an emergency treatment and failure diagnosis program module and a system parameter setting module.

In different states and different velocity ranges, the driving force requirement DF is further divided into 7 modes as follows.

DF=−3, mechanical and hydraulic combined braking state, that is, the right foot of the driver steps on the mechanical braking pedal and the left foot steps on the accessory hydraulic braking pedal; this mode generally is employed in an emergency braking situation.

DF=−1, sliding at neutral. The right foot of the driver is taken away from the accelerator and the automobile maintains a motion under the actions of inertia and slows down due to natural drags such as rolling drag and wind drag.

DF=0, uniform traveling forward. The right foot of the driver gently steps on the accelerator.

DF=+1 to +4, respectively corresponding to a state of slow acceleration or climbing up a slight slop with a gradient of 0-10% (+1), a state of median acceleration or climbing up a median slop with a gradient of 10-20% (+2), a state of quick acceleration or climbing up a large slop with a gradient of 20-30% (+3), and a state of rapid acceleration or climbing up a steep slop with a gradient larger than 30% (+4). The acceleration is set according to the type of automobiles and the velocity ranges, for example, for cars in the low velocity ranges, the accelerations corresponding to the above states are a=0-1 m/s$^2$, a=1-2 m/s$^2$, a=2-3 m/s$^2$, a>3 m/s$^2$, respectively.

The device of the invention is a continuously variable transmission capable of staring from 0 with four efficient transmission shifts. Hereinafter the operating manner of the transmission will be explained with reference to different working conditions.

Starting of the engine, wherein the hydraulic pump is in a zero displacement sate, the sun gear of the planetary gear train may rotate arbitrarily, and the original starter is employed to start the engine. At this time the automobile velocity is zero and the sun gear rotates reversely at high speed.

Starting and accelerating of the automobile, wherein the accelerator is stepped on, the electronic control device controls the first electromagnetic directional valve and the second electromagnetic directional valve to switch on the high pressure oilways of the first and second variable displacement hydraulic activators, and the accelerator of the automobile and the throttle of the engine are coupled in cooperation; in addition, the electronic control device obtains from universal characteristic matrix of the engine the output torque value of the engine according to the open degree of the throttle and the rotation speed of the engine, achieve the torque of the sun gear according to the torque relationship equations for the planetary gear train, and calculates the displacement value of the first variable displacement hydraulic activator under the rating pressure; the electronic control device output signals to control the variable displacement mechanism of the first variable displacement hydraulic activator, the first variable displacement hydraulic activator accordingly outputs pressurized oil, the second variable displacement hydraulic activator is driven, the torque is output, the output shaft receives both the driving torque of the planetary gear train and the torque output from the hydraulic activator, and the automobile is started and accelerated; the displacement of the second variable displacement hydraulic activator is automatically controlled by pressure in the high pressure pipelines in such a way that the displacement increases when the pressure therein increases and the displacement decreases when the pressure therein decreases, and the displacement vanishes when the pressure therein vanishes; the open degree of the throttle increases when the value of the accelerator increases, and thus the output torque increases and the rotation speed increases; the maximal torque depends on the limitations on the maximal displacement of the first variable displacement hydraulic activator 107, the maximal rotation speed and the maximal displacement of the second variable displacement hydraulic activator 108; with the automobile velocity increasing, the rotation speed of the sun gear will be decreased, by this time the second variable displacement hydraulic activator is short-circuited via the second electromagnetic directional valve, the coupling with the first electromagnetic directional valve is disconnected, and thus the sun gear is locked; the planetary gear train may also be engaged such that it becomes a rigid body for transmission.

A uniform traveling state of the automobile, wherein the automobile enters a uniform traveling state after being accelerated, the required torque and power quickly decreased; with the accelerator restoring, the speed of the engine decreases, and the displacement of the first variable displacement hydraulic activator 107 decrease accordingly; when the accelerator restores to 0, the displacements of the first and second variable displacement hydraulic activator vanish, by which time the planetary is in a free state corresponding to sliding at neutral, and the engine is standby; in order for the sun gear to be locked, the only operation is to interrupt the first variable displacement hydraulic activator 107, by this time the transmission becomes a efficient transmission mechanism with a fixed transmission ratio. During traveling at a high velocity, the planetary gear may be locked through the locker 103d, thus the planetary gear train rotates synchronously and transmits as a rigid body, resulting in a 100% the transmission efficiency.

A decelerating and braking state of the automobile, wherein the output and the input of the first and second variable displacement hydraulic activator is short-circuited, the displacement quickly vanishes, in this way the engine bears no load while braking the automobile, and therefore enters a standby state with running risk of stopping.

A reversing state of the automobile, wherein the displacement of the first variable displacement hydraulic activator 107 is shrunk, the variable displacement swash plate of the second variable displacement hydraulic activator 108 is reversed and enlarged, the second variable displacement hydraulic activator rotates reversely, and the automobile is driven to reversely travel through overcoming the positive torque from the main transmission chain, by which time the sun gear of the planetary gear train will rotate at a high speed.

Thus it can be seen that the control of the system is relatively simple, speed and torque variations can be achieved in a large range such that, at a certain speed and load state of the automobile, the engine may assume a best operating condition that is achievable. As compared with the conventional manual stepped transmission, the inventive transmission presents an equivalent efficiency; however, frequent manual operations are not required, the shifting clutch is dispensed with, thus there are no shifting impacts. In addition, the inventive transmission may well match with the dynamic characteristics of the engine. Even though the engine can not always operate in high efficiency ranges, it could reach, along a power contour line, the most economic point under this load so as to partially fulfill the energy-saving purpose, without being trapped in a dilemma of the contradiction between dynamics and economy. As compared with an automatic transmission with a hydraulic planetary gear train, the inventive transmission presents a high efficiency, is easy to control and manipulate, is smooth to shift, and is more convenient to optimally match with the dynamics of the engine. As compared with a new continuously variable transmission of a metal belt type, its speed variation range is broad, it can transfer a larger torque, its efficiency is high and its response is fast, moreover, a starting clutch is dispensed with.

Embodiment 2, a Mechanical and Hydraulic Hybrid Driving Device

Figure 9:
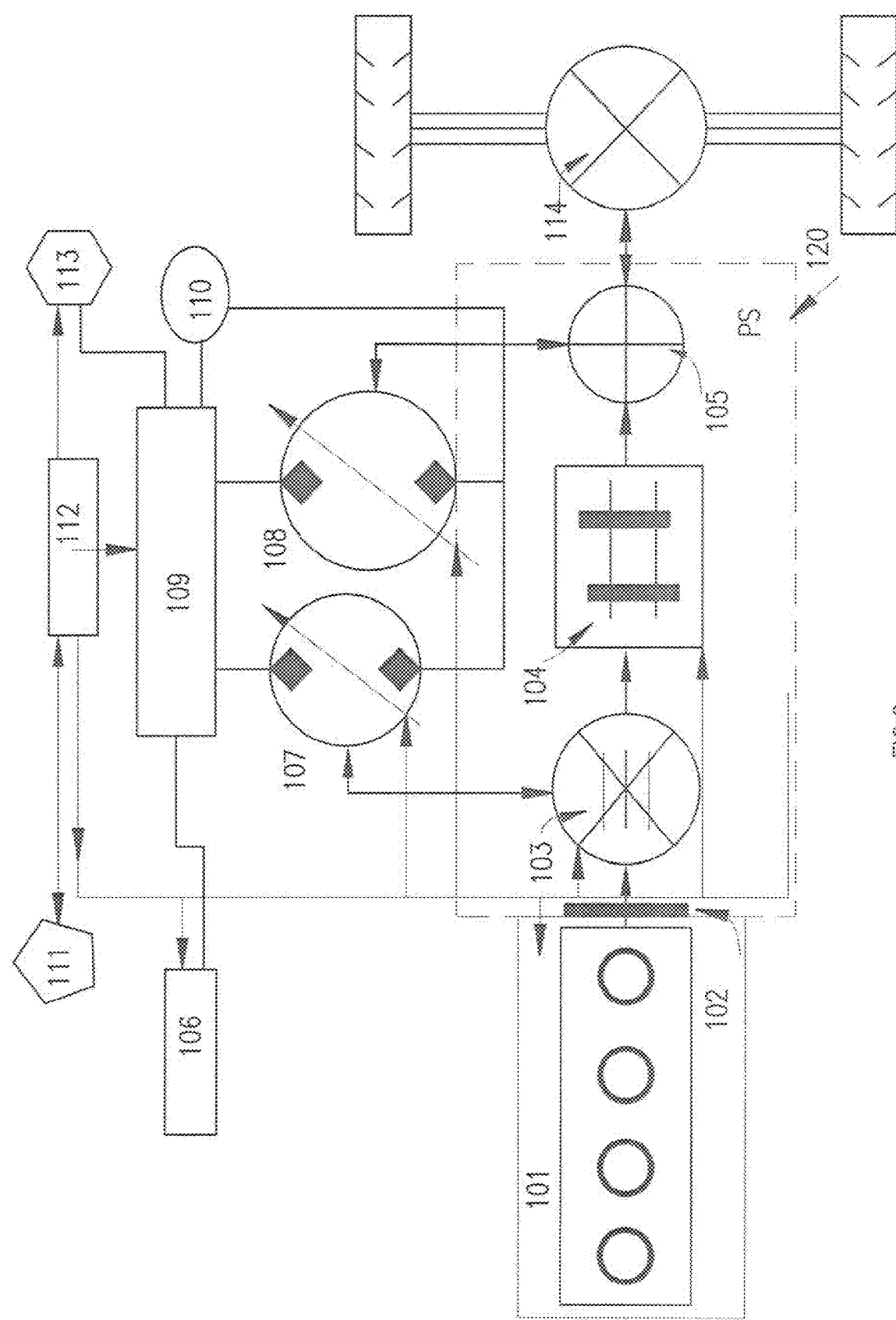
FIG. 9 is an illustration showing the principle of the continuously variable shifting and mechanical and hydraulic hybrid driving according to embodiment 2 of the invention.

As shown in FIG. 9, the device of this embodiment is mainly comprised of an internal combustion engine 101, a flying wheel 102, a differential planetary gear train 103 with a locker, a mechanical transmission mechanism 104, a power synthesizer and main reducer 105, a hydraulic energy storage 106, a first variable displacement hydraulic activator 107, a second variable displacement hydraulic activator 108, a hydraulic controller 109, a low-pressure oil tank 110, a sensing and controlling means 111, an electronic control unit 112, an accessory device 113, a differential 114 and a casing 120.

Connecting relationships of individual components of the inventive device are indicated as follows. The output shaft of the internal combustion engine 101 is fixedly connected to the input of the differential planetary gear train 103 with a locker via the flying wheel 102; the output of the differential planetary gear train 103 is fixedly connected to the input shaft of the mechanical transmission mechanism 104; the output shaft of the mechanical transmission mechanism 104 is fixedly connected to the power synthesizer and main reducer 105 and the driving mechanism 114 in this order; the control terminal of the differential planetary gear train 103 is fixedly connected to the power shaft of the first variable displacement hydraulic activator 107, and the power shaft of the second variable displacement hydraulic activator 108 is fixedly coupled to the power synthesizing shaft of the power synthesizer and main reducer 105; the flying wheel 102, the differential planetary gear train 103, the mechanical transmission mechanism 104, the power synthesizer and main reducer 105 and the portion of the differential of the driving mechanism 114 are all mounted in the casing 120.

The high pressure terminal of the first variable displacement hydraulic activator 107, the high pressure terminal of the second variable displacement hydraulic activator 108, the hydraulic mechanism of the accessory device 113 are each connected to the hydraulic energy storage 106 and the hydraulic oil tank 110 through hydraulic pipelines via the hydraulic controller 109; and the low pressure terminal of the first variable displacement hydraulic activator 107, the low pressure terminal of the second variable displacement hydraulic activator 108 and the low pressure oil tank are connected to each other through hydraulic pipelines.

The electronic control unit 112, the sensing and controlling means 111, the accessory device 113 and the all other components in the system which are necessary to be controlled are connected via signal lines or control lines.

The device according to the present invention will be grouped as four sub-systems, i.e., a mechanical system, a hydraulic system, an accessory system and an electrical control system, so as to facilitate explaining the structural principles and the operating manner of the invention in more details. In addition, the description will be given in combination with a continuously variable transmission with a mechanical two-stage transmission mechanism.

The mechanical system of the inventive device is referred to FIG. 5 and the detailed description thereof in embodiment 1.

Figure 12:
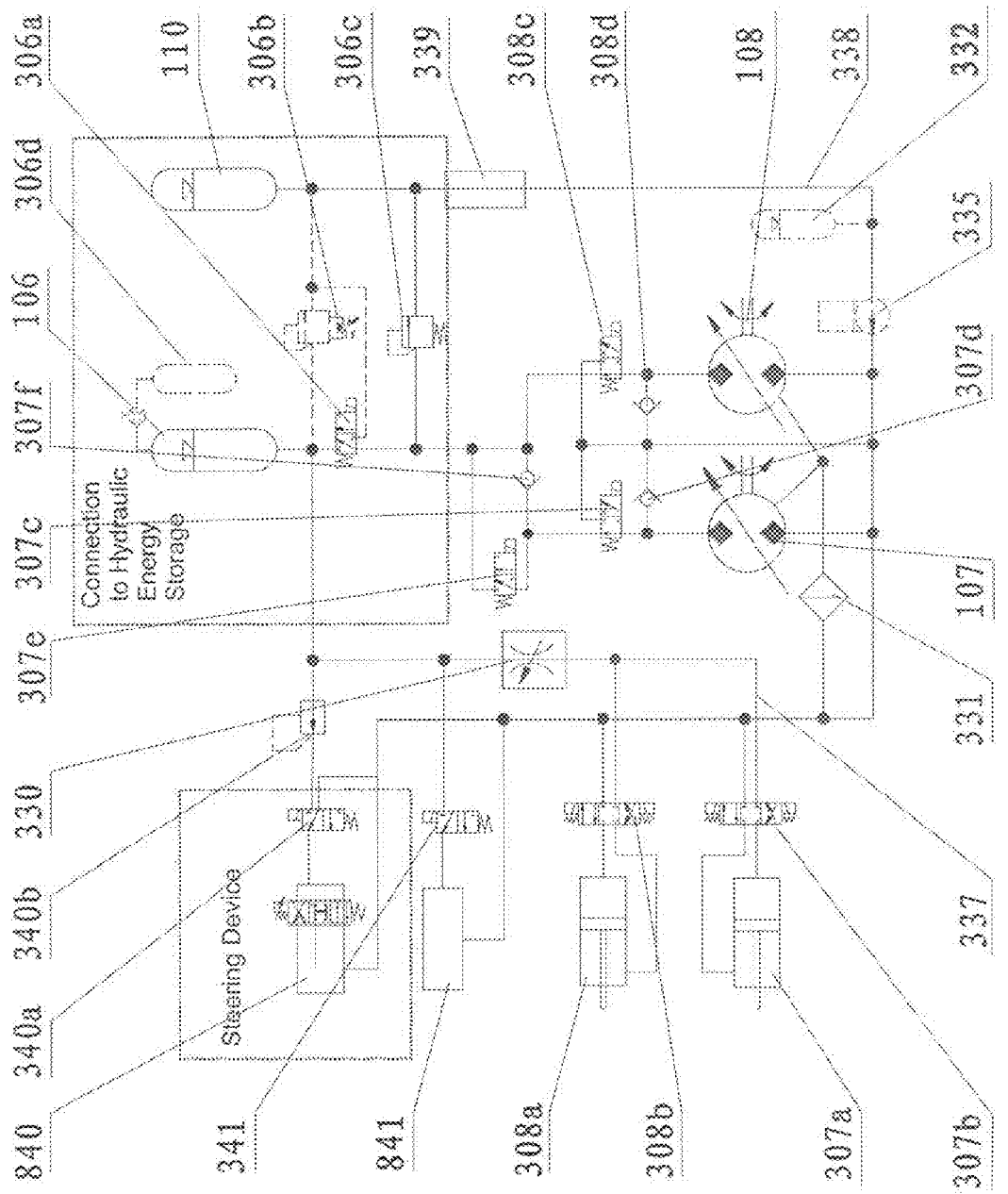
FIG. 12 is an illustration showing the hydraulic system according to embodiment 2 or 3 of the invention.

See FIG. 12 for the hydraulic system of the invention. The system includes a hydraulic energy storage 106, a first variable displacement hydraulic activator 107, a second variable displacement hydraulic activator 108, a hydraulic controller 109, a low-pressure oil tank 110 and high pressure and low pressure connection pipelines, etc.

Among these components, the first variable displacement hydraulic activator 107 and the second variable displacement hydraulic activator 108 are both duplex bidirectional variable displacement pumps/motors which may perform positive rotation and reverse rotation, and function as a pump and a motor. The rating torque of the first variable displacement hydraulic activator is 0.2 to 2 times of the rating torque of the engine, and the rating torque of the second variable displacement hydraulic activator is 0.5 to 5 times of the same. The structural characteristics thereof are referred to the descriptions in embodiment 1. The variable displacement mechanism of the first and second variable displacement hydraulic activator both employ hydraulic cylinders for driving.

The hydraulic controller 109 performs communicating, short-circuiting, interrupting, direction changing, security protecting for individual hydraulic components themselves and therebetween. See FIG. 12, the hydraulic controller 109 is comprised of several direction control valves, relief valves and connecting pipelines, that is, including a variable displacement control oil tank 307a of the first variable displacement hydraulic activator 107, an electromagnetic directional valve 307b, electromagnetic directional valves 307c, 307e and check valves 307d, 307f in the main oilway, a variable displacement control oil tank 308a of the second variable displacement hydraulic activator 108, an electromagnetic directional valve 308b, an electromagnetic directional valve 308c and a check valve 308d in the main oilway, an electromagnetic directional valve 306a, a backup safety valve (may be omitted), a relief valve 306c of the hydraulic energy storage 106, an optional air tank 306d; an electromagnetic directional valve 341 of a hydraulic air conditioner 841, a filter 331, a low pressure oil tank 110, an optional prearranged low pressure oil tank 332 and a pressurized pipe pump 335; a directional valve 340a, a relief valve 340b of the hydraulic direction-changing assisting oil tank 840, a damper 330 of the variable displacement control oilway, high pressure connection pipelines 337, low pressure pipelines 338 and radiator 339.

The electromagnetic directional valves 307c, 308c in the main oilways of the first and second variable displacement hydraulic activators are two-position three-way electromagnetic directional valves with a transfer short-circuiting function, wherein port P is connected to a high pressure source, port T is connected to a low pressure oilway, and port A is connected to a high pressure oil port of the hydraulic activator. The disconnection and connection of the electromagnets cause the high pressure oil port of the hydraulic activators to be connected to the high pressure oilway and the low pressure oilway, respectively. When being connected to the low pressure oilway, the hydraulic activator is equivalently short-circuited and unloaded. The transfer short-circuiting function of this valve, that is, port A and port B are connected with each other, suppresses the impact arising from directional changes so as to protect the hydraulic activators. In order to prevent the high pressure port of the hydraulic activators to be sucked dry, it is arranged that the inlet ports of the check valves 307d, 308d of the main oilways of the first and second variable displacement hydraulic activators are connected to the low pressure oilway, and that the outlet ports thereof are connected to the high pressure oilway. The port P of the directional valve 307e in the mail oilway of the first variable displacement hydraulic activator is connected to the high pressure oilway and port A is connected to the high pressure oil port of the first variable displacement hydraulic activator. The directional valve 307e only serves as a switch. When the valve 307e is switched on, the check valve 307f is short-circuited, thus the first variable displacement hydraulic activator may serves as a pump and a motor as well; when the valve 307e is switched off, the check valve 307f works and thus the first variable displacement hydraulic activator only serves as a pump. Provision of the valve 307e and 307f is to prevent the first variable displacement hydraulic activator from runaway or causing the engine to rotate at a high speed to damage the engine and the hydraulic activator when system control malfunctions or failures occur.

The variable displacement control directional valves 307b and 308b of the first and second variable displacement hydraulic activators are three-position four-way electromagnetic directional valves with a function of self-locking at the median position. Its port P is connected to the high pressure oilway via a damper 330, port T is connected to the low pressure oilway, and ports A and B are connected to the left and right cavities of the oil tank, respectively, such that the rotation direction, that is, positive or reverse rotation, of the variable displacement oil tank and its position may be controlled. The damper 330 is a throttling means or a speed variator with pressure compensation, which functions to adjust the dynamic response promptness of the oil tank.

The electromagnetic directional valve 306a is a specially designed structure, wherein the transfer function is of a 0 type and its restoration spring end is provided with a one-way damper to decrease the speed by which the electromagnetic valve is connected to the high pressure oilway, so as to lower hydraulic impacts.

The inlet of the oil filter 331 is connected to the oil relief port, and the outlet thereof is connected to the low pressure oilway 338. When the main low pressure oil tank is accommodated in the automobile truck, the low pressure pipelines are long; however, the pressure in the low pressure oil tank could not be too high. Therefore, the hydraulic pressure at the oil inlet port of the hydraulic activator is insufficient such that a sucking dry phenomenon tends to occur. In view of this, a low pressure oil tank 332 of a small volume is prearranged in the region close to the hydraulic activator, and is connected in the low pressure oilway. The device of the invention may also employ an open oil tank which has a small volume and a light weight. However, a centrifugal pressuring pump 335 should be additionally provided in the oil supply pipelines to ensure the hydraulic activator to suck oil reliably, which pump 335 is driven by the high pressure gear pump capable of bidirectional rotations or by a speed variation motor, and is controlled by the electronic control unit according to the operation conditions. This incurs an increased cost. In addition, in the hydraulic system, a radiator 339 should be installed to its low pressure pipelines. The radiator is cooled by the natural gas stream generated during automobile traveling, thus to maintain the temperature balance of the hydraulic oil.

The accessory system 113 of the inventive device includes a cooling and lubricating system, a hydraulic air conditioner compressor, a hydraulic direction-changing assisting system and a braking assisting system, etc.

1. The cooling and lubricating system. There is provided in the invention a lubricant pump which is driven by an electrical motor to lubricate individual components via a lubricant tank, a filter and oil pipelines, so as to cool and lubricate the planetary gear trains and mechanical transmission mechanisms and thus to ensure the device to operate properly. Among others, it is very vital to lubricate the planetary gear train. In the invention, a lubricant pathway is arranged along the central axis of the first transmission shaft, at the end of which is provided with a rotary oil tapping to be connected to the oil supply pipeline.

2. The hydraulic air conditioner compressor. In conventional automobiles, the compressor of the air conditioner is driven to operate by the engine. This is controlled via an electromagnetic clutch. Even when the automobile is stopped, the engine must operate at an idle state to drive the air conditioner. Now the efficiency of the engine is extremely low, and the temperature of the water in the engine tends to be very high. Thus the cooling fan should be started to operate from time to time, incurring an increased electricity load. The fuel consumption of the air conditioner is high, e.g., it is generally higher in case of being switched on than in the case of being switched off by 10-20%. The invention designs an air conditioner compressor that is driven by hydraulic oil, that is, by the high pressure oil in the hydraulic energy storage. The conventional air conditioner compressor may be employed, except that it is driven by the high pressure gear motor; a better solution is introduced in another invention patent of the applicant.

3. The hydraulic direction-changing assisting system. The conventional direction-changing assisting system utilizes the engine to drive the hydraulic direction-changing pump, wherein oil is supplied into the direction-changing assisting oil tank 840. However, since the hydraulic pump is directly connected to the engine, substantial hydraulic oil should be pressurized for the purpose of assisting when the automobile velocity is low, and the assisting force should be lowered when the automobile velocity is high, which is contrary to the rotation speed of the engine. Therefore, a waste is incurred in higher velocity conditions. In order to make use of the pressurized oil in the hydraulic energy storage to assist in direction-changing, only a control device is needed to be additionally provided in the system, since there is high pressure oil in the system. The technical solution thereof is introduced in another invention patent of the applicant.

4. The braking assisting system. The conventional braking assisting is realized through the vacuum generated by the intaking cycle of the engine cylinder. In the inventive device, when the automobile velocity is low, the braking torque is insufficient even there is additionally provided a hydraulic braking assisting system since the engine is allowed to shut down in part of time. Therefore the invention proposes two solutions, (1) that the prior existing vacuum assisting system remains unchanged, and an electrical vacuum pump is additionally provided which is started when the engine shuts down, and (2) that the vacuum assisting system is retrofitted to a hydraulic braking assisting system which is similar to the direction-changing assisting system, this resulting in substantially decreased dimensions.

The electronic control system of the invention consists of a sensing and controlling means 111, and an electronic control unit 112, etc.

Figure 10:
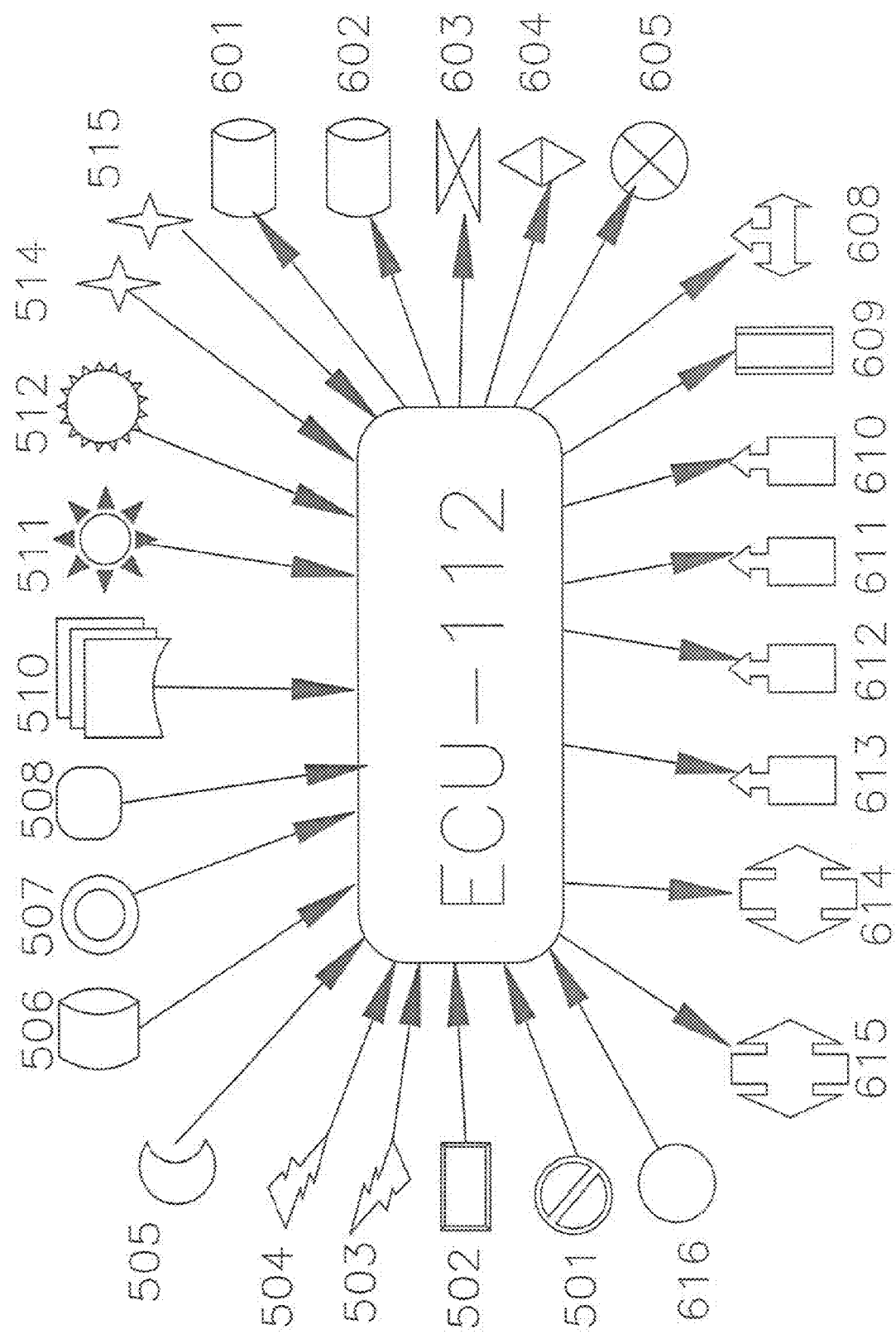
FIG. 10 is an illustration showing the control system according to embodiment 2 of the invention.

The sensing and controlling means 111 may perform pressure measuring, temperature measuring, velocity measuring and position measuring, etc. The existing sensors in the automobile may be sufficiently exploited. Its controller, i.e., the control and execution mechanism, includes a relay, electromagnets and miniature electrical motors, etc., as shown in FIG. 10.

The electronic control unit 112 is comprised of a hardware portion and a software portion. The hardware portion is a PC controller with a CPU which has multiple channels for the output and input of digital and analog variables. The electronic control unit 112 controls the operations of the overall system through the sensing and controlling means 111 collecting individual variable parameters. The software is constituted by an automatic control program and is solidified into the EPROM of the PC, as shown in FIG. 7.

The input parameters to the electronic control unit include 501, an ignition switch of an automobile, generally taking for values, capable of controlling the engine start, 502, a touch control display, illustrating system operation parameters, failure parameters and input control parameters, 503, the position of the accelerator, corresponding to the degree that a driver steps on the accelerator and taking values $DF=-1, 0, 1, 2, 3, 4$, wherein $-1$ represents that the left foot of the driver is taken away from the accelerator, 0 represents gentle stepping on the accelerator, and 4 represents stepping on the accelerator to the full, 504, the position of the hydraulic braking assisting pedal on which the left foot of the driver steps, the system calculates the displacement setting of the second variable displacement hydraulic activator according to the pressure of the hydraulic energy storage and this position, 505, a mechanical braking pedal on which the driver's right foot steps, 506, the velocity of the automobile, 507, the rotation speed of the engine, 508, the pressure of the hydraulic energy storage, 510, the universal characteristic profile of the engine, 511, the lubricant pressure, 512, the temperature of the cooling water of the engine, 514, the displacement of the first variable displacement hydraulic activator, 515, the displacement of the second variable displacement hydraulic activator, and 516, the throttle position of the engine, Herein, when the required driving force/braking force, that is, the DF value is to be determined from the positions of the accelerator and the accessory braking pedal, a correction value indicating the stepping speed at these positions should be additionally considered, that is, in the current position range, the DF value should be increased or reduced according to the stepping speed to manifest the true power requirement of the driver.

The universal characteristic profile of an engine, which is solidified in the EPROM, is a universal characteristic matrix specific to the engine. The CPU of the PC obtains the output torque from the matrix on the basis of the rotation speed of the engine and the open degree of the throttle so as to calculate matched displacements of the variable displacement hydraulic pumps.

The output control of the electronic control system includes 601, the electrical motor of the lubricant pump, 602, starting the electrical motor, 603, the directional valve of the hydraulic air conditioner compressor, 604, the braking assister, 605, the directional valve of the hydraulic direction-changing assister, 608, the electromagnetic tooth-embedded type variable clutch, 609, the electromagnetic clutching locker 103d of the planetary gear, 610, the valve 306a for the hydraulic energy storage, 611, the directional valve 307c in the main oilway of the first variable displacement hydraulic activator, 612, the directional valve 307e in the main oilway of the first variable displacement hydraulic activator, 613, the directional valve 308c in the main oilway of the second variable displacement hydraulic activator, 614, the control directional valve 307b of the variable displacement oil tank of the first variable displacement hydraulic activator, 615, the control directional valve 308b of the variable displacement oil tank of the second variable displacement hydraulic activator, and 616, the control motor for the engine throttle.

The control software of the inventive device includes 32 program modules, and the flow block diagram is illustrated in FIG. 7. The functions of individual modules are as follows.

701, the ignition switch switching from 0 to 1 and the control system being powered to start, 702, the system starting ID input via either a password manner or a fingerprint manner, 703, the system determining the validness of ID, if valid, then turning to 705, if invalid, then turning to 704, the system prompting to input again; the system being switched off after 3 invalid tries;

704, the system being switched off and stopping operation, being capable of triggering a worn, such as an audio alarm or a short message alarm, 705, the ignition switch switching from 1 to 2, the system being initialized and tested, individual input variable parameters being checked, 706, if the temperature of the cooling water of the engine being lower than a setting valve, then turning to 707, if higher than the setting value, then turning to 709, 707, short-circuiting the first and second variable displacement hydraulic activators, that is Vf, Vs=0; and the electric motor being switched off, Em=0, 708, starting the engine in a first starting manner, ICE on1 entering the state of engine warming, 709, the engine finishing warming, and the system prompting to input choice "drive-D" or "reverse-R", 710, if inputting choice "reverse-R", the system determining the driving mode according to the energy stored in the hydraulic energy storage, 711, if the energy stored in the hydraulic energy storage is higher than a given value, then the automobile being driven to reverse through the second variable displacement hydraulic activator/electrical motor rotating reversely, R1, 712, if the energy stored in the hydraulic energy storage is lower than a given value, then the automobile being driven to reverse by starting/incorporating the engine, R2, 713, if inputting choice "drive-D", then the system transiting in combination and the process turning to 714, 714, determining the velocity V of the automobile which may be divided into three ranges, that is, a low velocity range, a median velocity range and a high velocity range. The division of the velocity ranges may be set according to different automobile models and different road conditions in different countries. For example, for cars, the low velocity range may be set as V=0-60 km/h, the median velocity range may be set as V=60-125 km/h, and the high velocity range may be set as V>125 km/h, 715, the low velocity range, entering a circulatory operation mode, the system setting CS into two states, 0-1, according to whether the engine participates in the driving, that is, CS=0, which indicates that the engine shuts down or is in a low speed idle state, and does not participate in driving, and CS=1, which indicates that the engine operates and participates in driving, 716, the state of CS=0, the system, according to the position of the accelerator and its speed and the positions of the accessory hydraulic braking pedal and mechanical braking pedal, calculates the driving force or the braking force and chooses the driving mode or the braking mode, 717, determining whether to switch the states according to the outputs from 721 and 722, the system transiting in combination and the process proceeding to 730, 718, the state of CS=1, the system, according to the position of the accelerator and its speed and the positions of the accessory hydraulic braking pedal and mechanical braking pedal, calculates the driving force or the braking force and chooses the driving mode or the braking mode, 719, the median velocity range, the system, according to the position of the accelerator and its speed and the positions of the accessory hydraulic braking pedal and mechanical braking pedal, calculates the driving force or braking force, and chooses the driving mode or the braking mode, 720, the high velocity range, the system, according to the position of the accelerator and its speed and the positions of the accessory hydraulic braking pedal and mechanical braking pedal, calculates the driving force or braking force, and chooses the driving mode or the braking mode, 721, at the state of CS=0, the system operates 8 different driving modes or braking modes according to magnitude of the driving force or the braking force; in addition, the system automatically proceeds to 717 when the energy-storing parameter of the system decreases to a level that can not match the requirement from the driving force, 722, at the state of CS=1, the system operates 8 different driving modes or braking modes according to the magnitude of the driving force or the braking force; in addition, the system automatically proceeds to 717 when the energy-storing parameter of the system increases beyond a given value, 723, the medial velocity range, the system operates 8 different driving modes or braking modes according to the magnitude of the driving force or the braking force, 724, the high velocity range, the system operates 8 different driving modes or braking modes according to the magnitude of the driving force or the braking force, 725, the engine shutdown process, ICB Off, stop supplying the engine with power or fuel, 726, the engine starting process 1, that is, starting in an electrical manner, ICE on-1, starting the electrical motor to start the engine, 727, the engine starting process 2, that is, starting in a hydraulic manner, ICE on-2, starting the engine via the first variable displacement hydraulic activator, 728, determining the engine starting mode mainly according to the pressure of the hydraulic energy storage; if there is only a one-stage transmission in the mechanical transmission mechanism, the limitation from the minimal velocity Vo should be imposed when there is no neutral shift, that is, the rotation speed of the first transmission shaft at this velocity Vo should be larger than the minimal ignition rotation speed of the engine, which is generally higher than 300 rpm. If the automobile velocity V<Vo or the automobile is in a starting state, then proceeding to 726; if the automobile velocity V>Vo, then proceeding to 727. If the mechanical transmission mechanism is a multi-stage transmission with a neutral shift, then the engine may be started through a hydraulic manner if only there is energy stored in the hydraulic energy storage.

729, a module of state switching and combinational transiting,

730, a module of state switching and combinational transiting,

731, an emergency treatment and failure diagnosis process module, and

732, the system parameter setting module.

In different states and different velocity ranges, the power requirement DF is further divided into 8 modes, that is, DF=−3, mechanical and hydraulic combined braking state, that is, the right foot of the driver steps on the mechanical braking pedal and the left foot thereof steps on the accessory hydraulic braking pedal; this mode is generally employed in an emergency braking situation.

DF=−2, braking with hydraulic assist, the right foot of the driver is taken away from the accelerator, the left foot thereof steps on the accessory braking pedal; this mode is generally employed in a typical braking situation. In a traffic jam in which the automobile travels at a low velocity, it is avoided that the driver's right foot steps on the brake repeatedly.

DF=−1, sliding at neutral, the right foot of the driver is taken away from the accelerator and the automobile maintains a motion under the effect of inertia and slows down due to natural drags such as rolling drag and wind drag.

DF=0, uniform traveling forward, the right foot of the driver gently steps on the accelerator.

DF=+1 to +4, respectively corresponding to a state of slow acceleration or climbing up a slight slop with a gradient of 0-10% (+1), a state of median acceleration or climbing up a median slop with a gradient of 10-20% (+2), a state of quick acceleration or climbing up a large slop with a gradient of 20-30% (+3), and a state of rapid acceleration or climbing up a steep slop with a gradient larger than 30% (+4). The acceleration is set according to the type of automobiles and the velocity ranges, for example, for cars in the low velocity ranges, the accelerations corresponding to the above states are $a=0-1$ m/s$^2$, $a=1-2$ m/s$^2$, $a=2-3$ m/s$^2$, $a>3$ m/s$^2$, respectively.

In order to carry out the above 8 power requirement modes in 4 operating conditions, individual mechanisms should be cooperatively controlled. There are 7 energy stream links which are constituted by the mechanical system, the hydraulic system of the inventive device and the connection relationships thereof, as shown in FIG. 9. Hereinafter, the explanations will be given to the characteristics and the realization manners of individual energy stream links in combination with the embodiment.

1. A Main Transmission Link, 101-102-103-104-105-114

A typical internal combustion engine itself presents a speed variation characteristic that the toque is approximately constant in the range from the idle state to the maximal rotation speed. In the present invention, there is additionally provided a two-stage transmission, that is, a continuously variable power split transmission and a mechanical transmission mechanism, and thus an efficient main transmission link with four nodes is constituted.

1) a low speed shift, the mechanical transmission mechanism is set at shift 1, such as a 1:1 transmission; at this time, if the locker 103*d* of the planetary gear train is released and the displacement of the first variable displacement hydraulic activator 107 is increased, the first variable displacement hydraulic activator slows down and automatically brakes under the pressure of the hydraulic energy storage 106. In this way, the sun gear of the planetary gear train is locked, and the planetary gear train slows down and output an increased torque. Thus, the overall transmission functions to reduce speed and output an increased torque. This is the speed reduction node 1; if the locker 103*d* of the planetary gear train is locked, the planetary gear train becomes a rigid body and transmission is carried out directly. Thus the overall transmission becomes a direct transmission shift, and this is the node 2.

2) a high speed shift, the mechanical transmission mechanism is set at shift 2, such as a 1:2 transmission with speed increasing; the planetary gear train can operate in two modes as well, that is, a mode in which the sun gear is braked to slow down and the torque is increased, and a mode in which the planetary gear train is locked so as to carry out transmission directly as a rigid body. In other words, two pure mechanical gearing transmission nodes 3 and 4 are formed additionally, which indicate a smaller and a larger speed increasing ratios of the overall speed variator, respectively.

The properly designed transmission ratios and switching speeds of these four nodes, with the continuously variable power split transmission and the speed variation capacity of the engine at high rotation speeds, enables the invention to realize an efficient transmission for all velocity ranges.

2. Storing Energy by the First Variable Displacement Hydraulic Activator: 101-102-103-107-109-106

The engine is operating. According to the state of the planetary gear and the configuration of the mechanical shifting mechanism, there are two ways of storing energy. In one of them, the locker of the planetary gear 103*d* is released and the mechanical shifting mechanism 104 is engaged; the planetary gear train transmits the power to the planet bracket and the sun gear while the engine drives the toothed ring to rotate; the sun gear will rotate reversely to drive the first variable displacement hydraulic activator, which functions as a pump, to pump out high pressure oil; the oil enters the hydraulic energy storage to be stored therein through the high pressure oilways which are switched on by means of directional valves 306*a* and 307*c*. In the other way, the locker of the planetary gear is locked, and the mechanical shifting mechanism is engaged or disengaged, the engine drives the planetary gear train to rotate in the same direction as a rigid body, and at the same time also transmit the power to the planet bracket and the sun gear; thus the first variable displacement hydraulic activator pumps out high pressure oil, which enters the hydraulic energy storage to be stored therein. The first way may be employed in states of low and median speeds, and the second way may be employed in state of high speeds.

3. Storing Energy by the Second Variable Displacement Hydraulic Activator: 101-102-103-104-105-108-109-106

When the automobile is driven to travel forward by the engine through the main transmission link, the energy storing may be carried out if only the second variable displacement hydraulic activator is set in an operating state as a pump and the high pressure oilways are switched on.

4. Hydraulic Driving with Torque Variation and Speed Adjustment, 101-102-103-107-109-108-105-114

In this link, the first variable displacement hydraulic activator 107 is set in a pump state and the second variable displacement hydraulic activator 108 is set in a motor state when the engine is operating; the directional valve 306*a* of the hydraulic energy storage is switched off to shunt the influence from the energy storing state of the hydraulic energy storage; the operating pressure of the variable displacement hydraulic activator may rise up to the setting value of the relief valve 306b so as to carry out large-torque transmission with speed adjustment.

5. Hydraulic Regeneration of Braking Energy, 114-105-108-109-106

The first variable displacement hydraulic activator 107 is short-circuited by means of the directional valve 307c, and the second variable displacement hydraulic activator 108 is set in a pump state; under the action of the automobile inertia, the high pressure oilway and the oilway of the hydraulic energy storage are switched on by means of directional valves 308c and 306a so as to transfer the kinetic energy of the automobile into hydraulic energy to be regenerated.

6. Driving Via the First Variable Displacement Hydraulic Activator, 106-109-107-103-104-105-114

There are two manners depending on whether the engine is operating. In the first manner, the engine is operating, the locker 103d of the planetary gear train is locked, and the mechanical transmission mechanism is engaged; the high pressure oilways of the first variable displacement hydraulic activator 107 are switched on through the valves 306a, 307c and 307e; and the first variable displacement hydraulic activator rotates as a motor under the actions of the higher pressure oil such that it serves to increase the torque. In the second manner, the engine shuts down; the locker of the planetary gear train is released, the mechanical transmission mechanism is engaged, and the high pressure oilways are switched on; the first variable displacement hydraulic activator rotates as a motor under the actions of higher pressure oil; since the engine could not rotate reversely due to the braking of the one-way clutch, the torque output of the first variable displacement hydraulic activator is enlarged by the planetary gear, thus resulting in a more significantly increased torque than in the case of the first manner. The first manner is generally employed in the high speed states and the second manner is adopted in the low speed states in which a large torque output is needed.

7. Driving Via the Second Variable Displacement Hydraulic Activator, 106-109-108-105-114

The high pressure oilways of the second variable displacement hydraulic activator 108 are switched on through the directional valves 306a and 308c, and the second variable displacement hydraulic activator, which is operating as a motor, drives the automobile to travel forward under the actions of the high pressure oil.

Various operating modes of the invention may be realized through employing the above energy stream links individually or in combination in different operating conditions by means of the electronic control unit 112, the hydraulic controller 109 and the power controller 118.

Hereinafter, the descriptions will be given to the state CS in different states, the realization methods of 8 different driving modes and the starting of the engine ICE on-1 and ICE on-2 in different velocity ranges, and the reverse mode R1 and R2 of the automobiles.

Engine starting mode 1—starting through an electrical manner, ICE on-1. In any case, the first variable displacement hydraulic activator 107 is short-circuited to be idle through the directional valve 307c, the locker 103 of the planetary gear train is released, and the starter motor is started to drive the flying wheel of the engine to rotate, so as to start the engine.

Engine starting mode 2—starting through a hydraulic manner, ICE on-2. When there is energy stored in the hydraulic energy storage 106 and, if the transmission is a one-stage transmission, the automobile velocity is required to be larger than Vo, the locker 103d of the planetary gear train is engaged and locked, and the directional valve 306a of the hydraulic energy storage 106 is switched on; the directional valve 307c switches on the high pressure oilways of the first variable displacement hydraulic activator 107, the valve 307e is engaged, that is, the first variable displacement hydraulic activator 107 is set as a variable displacement motor; the oil tank adjusts, through the variable displacement control of the first variable displacement hydraulic activator, the variable displacement swash plate to rotate in the direction of starting the engine under the driving of the high pressure oil; since the planetary gear train rotates as a rigid body at this time, the toothed ring thereof drives the engine to rotate to start. When the starting is completed, the locker 103d of the planetary gear train is released, the directional valve 307e is switched off and the first variable displacement hydraulic activator 107 is returned to a pump state.

Automobile reversing mode R1. There is a certain amount of high pressure oil in the hydraulic energy storage, and the engine 101 is not necessary to start. The mechanical transmission mechanism is arranged at the neutral, the first variable displacement hydraulic activator is short-circuited, and the high pressure oilways of the second variable displacement hydraulic activator 108 is switched on through the directional valve 308c, and its variable displacement controller is adjusted to make it rotate reversely. In this way the automobile is driven to reverse. In most cases, the reversing distance is only a few meters to tens of meters, and thus the required energy is very small. This reversing mode is employed in general.

Automobile reversing mode R2. There is no sufficient high pressure oil in the hydraulic energy storage, the mechanical transmission mechanism is arranged at the neutral, and the engine is started through the first starting mode. Then the locker of the planetary gear train is locked. The directional valve 307c and 308c switch on the high pressure oilways of the first variable displacement hydraulic activator 107 and the second variable displacement hydraulic activator 108, respectively. The first variable displacement hydraulic activator operates as a pump under the driving of the engine and output the high pressure oil to the second variable displacement hydraulic activator 108. The variable displacement controller of the second variable displacement hydraulic activator 108 is adjusted such that it rotates reversely and drives the automobile to reverse. This situation works at the initial starting time of the automobile in each day.

DF=−3, mechanical and hydraulic combined braking state. In emergency, the right foot of the driver steps on the braking pedal and the left foot thereof steps on the accessory hydraulic braking pedal, in this way the mechanical braking functions; at the same time, the directional valve 306a of the hydraulic energy storage 106 is switched on, the locker 103d of the planetary gear train is released and the directional valve 307c short-circuits the first variable displacement hydraulic activator 107; the directional valve 308c switches on the high pressure oilways of the second variable displacement hydraulic activator 108, the variable displacement controller of the second variable displacement hydraulic activator 108 is adjusted such that it operates as a pump with a large displacement. In this way it functions to brake in an accessory manner and the kinetic energy of the automobile is transferred to hydraulic energy.

DF=−2, accessory hydraulic braking. Only the left foot steps on the accessory hydraulic braking pedal, and the mechanical braking is not required. The hydraulic braking manner is similar to the case of DF=−3.

DF=−1, sliding at neutral shift. The engine is idle or shuts down at low speeds. The directional valve 307c short-circuits the first variable displacement hydraulic activator 107, and the directional valve 308c short-circuits the second variable displacement hydraulic activator 108, thus the automobile slides at neutral.

DF=0, uniform traveling forward. In low velocity ranges, if CS=0, that is, the engine does not operate, it is sufficient to be driven by the hydraulic activators since the required power is low. If CS=1 (that is, the engine operates) and the automobile is in median or high velocity ranges, the main transmission link of the engine is employed, in cooperation with the energy-storing link(s) of the first and/or second hydraulic activator. In this way the marginal mechanical energy generated when the opening degree of the engine throttle is large is absorbed while the automobile is maintained to travel forward uniformly.

DF=+1. In low velocity ranges, when CS=0, that is, the engine does not operate, the second variable displacement hydraulic activator 108 is employed to drive. When CS=1, that is, the engine operates, for low velocity ranges, the main transmission link is employed for transmission and also employed is the first manner of storing energy by the first variable displacement hydraulic activator, and for median and high velocity ranges, the main transmission link is employed for transmission and also employed is the second manner of storing energy by the first variable displacement hydraulic activator.

DF=+2. In low velocity ranges, when CS=0, that is, the engine does not operate, the second variable displacement hydraulic activator is employed for driving. When CS=1, that is, the engine operates, for low velocity ranges, the main transmission link is employed for transmission and also employed is the first manner of storing energy by the first variable displacement hydraulic activator and the manner of storing energy by the second variable displacement hydraulic activator 108, and for median and high velocity ranges, the main transmission link is employed for transmission.

DF=+3. In low velocity ranges, when CS=0, that is, the engine does not operate, the second variable displacement hydraulic activator is employed for driving and also employed is the second manner of storing energy by the first variable displacement hydraulic activator. When CS=1, that is, the engine operates, for low velocity ranges, the main transmission link is employed for transmission and also employed is hydraulic transmission with torque variation and speed adjustment, and for median and high velocity ranges, the main transmission link is employed for transmission and the first and second variable displacement hydraulic activators are used for driving.

DF=+4. In low velocity ranges, when CS=0, that is, the engine does not operate, the power requirement could no be met, therefore the engine has to be started. When CS=1, that is, the engine operates, for low velocity ranges, the high speed main transmission link of the engine and the hydraulic transmission of torque variation and speed adjustment are employed for transmission, and for median and high velocity ranges, the high speed main transmission link of the engine (in lower shifts and speeds, with an increased torque) is employed for transmission and the first and second variable displacement hydraulic activators are used for driving.

The main operating mechanisms of the invention include a mechanism in high velocity road conditions and a mechanism in city road conditions.

1. High velocity road condition. Take a complete cycle, e.g., accelerating, then traveling at a uniform velocity, and then slowing down, of the automobile at CS=1 (that is, in the case that the engine operates) as an example to explain the mechanism in this condition.

The mechanical transmission mechanism is set at low shifts during the period of automobile starting (from 0) and accelerating (from a lower velocity to a higher velocity);

Starting and accelerating. The initial velocity of the automobile is 0, the planet bracket 103b of the planetary gear train is stationary, and the mechanical power of the engine drives the toothed ring 103c of the planetary gear train to rotate positively; then the locker of the planetary gear is released, the sun gear 103a rotates reversely, the open degree of the engine throttle is enlarged, the first variable displacement hydraulic activator 107 is set in a pump state and is connected to the high pressure oilways, and thus it supplies the sun gear with braking torque while it outputs hydraulic energy. In this way, a positive driving torque is generated on the planet bracket 103b and the automobile is driven to start by the mechanical transmission mechanism 104, this is the main transmission link. Meanwhile, according to the DF value required by the acceleration set by the driver, there is incorporated an additional power of the second variable displacement hydraulic activator, and the open degree of the engine throttle, the displacements of the first and second variable displacement hydraulic activators are cooperatively adjusted. In this way, the torque output of the system may be adjusted and the automobile may be started at different accelerations. With the automobile velocity increasing, the rotation speed of the sun gear 103a is decreased progressively to 0; the displacement of the first variable displacement hydraulic activator is increased, and the sun gear is locked, thus the main transmission link operates to drive at the pure mechanical transmission node 1 (which is equivalent to the shifts 2-3 in the conventional transmission); with the rotation speed further increasing, the locker of the planetary gear is locked, and the main transmission link operates to drive at the pure mechanical transmission node 2 (which is equivalent to the shift 4 in the conventional transmission).

When the rotation speed increases to a certain value, the driver is taken away from the accelerator, the engine is idle, the overrunning clutch of the mechanical transmission mechanism operates, and the main transmission link is unloaded. At this time, if the automobile is in the median or high velocity ranges, the system will automatically set the mechanical shifting mechanism at higher shifts, the main transmission link carries out transmission at node 3 or node 4, with aid of torque variation and power variation of the hydraulic activators, thus the automobile is driven to travel forward at a uniform velocity. Since it is only necessary to release the locker of the planetary gear train when the velocity improvement ratio is increased from node 3 to node 4, and at this time the transmission torque is relatively low, it is easy for the locker to be engaged. When the automobile is accelerated during the time that the velocity improvement is decreased from node 4 to node 3, it is only necessary to release the locker of the planetary gear train, by which time the engine may be smoothly incorporated at the acceleration state. In the median and high velocity ranges, the speed ration switch is realized through the engagement and disengagement of the locker of the planetary gear train, and thus is very convenient. In addition, neither the shift switching of the mechanical transmission mechanism nor the interruption of the transmission link is necessary, thus is very smooth.

Deceleration. According to the driver's intentions, braking and deceleration is realized by means of the second variable displacement hydraulic activator, and the mechanical energy is partially regenerated.

2. City road condition. The driving via mechanical and hydraulic hybrid cycle is employed in city road conditions or in case of traffic jams on the high roads.

The manner of starting and accelerating is similar to that in the case of high velocity road conditions. However, in general, the automobile will travel at a uniform velocity or decelerate when just a relatively low velocity is reached, and thus the acceleration time is short. The engine is allowed to continue to operate at the minimal rotation speed (which is in an efficient range) for several minutes, during which time the excessive mechanical energy is transferred into hydraulic energy to be stored while the mechanical energy is output to drive the automobile to travel forward. Then the engine shuts down, and the automobile is driven to travel forward only by the hydraulic motors until the energy stored in the system is not sufficient to meet the power requirements from the driver, by which time the engine is started and the power therefrom is incorporated in an automatic manner, and thus a new hybrid cycle starts. The criterion, based on which the cycle switching is performed, is the comparison between the maximal power output and the power requirement obtained from the energy-storing state of the system. All these control parameters may be measured inside the system, which is different from the velocity control method employed in the prior art mechanical and electrical hybrid approach in which the switching depends on the parameters that vary randomly, such as the automobile velocity and the idle time. This leads to a relatively simple control system. The cell pile may assume a plug-in mode. It is not necessary to charge the cell pile over a limited distance.

Deceleration. The braking and deceleration is carried out mainly through the second variable displacement hydraulic activator, and most mechanical energy is regenerated.

In city road conditions, the energy consumption per kilometer is 354.4 kj. The engine operates at the low rotation speed range of 1200-1500 rpm (which is of high efficiency). While the automobile is driven to travel forward, the hydraulic energy, whose working volume is 50 L and maximal working pressure is 30 MPa, is stored and amounts to 400-450 kj in about one minute. At this time the engine shuts down, and the automobile is driven through the hydraulic manner to travel over 1.1-1.3 km, which will takes 2 minutes or so. Then, when the automobile is accelerated for a second time, the engine is started such that a new cycle begins. The automobile travels over 2.0 km in each cycle, including the distance of 0.6-0.8 km traveled during the period that the automobile is driven by the engine. A cycle lasts for 3-4 minutes, excluding the time period of stopping. The overall energy consumption per 100 kilometers is 35.4 Mj, 40% of which is directly provided by the main transmission link and 60% of which is provided by the hydraulic energy. The efficiency of the hybrid driving system is 81%, and the efficiency of the engine at 80% load is 28%, such that the overall efficiency of the engine and the hybrid transmission system is 28%×81%=22.68%. Recalling the specific energy of the oil, 33 Mj, the fuel consumption per 100 kilometers is then given by 35.4/33/22.68%=4.7 L, which results in a reduction of 40%-50% as compared with the conventional driving mode.

In high velocity road conditions, the hydraulic system functions as a torque and power storage that may be incorporated into the system at any time. Thus, the engine may efficiently operate in the condition of higher loads, and it is not necessary to sacrifice economy in order to ensure the dynamic characteristics of the automobile. In this way, the inventive devices (both the engine and the variator) present a maximal efficiency.

The hydraulic energy storage has relative large dimensions, thus it may be installed in the trunk, similar to the case in which the natural gas tank is accommodated in the Taxis. The hydraulic oil tank will also occupy space. It may be formed as the base of the hydraulic energy storage or make use of the space for the backup tires so as to save space. In addition, the hydraulic system assumes a closed form, and the pressure therein is maintained at 0.1-1.0 Mpa via the gas pressure inside the airbag in the low pressure oil tank.

Figure 11:
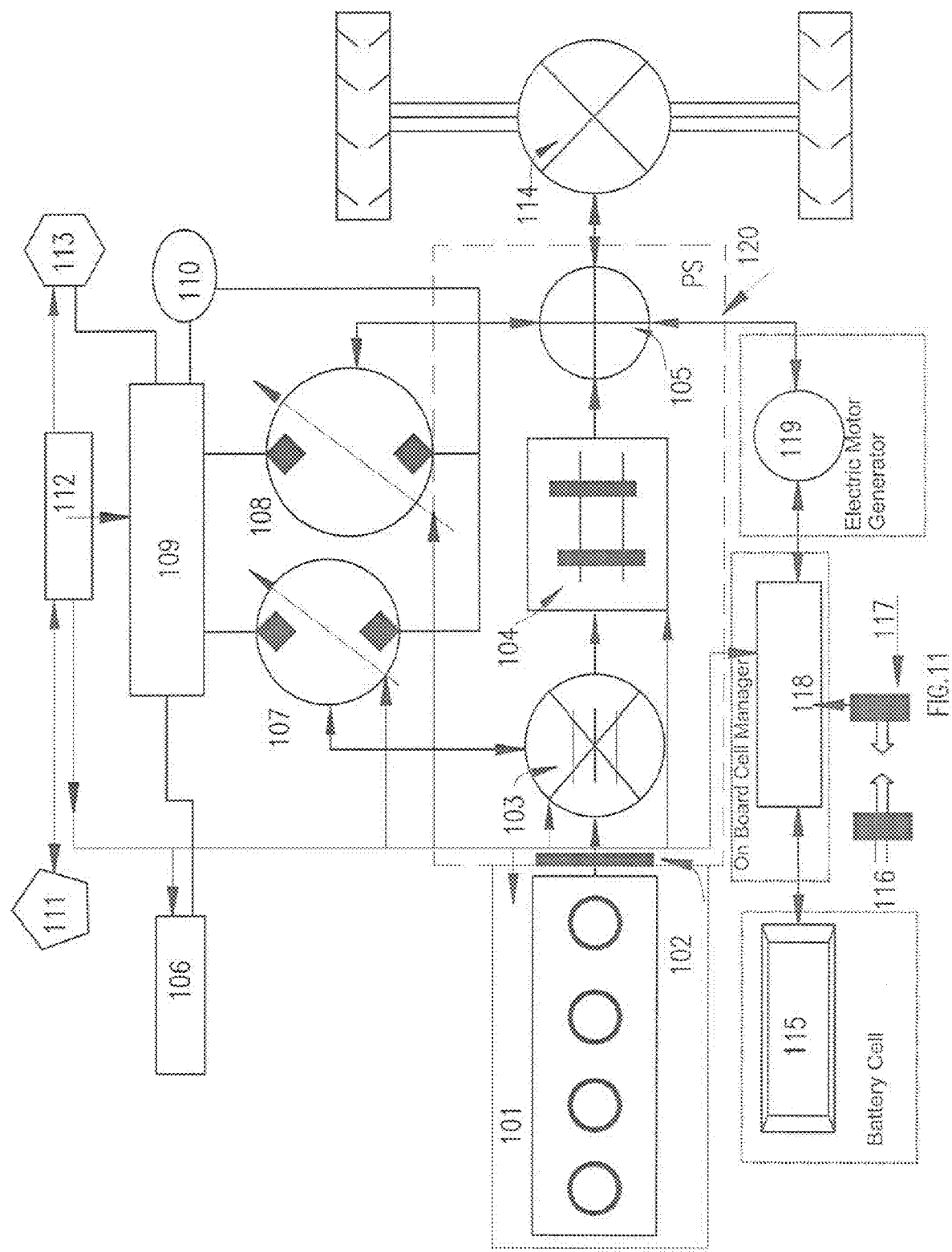
FIG. 11 is an illustration showing the principle of continuously variable shifting and mechanical and hydraulic hybrid driving according to embodiment 3 of the invention.

Embodiment 3, a Mechanical Electrical Hybrid Continuously Variable Shifting Power Driving System As shown in FIG. 11, the device of this embodiment is mainly comprised of an internal combustion engine 101, a flying wheel 102, a differential planetary gear train 103, a mechanical transmission mechanism 104, a power synthesizer and main reducer 105, a hydraulic energy storage 106, a first variable displacement hydraulic activator 107, a second variable displacement hydraulic activator 108, a hydraulic controller 109, a low-pressure oil tank 110, a sensing and controlling means 111, an electronic control unit 112, an accessory device 113, a differential 114, a power cell pile 115, a plug-in power supply 116, an smart onboard charger 117, a power controller 118, an electrical motor/generator 119 and a casing 120.

Connecting relationships of individual components of the inventive device are indicated as follows. The output shaft of the internal combustion engine 101 is fixedly connected to the input of the differential planetary gear train 103 via the flying wheel 102; the output of the differential planetary gear train 103 is fixedly connected to the input shaft of the mechanical transmission mechanism 104; the output shaft of the transmission mechanism 104 is fixedly connected to the power synthesizer and main reducer 105 and the driving mechanism 114 in this order; the control terminal of the differential planetary gear train 103 is fixedly connected to the power shaft of the first variable displacement hydraulic activator 107, and the power shaft of the second variable displacement hydraulic activator 108 is fixedly coupled to the power synthesizing shaft of the power synthesizer and main reducer 105; the connection location of the electrical motor/generator 119 varies with the characteristics of the chosen motor. It may be fixedly coupled to the power synthesizing shaft of the power synthesizer and main reducer 105, be fixedly connected to the control terminal or the output of the differential planetary gear train 103, or be arranged on the front and rear tires via the hub motors, or the components to be connected may be chosen in different working conditions via a clutch; the flying wheel 102, the differential planetary gear train 103, the mechanical transmission mechanism 104, the power synthesizer and main reducer 105 and the portion of the differential of the driving mechanism 114 are all mounted in the casing 120.

The high pressure terminal of the first variable displacement hydraulic activator 107, the high pressure terminal of the second variable displacement hydraulic activator 108, the hydraulic mechanism of the accessory device 113 are each connected to the hydraulic energy storage 106 and the hydraulic oil tank 110 through hydraulic pipelines via the hydraulic controller 109; and the low pressure terminal of the first variable displacement hydraulic activator 107, the low pressure terminal of the second variable displacement hydraulic activator 108 and the low pressure oil tank are connected to each other through hydraulic pipelines The electrical motor/generator 119 is electrically connected to the power controller 118 via cables. The power controller is connected to both the cell pile 115 and the smart onboard charger 117 via cables. The plugs of the smart onboard charger and the plug-in power supply 116 form a pluggable connection. The electronic control unit 112, the sensing and controlling means 111, the accessory device 113 and the all other components in the system which are necessary to be controlled are connected via signal lines or control lines.

The device according to the present invention will be grouped as four sub-systems, i.e., a mechanical system, a hydraulic system, an accessory system and an electrical control system, so as to facilitate explaining the structural principles and the operating manner of the invention in more detail, and the description will be given in combination with embodiment 2.

The mechanical system and the hydraulic system are the same as those in embodiment 2, as can been see from FIGS. 5, 9 and 12.

Figure 13:
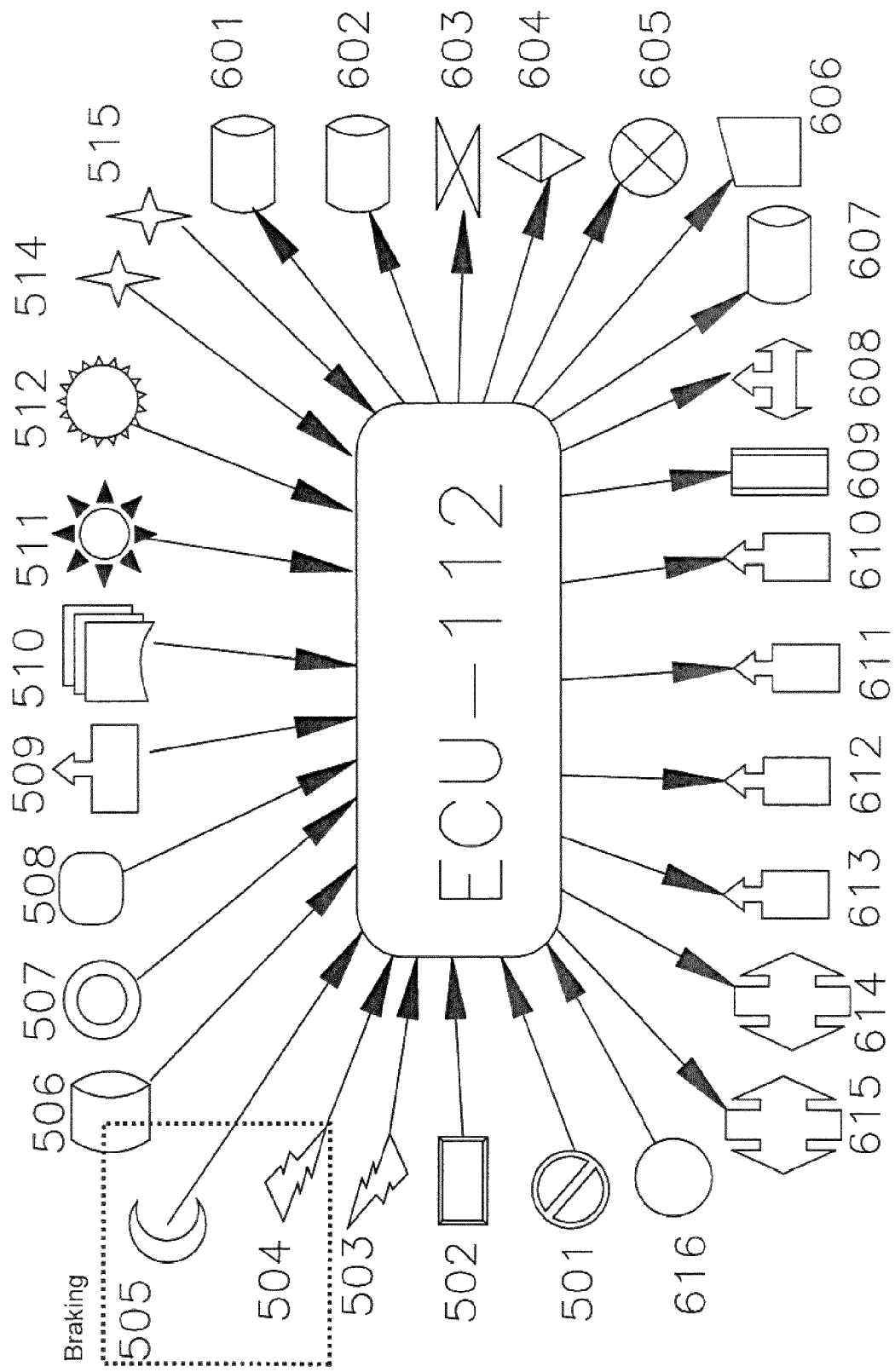
FIG. 13 is an illustration showing the control system according to embodiment 3 of the invention.

As shown in FIG. 13, the electrical control system of the invention is comprised of a sensing and controlling means 111, an electronic control unit 112, a power cell pile 115, a plug-in charging power supply 116, a smart onboard charger 117, a power controller 118, and an electrical motor/generator 119.

Among these components, the electrical motor/generator 119 means the motor that may serve as both an electrical motor and a generator, with the power being the 5-50% of the rating power of the engine. It may be a permanent magnetic DC motor with or without a brush, or an AC motor, or a motor of other types. Its magnetic path may be arranged in a radial direction, or in an axial direction, such as a disk-like hub motor, etc.; since it is in parallel to the system, its installation location is flexible. In this embodiment, it is fixedly connected to the driving gear of the first gear pair of the mechanical transmission mechanism. In a better approach for a front wheel driven car, there are two disk-like hub motors provided on the hub of the rear wheel.

The power controller 118 performs cell management and motor control. The functions of the cell management include switching between charging and discharging of the cell pile, overcharging protection, over-discharging protection, over-heating protection and over-current protection, etc. The functions of motor control include control of starting and shutdown of the motor, switching between electrical motor and generator, speed adjustment and overload protection, etc. An AC motor employs the technique of variable frequency speed regulation; A DC motor employs the technique of chopper speed regulation, or employs the simple technique of variable voltage speed regulation, that is, the driving voltage is divided into several stages of 48V, 96V, etc., via switching the connection manners (serial and parallel connections) of the cell pile, so as to dispense with complex speed regulation devices.

The plug-in charging power supply 116 may be designed for use at home or in a parking lot. The power supply for home use is nothing but a power plug, and thus very simply. Besides a power plug, the charging power supply for use in a parking lot includes an ammeter, a toll tallying device and a toll collector, wherein the toll collector may be a POS (point of sells), etc.

The power cell file 115 employs lithium cells or Ni—H power cells, which are safe and reliable, since these cells are required to have a high specific energy, a high specific power, and a long cycle life. The extent to which energy should be stored may be determined according to the price and users' requirements. For a home car that is mainly used in the urban areas, these cells are preferably relatively large; if the car is mainly used in suburb areas, they may be relatively small. A general value is between 1 and 10 KWH.

For the sensing and controlling means 111, its sensing means may perform pressure measuring, temperature measuring, velocity measuring and position measuring, etc. The existing sensors in the automobile may be sufficiently exploited. Its controller, i.e., the control and execution mechanism, includes a relay, electromagnets and miniature electrical motors, etc., as shown in FIG. 13.

Figure 14:
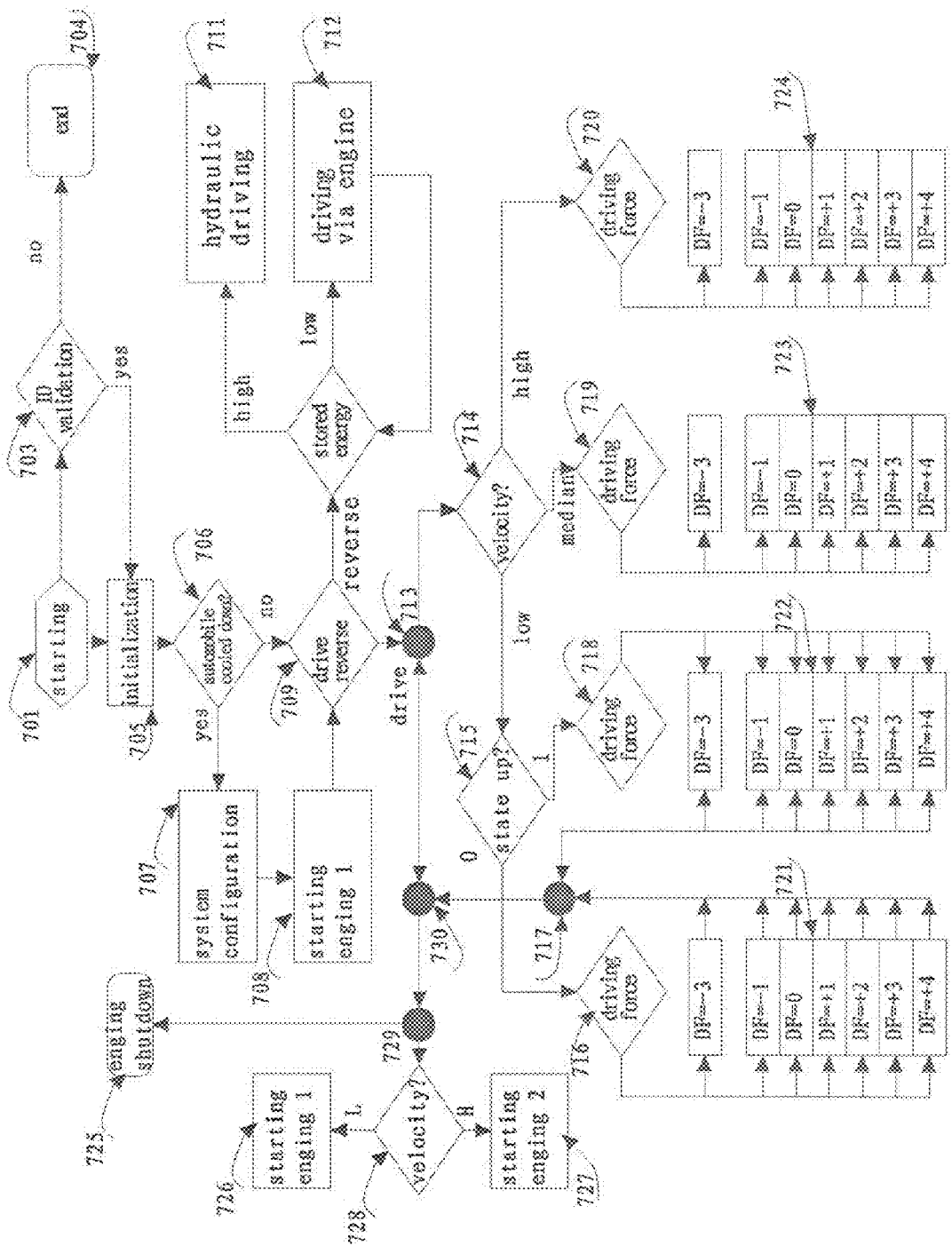
FIG. 14 is a flow chart showing the program according to embodiment 2 or 3 of the invention.

The electronic control unit 112 is comprised of a hardware portion and a software portion. The hardware portion is a PC controller with a CPU which has multiple channels for the output and input of digital and analog variables. The electronic control unit 112 controls the operations of the overall system through the sensing and controlling means 111 collecting individual variable parameters. The software is constituted by an automatic control program and is solidified into the EPROM of the PC, as shown in FIG. 14.

The input parameters to the electronic control unit include

501, an ignition switch of an automobile, generally taking four values 0-3, capable of controlling the engine start,

502, a touch control display, illustrating system operation parameters, failure parameters and input control parameters,

503, the position of the accelerator, corresponding to the degree that a driver steps on the accelerator, and taking values $DF=-1, 0, 1, 2, 3, 4$, wherein $-1$ represents that the right foot of the driver is taken away from the accelerator, 0 represents gentle stepping on the accelerator, and 4 represents stepping on the accelerator to the full,

504, the position of the hydraulic braking assisting pedal on which the left foot of the driver steps, the system calculates the displacement setting of the second variable displacement hydraulic activator according to the pressure of the hydraulic energy storage and this position,

505, a mechanical braking pedal on which the driver's right foot steps,

506, the automobile velocity,

507, the rotation speed of the engine,

508, the pressure of the hydraulic energy storage,

509, the voltage and the charge quantity of the cells,

510, the universal characteristic profile of the engine,

511, the lubricant pressure,

512, the temperature of the cooling water of the engine,

514, the displacement of the first variable displacement hydraulic activator,

515, the displacement of the second variable displacement hydraulic activator, and

516, the throttle position of the engine,

Herein, when the required driving force/braking force, that is, the DF value is to be determined from the positions of the accelerator and the accessory braking pedal, a correction value indicating the stepping speed at these positions should be additionally considered, that is, in the current position range, the DF value should be increased or reduced according to the stepping speed to manifest the true power requirement of the driver.

The universal characteristic profile of an engine, which is solidified in the EPROM, is a universal characteristic matrix specific to the engine. The CPU of the PC obtains the output torque from the matrix on the basis of the rotation speed of the engine and the open degree of the throttle so as to calculate matched displacements of the variable displacement hydraulic pumps.

The output control of the electronic control system includes

601, the electrical motor of the lubricant pump,

602, the starter motor,

603, the directional valve of the hydraulic air conditioner compressor,

604, the braking assister, 605, the directional valve of the hydraulic direction-changing assister, 606, the cell manager 118 (charger, and charging and discharging protection), 607, the driving motor controller 118 (speed regulation/electrical driving/electricity generating), 608, the electromagnetic tooth-embedded type shifting clutch, 609, the electromagnetic clutching locker 103d of the planetary gear, 610, the valve 306a for the hydraulic energy storage, 611, the directional valve 307c in the main oilway of the first variable displacement hydraulic activator, 612, the directional valve 307e in the main oilway of the first variable displacement hydraulic activator, 613, the directional valve 308c in the main oilway of the second variable displacement hydraulic activator, 614, the control directional valve 307b of the variable displacement oil tank of the first variable displacement hydraulic activator, 615, the control directional valve 308b of the variable displacement oil tank of the second variable displacement hydraulic activator, and 616, the control motor for the engine throttle.

The control software of the inventive device includes 32 program modules, and the flow block diagram is illustrated in FIG. 7. The functions of individual modules are as follows.

701, the ignition switch switching from 0 to 1 and the control system being powered to start, 702, the system starting ID input and invalidation in either a password or a fingerprint manner, 703, the system determining the validness of ID, if valid, then turning to 705, if invalid, then turning to 704, prompting to input again; the system being switched off after 3 invalid tries;

704, the system being switched off and operation being stopped, being capable of triggering a warning to signal abnormity, such as an audio alarm or a short message alarm, 705, the ignition switch switching from 1 to 2, the system being initialized and tested, individual input variable parameters being checked, 706, if the temperature of the cooling water of the engine being lower than a setting valve, then turning to 707, if higher than the setting value, then turning to 709, 707, short-circuiting the first and second variable displacement hydraulic activators, that is Vf, Vs=0; and the electric motor being switched off, Em=0, 708, starting the engine in a first starting manner, ICE on1 entering the state of warming engine, 709, the engine finishing warming, and the system prompting to input choice "drive-D" or "reverse-R", 710, if inputting choice "reverse-R", the system determining the driving mode according to the energy stored in the hydraulic energy storage, 711, if the energy stored in the hydraulic energy storage is higher than a given value, then the automobile being driven to reverse through the second variable displacement hydraulic activator/electrical motor rotating reversely, R1, 712, if the energy stored in the hydraulic energy storage is lower than a given value, then the automobile being driven to reverse by starting/incorporating the engine, R2, 713, if inputting choice "drive-D", the system transiting in combination and the process turning to 714, 714, determining the automobile velocity V which may be divided into three ranges, that is, a low velocity range, a median velocity range and a high velocity range. The division of the velocity ranges may be set according to different automobile models and different road conditions in different countries. For example, for cars, the low velocity range may be set as V=0-60 km/h, the median velocity range may be set as V=60-125 km/h, and the high velocity range may be set as V>125 km/h, 715, the low velocity range, entering a circulatory operation mode, the system setting CS into two states, 0-1, according to whether the engine participates in the driving, that is, CS=0, which indicates that the engine shuts down or is in low speed idle state, and does not participate in driving, and CS=1, which indicates that the engine operates and participates in driving, 716, the state of CS=0, the system, according to the position of the accelerator and its speed and the positions of the accessory hydraulic braking pedal and mechanical braking pedal, calculates the driving force or the braking force and chooses the driving mode or the braking mode, 717, determining whether to switch the states according to the outputs from 721 and 722, the system transiting in combination and the process proceeding to 730, 718, the state of CS=1, the system, according to the position of the accelerator and its speed and the positions of the accessory hydraulic braking pedal and mechanical braking pedal, calculates the driving force or the braking force and chooses the driving mode or the braking mode, 719, the median velocity range, the system, according to the position of the accelerator and its speed and the positions of the accessory hydraulic braking pedal and mechanical braking pedal, calculates the driving force or braking force DF, and chooses the driving mode or the braking mode, 720, the high velocity range, the system, according to the position of the accelerator and its speed and the positions of the accessory hydraulic braking pedal and mechanical braking pedal, calculates the driving force or braking force, and chooses the driving mode or the braking mode, 721, at the state of CS=0, the system operates 8 different driving or braking modes according to the driving force or the braking force; in addition, the system automatically proceeds to 717 when the energy-storing parameter of the system decreases to a level that can not match the requirement from the driving force, 722, at the state of CS=1, the system operates 8 different driving or braking modes according to the magnitude of the driving force or the braking force; in addition, the system automatically proceeds to 717 when the energy-storing parameter of the system increases beyond a given value, 723, the medial velocity range, the system operates 8 different driving modes or braking modes according to magnitude of the driving force or the braking force, 724, the high velocity range, the system operates 8 different driving or braking modes according to the magnitude of the driving force or the braking force, 725, the engine shutdown process, ICB Off, stop supplying the engine with power or fuel, 726, the engine starting process 1, that is, starting in an electrical manner, ICE on-1, starting the electrical motor to start the engine, 727, the engine starting process 2, that is, starting in a hydraulic manner, ICE on-2, starting the engine via the first variable displacement hydraulic activator, 728, determining the engine starting mode mainly according to the pressure of the hydraulic energy storage; if there is only a one-stage transmission in the mechanical transmission mechanism, the limitation from the minimal velocity Vo should be imposed when there is no neutral shift, that is, the rotation speed of the first transmission shaft at this velocity Vo should be larger than the minimal ignition rotation speed of the engine, which is generally higher than 300 rpm. If the automobile velocity V<Vo or the automobile is in a starting state, then proceeding to 726; if the automobile velocity V>Vo, then proceeding to 727. If the mechanical transmission mechanism is a multi-stage transmission with a neutral shift, then the engine may be started through a hydraulic manner if only there is energy stored in the hydraulic energy storage.

729, a module of state switching and combinational transiting 730, a module of state switching and combinational transiting 731, an emergency treatment and failure diagnosis process module, and 732, the system parameter setting module.

In different states and different velocity ranges, the power requirement DF is further divided into 8 modes, that is, DF=−3, mechanical and hydraulic combined braking state, that is, the right foot of the driver steps on the mechanical braking pedal and the left foot steps on the accessory hydraulic braking pedal; this mode is generally employed in an emergency braking situation.

DF=−2, braking with hydraulic assist, the right foot of the driver is taken away from the accelerator, the left foot steps on the accessory braking pedal; this mode is generally employed in a typical braking situation. In a traffic jam in which the automobile travels at a low velocity, it is avoided that the driver's right foot steps onto the brake repeatedly.

DF=−1, sliding at neutral, the right foot of the driver is taken away from the accelerator and the automobile maintains a motion under the effect of inertia and slows down due to natural drags such as rolling drag and wind drag.

DF=0, traveling forward at a uniform velocity, the right foot of the driver gently steps on the accelerator.

DF=+1 to +4, respectively corresponding to a state of slow acceleration or climbing up a slight slop with a gradient of 0-10% (+1), a state of median acceleration or climbing up a median slop with a gradient of 10-20% (+2), a state of quick acceleration or climbing up a large slop with a gradient of 20-30% (+3), and a state of rapid acceleration or climbing up a steep slop with a gradient larger than 30% (+4). The acceleration is set according to the type of automobiles and the velocity ranges, for example, for cars in the low velocity ranges, the accelerations corresponding to the above states are a=0-1 r/s$^2$, a=1-2 m/s$^2$, a=2-3 m/s$^2$, a>3 m/s$^2$, respectively.

The main operating mechanisms of the invention include a mechanism in high velocity road conditions and a mechanism in city road conditions, which will be explained hereinafter in combination with embodiment 2.

1 High velocity road condition. Take a complete cycle, e.g., accelerating, then traveling at a uniform velocity, and then slowing down, of the automobile at CS=1 (that is, in the case that the engine operates) as an example to explain the mechanism in this condition.

The mechanical transmission mechanism is set at low shifts during the period of automobile starting (from 0) and accelerating (from a lower velocity to a higher velocity);

Starting and accelerating. The initial velocity of the automobile is 0, the planet bracket 103*b* of the planetary gear train is stationary, and the mechanical power of the engine drives the toothed ring 103*c* of the planetary gear train to rotate positively; then the locker of the planetary gear is released, the sun gear 103*a* rotates reversely, the open degree of the engine throttle is enlarged, the first variable displacement hydraulic activator 107 is set in a pump state and is connected to the high pressure oilways, and thus it supplies the sun gear with a braking torque while outputting hydraulic energy. In this way, a positive driving torque is generated on the planet bracket 103*b* and the automobile is driven to start by the mechanical transmission mechanism 104, this is the main transmission link. Meanwhile, according to the DF value required by the acceleration set by the driver, there is incorporated an additional power of the second variable displacement hydraulic activator, and the open degree of the engine throttle, the displacements of the first and second variable displacement hydraulic activators are cooperatively adjusted. In this way, the torque output of the system may be adjusted and the automobile may be started at different accelerations. With the automobile velocity increasing, the rotation speed of the sun gear 103*a* is decreased progressively to 0; the displacement of the first variable displacement hydraulic activator is increased, and the sun gear is locked, thus the main transmission link operates to drive at the pure mechanical transmission node 1 (which is equivalent to the shifts 2-3 in the conventional transmission); with the rotation speed further increasing, the locker of the planetary gear is locked, and the main transmission link operates to drive at the pure mechanical transmission node 2 (which is equivalent to the shift 4 in conventional transmissions).

2. City road condition. The driving via mechanical and hydraulic hybrid cycle is employed in city road condition or in case of traffic jams on the high roads.

The manner of starting and accelerating is similar to that in the case of the high velocity road condition. However, in general, the automobile will travel at a uniform velocity or decelerate when just a relatively low velocity is reached, and thus the acceleration time is short. The engine is allowed to continue to operate at the minimal rotation speed (which is in an efficient range) for several minutes, during which time the excessive mechanical energy is converted into hydraulic energy to be stored while the mechanical energy is output to drive the automobile to travel forward. Then the engine shuts down, and the automobile is driven to continue to travel forward by the hydraulic motor/the electrical motor solely or jointly, wherein the electrical motor mainly meets the power that is required to travel forward at a uniform velocity, and the hydraulic system is mainly responsible for large torque need that is required by accelerating the automobile. When the energy stored in the system is not sufficient to meet the power requirements from the driver, the engine is started and the power therefrom is incorporated in an automatic manner, and thus a new hybrid cycle starts. The criterion, based on which the cycle switching is performed, is the comparison between the maximal power output and the power requirement, obtained from the energy-storing state (P, V) of the system. All these control parameters may be measured inside the system, which is different from the velocity control method employed in the prior art mechanical and electrical hybrid approach in which the switching depends on the parameters that vary randomly, such as the automobile velocity and the idle time. This leads to a relatively simple control system. The cell pile may take a plug-in mode. It is not necessary to charge the cell pile by means of the engine over a limited distance.

Deceleration. Braking and deceleration is carried out mainly through the second variable displacement hydraulic activator, and most mechanical energy is regenerated.

Management over the cell capacity has to match the operating manner of the automobile. In consideration that most passenger vehicles are used at commuting times, e.g., travel at lower speeds in local areas, then merge onto highways to travel at higher speeds, then travel off highways to advance in local areas at lower speeds, and reach the working locations or homes, then the engine is shut down and the vehicle is parked, the using manner of the cell in the invention is accordingly design in a W pattern, which is comprised of a circulatory mode with two loops, i.e., an outer loop and an inner loop. That is, automobile cell piles are charged to about SOC=90% via manner 1 at homes or at working locations during night or during working hours, then are discharged unidirectionally to a level with 20% capacity remained over the road of low speeds; successively, the cell pile is charged to about 50% via manner 2, that is, the engine drives the generator, and then are discharged to a level with 20% capacity remained, which constitutes the inner loop. The cell piles are plugged into a plug-in power supply at the destination and are charged to about 90%, thus entering a next outer loop.

Figure 15:
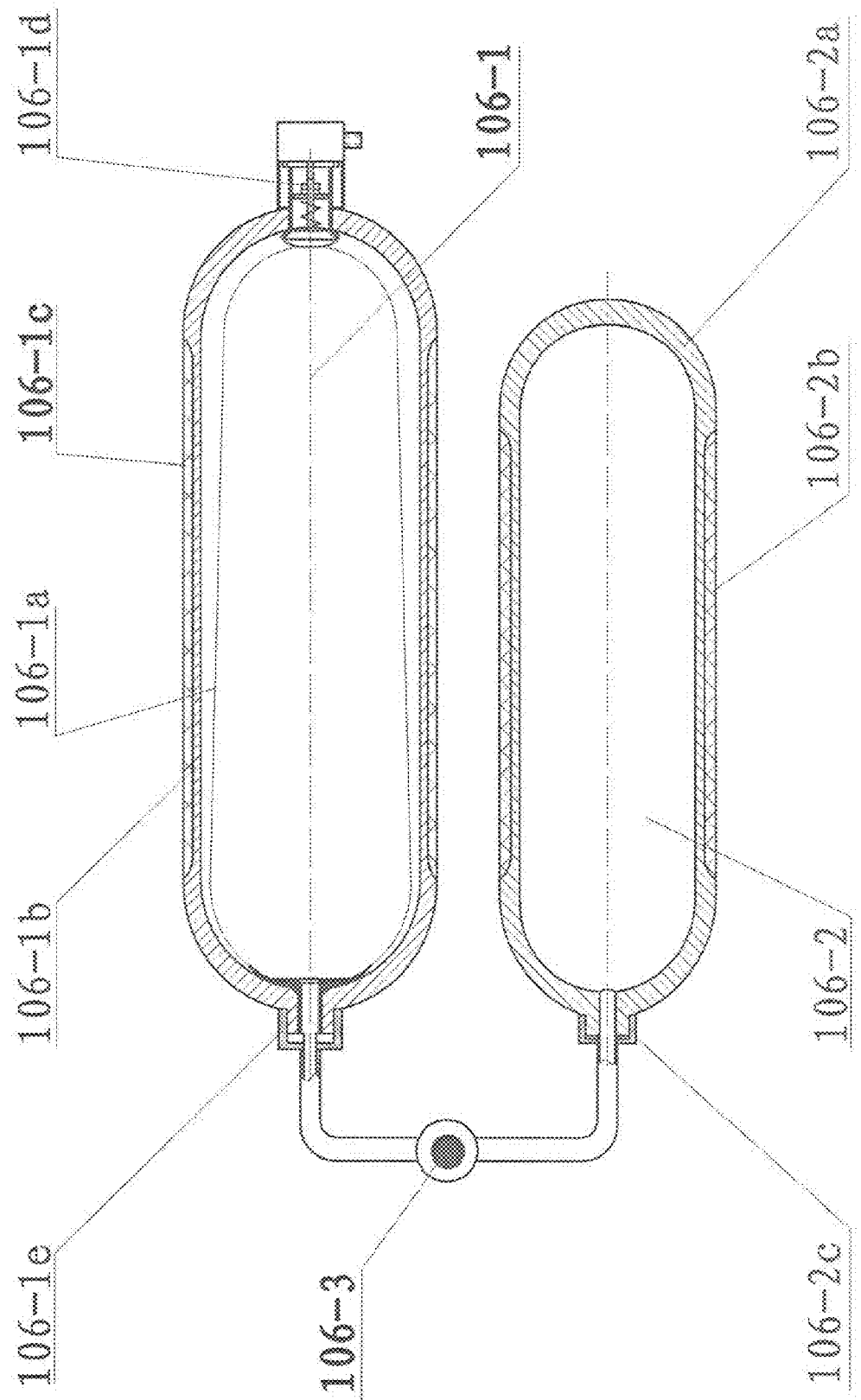
FIG. 15 is an illustration showing structures of the high pressure energy storage according to embodiment 2 or 3 of the invention.
Figure 18:
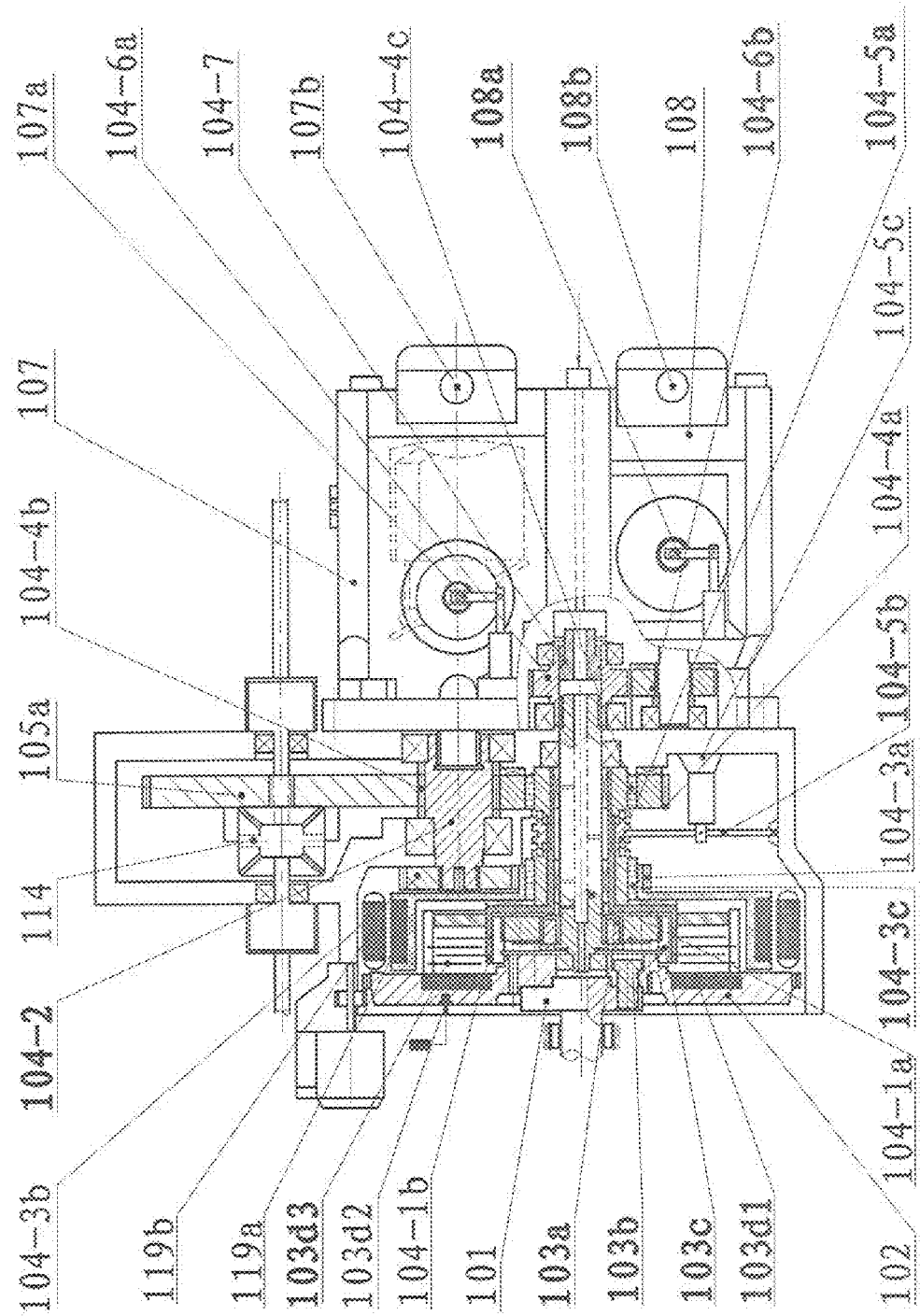
FIG. 18 is an assembly view showing the mechanical structures of the shifting mechanism with a two-stage gear train according to the invention.

For automobiles weighting heavily themselves, the hydraulic energy storage 106 in the embodiments of the invention may be a high pressure energy storage made of alloy steel; and for cars, it must be a higher pressure energy storage made of composite materials, e.g., the core is made of alloy steel or alloy aluminum and is wrapped with fiberglass or carbon fiber of high strength on the outside, thus resulting in a structure with less weight and higher strength. For further improving the energy-storing efficiency of the hydraulic energy storage and enhancing the flexibility in its installation, the invention proposes a split structure. As shown in FIG. 15, it is comprised of two high pressure tanks 106-1 and 106-2 with different dimension. The larger tank 106-1 is provided with an airbag 106-1*a* therein, and the joint thereof is threadly coupled to the high pressure gas pipe 106-3. Its core 106-1*b* is made of alloy steel or alloy aluminum, with the outer layer being wrapped with composite materials of high strength, such as fiberglass or carbon fiber. The right end of the tank is installed with a butterfly valve 106-1*d* to be connected to the high pressure oilway. The smaller tank 106-2 is just a high pressure gas tank with the core 106-2*a* made of alloy aluminum and the outer layer wrapped with composite materials of high strength, such as fiberglass or carbon fiber. The opening at its left end is connected to the high pressure gas pipe 106-3 so as to be connected to the airbag end 106-1*e* of the larger tank. This structure makes it possible for high pressure gas to directly heat-exchange with the smaller tank during its compression and expansion process, reduces the variation range of the temperature of the gas, and improves the energy-storing effect. Furthermore, for the situation with the same volume, the individual dimension is decreased, thus improving the installation flexibility.

The low pressure oil tank 110 in the invention may assume the structure of a typical energy storage when employed in large scale automobiles. Its wall thickness may be very small. However, its volume is relatively large. In small scale automobiles, the invention specially designs a low pressure oil tank in an automobile tire form to solve the problem that the very limited space makes the installation thereof difficult. As shown in FIGS. 16 and 17, this oil tank is comprised of a flat-bottomed bowl like upper and lower cover 110-1 and 110-2 which have openings at the center and are formed through punching, a middle separation ring 110-5 with both ends thereof being bell-mouthed, a low pressure airbag 110-4, a butterfly valve 110-3, an inflating valve 110-6 and a central cylinder 110-7, wherein the low pressure airbag is mounted in the closed space formed by the middle separation ring and the flat-bottomed bowl like covers 110, the airbag penetrates through a small hole in the middle separation ring so as to communicate with the closed cavity in the inner side via the gas pipe 110-8, the inflating valve is installed in the inner side of the central cylinder such that it can be used for inflation. The manufacture process of this low pressure oil tank is as follows. The middle separation ring is first welded to lower cover with the butterfly valve at the bell mouth shown in the figures; then the airbag is mounted in place, the gas therein are crushed out, and the airbag is located close to the lower cover; the lower cover is filled with cooling oil to its ⅔ volume or so, the upper cover is assembled, and the upper and lower cover are welded to each other; then the bell mouth of the middle separation ring and the connection part of the upper cover are welded; and finally the central cylinder installed with the inflating valve is welded after it is checked that no gas leaks out of the airbag and that gases in the inner and outer closed space do not blend with each other. The wall thickness of the oil tank is determined according to the diameter of the oil tank and the highest inflating pressure, e.g., between 1 and 4 mm. The low pressure oil tank in a tire form could be placed in the space which is originally reserved for tires in that the automobile does not necessarily carry the backup tires during everyday usage so as to save space.

The calculations below make use of parameters of a typical home-use automobile with a median displacement. Thus assumed parameters and the resultant calculations are only for reference. They do not constitute any limitations on the invention in any way.

The kerb mass of the automobile is 1200 kg, and its gross mass is 1500 kg; the maximal velocity is 180 km/h; the average fuel consumption is 8-9 L/100 km; the engine is a four-cylinder petroline engine, with a displacement of 1.6 L, the maximal power of 70 kw (at 6000 rpm) and the maximal torque of 150 nm (at 4000 rpm). The lowest specific fuel consumption is 260 g/kwh.

The input-output speed ratio of the selected planetary gear train is 1.5 (speed reduction) when the sun gear is stationary. The shifting ratios of the two-stage mechanical transmission are 1 and 0.5, respectively. Thus, the speed ratios of the main transmission link of the overall system at four nodes are 1.5, 1.0, 0.75 and 0.5, respectively. The speed ratios of the automatic transmission which is originally equipped with the automobile are 2.71, 1.44, 1.0, and 0.74, respectively. Comparisons therebetween show that the system is provided with a transmission shift of a large speed increasing ratio.

The first and second variable displacement hydraulic activators chosen in this embodiment are duplex bidirectional hydraulic pumps/motors of a swash plate type, both of which carry out variable displacement adjustments, and mode and direction switching through the trunnion driving the swash plates to swing bidirectionally. The first variable displacement hydraulic activator has a maximal displacement of 28 ml/r, a rating pressure of 31.5 Mpa, a maximal pressure of 35 Mpa and a maximal rotation speed of 5500 rmp. The second variable displacement hydraulic activator has a maximal displacement of 56 ml/r, a rating pressure of 31.5 Mpa, a maximal pressure of 35 Mpa and a maximal rotation speed of 5000 rmp. The first and second variable displacement hydraulic activators share a casing for the purpose of saving space.

The chosen hydraulic energy storage has a volume of 50 L, a diameter of 300 mm, a length of 800 mm, a pre-inflating pressure of 10-15 Mpa, and a maximal working pressure of 30 Mpa. Its maximal energy storage capacity is 500 Kj. The low pressure oil tank is of a tire type, with a diameter of 580 mm, a volume of 45 L and a maximal working pressure of 1 Mpa. The hydraulic energy storage and the low pressure oil tank are both placed in the trunk.

The chosen Li cell pile has a weight of 35 kg, a specific energy of 150 wh/kg, and a capacity of 50 Ah, 66-110V and 5.25 Kwh. The specific discharging power of the cell pile is 30 w/kg, with the discharging power being 10.5 Kw; its specific charging power is 150 w/kg, with the charging power being 5 Kw.

The chosen motor has a rating power of 8 Kw, a rating rotation speed of 3000 rmp, a rating torque of 25.5 NM, and a maximal staring torque of 65 NM.

With the above components and configuration parameters, the driving torque and efficiency in main operation conditions may be derived as follows.

As stated, at different speed ratios, the transmission torque of the main transmission link is 225 NM, 150 NM, 100 NM and 75 NM, respectively. The minimal (at 10 MPa) and maximal (at 35 Mpa) torques of the first variable displacement hydraulic activator at the maximal displacement are respectively 44.6 NM and 156 NM; the minimal and maximal torques of the first variable displacement hydraulic activator at the maximal displacement are respectively 89.2 NM and 312 NM. It can be noted that the maximal obtainable torque is 537 NM when the automobile is traveling at low speed and the engine is operating. This driving torque may be arbitrary in that the engine throttle and the displacements of the hydraulic activators are both variable, such that smooth and strong driving is realized. During the period when the engine shuts down, the hydraulic and electrical hybrid driving manner is employed. At this time, the minimal torque of the system is the minimal torque of the first variable displacement hydraulic activator, after being magnified by the planetary gear train by three times and the minimal torque of the second variable displacement hydraulic activator, which amounts to 223 NM, plus a torque of 30-50 NM from the electrical motor, giving 253-273 NM in total. This is equivalent to the starting acceleration ability at the shift 2 of the original automobile.

The transmission efficiency of the system is as follows.

In low velocity ranges, the power that is directly transmitted by the planetary gear train via the main transmission link accounts for 50% of the overall power, and the remaining 50% is transmitted via the hydraulic system. Under the assumption that the transmission efficiency of the main transmission link is 96%, the average efficiency of the hydraulic activator is 86%, and the efficiency of the hydraulic loop is 96%, it can be derived that the efficiency of the hydraulic link is 71% and the overall efficiency of the system is 0.5×74%+0.5×96%=83.5%. If a hydraulic activator of a high efficiency (>90%) is employed, then the transmission efficiency may be greater than 88%. If, at low velocity ranges, the efficiency of the engine with 80% of load is 28%, then the overall efficiency of the system is 23.8%, which is about one time higher than the average efficiency (12.6%) of current automobiles.

The derivation below is carried out for a circulatory driving mode. In the situation that an automobile with a mass of 1500 kg travels in the velocity interval of 1-60 km/h, with an average velocity of 26 km/h, its power loss is the sum of the loss due to the rolling drag over a 1 km distance, which is 1500 kg×0.12×1000 m=180 kj, and the loss due to the wind drag, which is about 40 kj, thus amounting to 220 kj in total. The reduction in kinetic energy once the automobile is decelerated from 54 km/h to 0 is ½×1500×15×15=168 kj. If the regeneration ratio of the hydraulic system is 60%, then the loss is 40% of the reduction, that is, 67.2 kj. Under the assumption that, in average, the automobile is braked twice over each 1 km distance, the total loss is 134.4 kj. Thus, the energy that the automobile consumes during traveling over 1 km is 220+134.4=354.4 kj. If no energy is regenerated, then the energy consumption is 556 kj.

In the mechanical hydraulic hybrid circulatory manner at low velocity ranges, the engine with a displacement of 1.6 L operates at the low rotation speed region of a high efficiency in which the rotation speed is 1200-1500 rpm. The output power is 10-15 kw at 80% of the throttle. When the automobile is starting during which period its velocity is increased from 0 to 15 Km/h, the percentage of the energy transmitted via the hydraulic system is decreased from 100% to 0%; during the period when the automobile is accelerated from 15 to 60 Km/h, most energy is transmitted via the main transmission link, and the energy stored by the hydraulic system accounts for less than 20%; and when the automobile is traveling at a constant velocity, 30% (3-5 kw) of the engine power is used to drive the automobile to advance forward, 70% (7-10 kw) of it is transferred to hydraulic energy. It takes about one minute for the hydraulic energy storage (with a working volume 50 L and a maximal working pressure of 30 MPa) to store 400-450 kj energy, by which time the engines shut down and the electrical and hydraulic combined driving manner is employed.

The total energy supplied to the electrical system is 5.25 kwh=18.9 Mj. Its operating interval is assumed to be 20-90% of its capacity, thus the operating capacity is 13.2 Mj. In consideration of the overall efficiency, which is 78%, of the electrical motor (88%), the driver (98%) and the cell discharging (90%), the effective electrical energy is 10.3 Mj and thus the automobile may travel over 30 Km at low speeds under the sole driving of this electrical power.

In this mode, the acceleration and deceleration of the automobile is mainly realized via the hydraulic system, and the electrical power is used to maintain traveling at a constant velocity. Therefore, in the situation that the stored electrical power is sufficient, the cycle of the circulatory driving system is mainly determined by the hydraulic system. Every time the automobile is decelerated from 45 km/h to 0, the energy loss is 67.2 Kj. If, during the restarting and accelerating process, the energy provided by the hydraulic system accounts for 70% (i.e., 47 kj) and the electrical system provides 30%, then introduction of 450 kj energy into the hydraulic energy storage makes it possible to successively carry out acceleration (from 0 to 54 km/h) and deceleration (from 54 km/h to 0) 8 times. If acceleration or deceleration will occur twice per one kilometer, then the automobile may continuously travel 4 km or so till the engine should be started to store the energy. During this cycle, the effective loss of electrical energy is 354.4×4-470=947 Kj. Thus the energy stored in the cell pile may perform such a cycle about 10 times. The overall mileage is 45 Km, including the distance over which the engine is employed for driving; and the total energy consumed is 16 Mj. In this cycle, the engine operates (at high efficiency) only in 20-30% of time, and releases 6 Mj energy. If the efficiency of the engine is 28%, then its fuel consumption is 0.65 L.

If the electrical energy stored in the cell pile decreases to 20% of the rating capacity, the engine has to be started to charge the cell pile. The energy required for each charging is about 6 Mj. If the charging power is 5 Kw, then charging will take at least 20 minutes. The automobile may complete the inner loop 3-4 times after charging. In general, traffic rush hour will last 1-2 hours in large cities, and the distance traveled over this period is typically within 20-50 km, which is only within 1-2 outer loops.

For the mechanical and electrical hybrid circulatory driving manner employing a plug-in method for charging, the overall energy consumption per one hundred kilometers is decreased to 3 L fuel plus 4 Kwh electrical energy for a single trip within one hundred kilometers in city road conditions.

In this mode, the engine does not operate in a relative long time. It is necessary to maintain the temperature of the three-way catalyst such that it has a high catalytic efficiency when the engine is restarted, in this way to lower emission. The invention proposes a dynamic attemperator closure for use in cold seasons or in chilly areas. It is opened when the engine operates, and closed when the engine shuts down so as to maintain the temperature of the three-way catalyst. When the automobile velocity is relatively high, the circulatory mode in which the engine is started and then becomes idle should be employed insofar as possible so as to reduce the times of starting and shutting down. Even though the fuel consumption of the engine in an idle state is relatively low, the balance should be taken between energy-saving, environment-protecting considerations and the service life of the engine.

In median and high velocity ranges, the energy transmitted via the hydraulic link accounts for 0-20%, and 80%-100% energy is transmitted via the main transmission link. If the efficiency indices of the above components remain unchanged, the overall efficiency of the system composed of the two links is higher than 20%×74%+80%×96%=91.6%, with the highest efficiency being 96%, that is, the transmission efficiency of the two-stage gear train. It can be noted that the transmission efficiency of the device is per se higher than that of the automatic transmission, and the efficiency of the engine is significantly improved. Therefore, the efficiency of the overall automobile is increased.

It can be seen from the above analyses that the hydraulic activator of a high power serves to equivalently provide the automobile with an additional large power source. In this way, the automobile is supplied with more strong torques and larger power storage in all ranges from low velocities to high velocities than in the case of the current configurations. Therefore, the most challenging contradiction between the automobile dynamics and its economy that prevails in the design of the automobile power system is alleviated.

The mechanical and hydraulic CVT of the invention may also cooperate with electrical driving of various manners so as to generate strong mechanical and electrical hybrid driving. In this case, electrical driving and the mechanical and hydraulic hybrid continuously variable driving are combined in parallel, and the power of the electrical motor, which is higher than 10-20 kw (at 1500 rpm), is relatively higher than that in case of mechanical, hydraulic and electrical hybrid driving, thus specially requiring large torques at low speeds. The cells with high specific power, such as Ni—H cells and Li cells, should be employed for the cell pile so as to meet the power requirements in the situation of sole electrical driving. If the hub motor is mounted on the rear driving wheels, then the mechanical electrical hybrid driving mode will be employed in situations that the automobile travels at low speeds in city road conditions. When the cell pile is fully charged, the engine will shut down and the automobile is solely driven by the electrical motor to travel forward. When the automobile is braking, the electrical motor is switched to the generator, thus the kinetic energy of the automobile is transferred to electrical energy and is regenerated by the cell pile. When the capacity of the cell pile is not full, the engine is started, and the electrical motor converts to a generator under the driving of the rear wheels. The load of the engine is increased, and part of mechanical energy is converted to electrical energy to be stored in the storage cell. When the automobile is to be reversed, the electrical motor will reversely rotate and the automobile is directly driven to reverse. If the automobile is mainly used in city road condition, then cells with large capacity should be adopted. If it operates mainly in median and high velocity ranges, the cells with small capacity may be employed. The system conducts speed-increasing transmission with a large speed ratio. When the automobile accelerates in a short period, the electrical motor participates in driving and provides additional power. In this way the power requirement of the engine is decreased, the efficiency of the engine is improved, and the purpose of energy-saving is fulfilled.

When the device has its cell pile charged via mains in situations that a charging device is provided at a parking lot, a better energy-saving effect and a better environment-protecting effect will be achieved.

In order to better explain the feasibility and installability of the device of the invention, the mechanical structure of the CVT with a two-stage gear transmission mechanism is embodied in a front-wheel driven automobile with an engine arranged horizontally. Thus designed assembled view is referred to FIG. 18.

The power output shaft of the internal engine 101 is fixedly connected to the flying wheel 102 via thread. The engagement between the starting motor gear and the staring toothed ring of the flying wheel is a releasable connection. The toothed ring 103c of the planetary gear train 103 is fixedly connected to the flying wheel 102; the sun gear 103a is fixed to the first transmission shaft 104-1a of the mechanical transmission mechanism 104 via splines, and the both ends of the transmission shaft are supported via centripetal tapered roller push bearings onto the engine crankshaft hole and the casing, respectively. The planet bracket 103b is fixedly connected to the transmission sleeve 104-1b; the transmission sleeve is supported onto the first transmission shaft via a needle bearing. The locker 103d of the planetary gear is a wet electromagnetic clutch, consisting of an electromagnet 103d1, an iron yoke, an inner ring, an inner ring friction pad, an outer ring and an out ring friction pad 103d3, an electrical contact ring and a control electrode 103d2; wherein the inner ring is fixedly connected to the planet bracket 103b, the outer ring is fixedly connected to the flying wheel 102 and thus to the toothed ring 103c of the planetary gear, the electromagnet is partially embedded into the flying wheel plate, and the electrical contact ring thereof is in a sliding connection with the control electrode. When the electromagnet is energized to engage, the locker will be locked. On the outer end of the locker is the rotor 119a of the brushless DC motor/generator 119, and the stator 119b which is fixed to the casing of the transmission. The brushless DC motor may be a disk type motor either with an axial or with a radial magnetic circuit.

The driving gears 104-3a and 104-4a of the two-stage shifting gear pair of the mechanical transmission mechanism are over-sleeved onto the transmission 104-1b via the over-running clutch 104-3c and 104-4c, respectively; and its driven gears 104-3b and 104-4b are fixedly connected to the second shaft 104-2. The overrunning clutches 104-3c and 104-4c and are both wedge-like, each consisting of an inner ring, an outer ring, a wedge and a holder, wherein the outer ring and the inner hole of the gear are two-in-one so as to simplify structure and reduce its radial dimension. The ends of the two overrunning clutches where the inner ring opposes to each other are provided with axial teeth. Between the two overrunning clutches is arranged with a tooth embedded clutch ring 104-5a capable of sliding in the axial direction which is circumferentially fixedly connected to the transmission sleeve 104-1b. This ring may move to the left or to the right under the actions of the manipulating stick 104-5b which is under electromagnetic control, thus it accordingly meshes with the teeth on the inner rings of the overrunning clutches 104-3c and 104-4c via the axial teeth provided on the both ends of this ring. When this ring is located in the middle, the shifting is at neutral and the first and second transmission shaft are completely decoupled. In order to suppress the impact which may occur during engagement, a synchronous friction cone may be provided between the sliding sleeve 104-5a and the inner rings of the overrunning clutches, this being inspired by the principle of the synchronizer of the prior art manual transmission.

The right end of the first transmission shaft 104-1a is fixedly connected to the gear pair 104-6a and 104-6b; and the gear 104-6b is fixed onto the power shaft of the first variable displacement hydraulic activator 107. The first transmission shaft 104-1a is provided with an axial oilway and a radial oilway at the center thereof. Lubricant is introduced via the rotary tap 14-7 on its right side; and lubricant thus introduced is supplied to various bearings, the planetary gear train and its locker, and the transmission gears via the radial oilway so as to function lubrication. The power shaft of the second variable displacement hydraulic activator 108 is fixedly connected to the second transmission shaft 104-2 via splines. In this way, the second transmission shaft 104-2 also participates in power synthesis. The transmission gear 104-4b simultaneously engages the gear 105a of the main reducer to drive the driving mechanism 114 of the automobile. The variable displacement mechanism of the first variable displacement hydraulic activator 107 is controlled by the oil tank 107a, and the variable displacement mechanism of the second variable displacement hydraulic activator 108 is controlled by the oil tank 108a. The high pressure oil ports 107b and 108b of the first and second hydraulic activator communicate with the high pressure oilways.

CALLOUT LIST OF ELEMENTS

For FIG. 8 and FIG. 14
701 starting
705 initialization
708 staring engine
709 engine in operation?
709 drive/reverse
740 reverse
715 start up
714 velocity
716 718 719 720 driving force
703 ID validation
704 end
725 engine shutdown
708 726 starting engine 1
727 starting engine 2
728 velocity
706 automobile cooled down?
707 system configuration
710 stored energy
高high
低low
711 hydraulic driving
712 driving via engine
715 state ?
714 velocity ?

The invention claimed is:

1. A power device for motor vehicles, comprising:
a planetary gear mechanism, which has an input side, an output side and a control terminal, wherein the input side is connected to an output shaft of the motor vehicle's engine, and the output side is connected to a power output shaft of the power device for motor vehicles via a mechanical transmission mechanism;
a first variable displacement hydraulic actuator, which is connected to the control terminal of the planetary gear mechanism and is connected to an oil tank via hydraulic lines;
a second variable displacement hydraulic actuator, a rotation shaft of which is connected to the power output shaft of the power device for motor vehicles, and which performs power input or output via the power output shaft and is connected to the first variable displacement hydraulic actuator and the oil tank via hydraulic lines, respectively;
an electronic control device, which collects operation parameters of the motor vehicle and control parameters over the motor vehicle, and output control signals according to these parameters; the first and second variable displacement hydraulic actuators carry out variable displacement adjustments in response to the control signals from the electronic control device;
a hydraulic control device, which is arranged on the hydraulic lines and controls the operating states of the first and second variable displacement hydraulic actuators in response to the control signals from the electronic control device,
wherein the mechanical transmission mechanism comprises a parallel two or more stage shifting gear pairs; between the two or more stage shifting gear pairs and the output side of the planetary gear mechanism is respectively provided with an overrunning clutch; and between the parallel two or more stage shifting gear pairs is respectively provided with a second clutching device; the overrunning clutch and the second clutching device adjust the transmission ratios of the mechanical transmission mechanism through clutching action, respectively.

2. The power device for motor vehicles of claim 1, wherein the single row planetary gear mechanism comprises a sun gear, a planetary gear and planet carrier, and a ring gear, wherein the sun gear is the control terminal.

3. The power device for motor vehicles of claim 1, wherein the planetary gear mechanism comprises two rows of planetary gear mechanisms in serial.

4. A power device for motor vehicles, comprising:
a planetary gear mechanism, which has an input side, an output side and a control terminal, wherein the input side is connected to an output shaft of the motor vehicle's engine, and the output side is connected to a power output shaft of the power device for motor vehicles via a mechanical transmission mechanism;
a first variable displacement hydraulic actuator, which is connected to the control terminal of the planetary gear mechanism and is connected to an oil tank via hydraulic lines;
a second variable displacement hydraulic actuator, a rotation shaft of which is connected to the power output shaft of the power device for motor vehicles, and which performs power input or output via the power output shaft and is connected to the first variable displacement hydraulic actuator and the oil tank via hydraulic lines, respectively;
an electronic control device, which collects operation parameters of the motor vehicle and control parameters over the motor vehicle, and output control signals according to these parameters; the first and second variable displacement hydraulic actuators carry out variable displacement adjustments in response to the control signals from the electronic control device;
a hydraulic control device, which is arranged on the hydraulic lines and controls the operating states of the first and second variable displacement hydraulic actuators in response to the control signals from the electronic control device,
wherein the hydraulic control device has a first electromagnetic directional valve connected to a high pressure oil port of the first variable displacement hydraulic actuator and a second electromagnetic directional valve connected to a high pressure oil port of the second variable displacement hydraulic actuator; the first electromagnetic directional valve communicates the high pressure oil port of the first variable displacement hydraulic actuator with hydraulic lines which are directly connected to the oil tank or with hydraulic lines which are connected to the second electromagnetic directional valve in response to the control signals from the electronic control device; the second electromagnetic directional valve communicates the high pressure oil port of the second variable displacement hydraulic actuator with hydraulic lines which are directly connected to the oil tank or with hydraulic lines which are connected to the first electromagnetic directional valve in response to the control signals from the electronic control device, wherein the high pressure oil ports of the first variable displacement hydraulic actuator and the second variable displacement hydraulic actuator are connected to the oil tank via hydraulic lines and a relief valve, low pressure oil ports of the first variable displacement hydraulic actuator and the second variable displacement hydraulic actuator are connected via hydraulic lines and are connected to the oil tank via a heat sink, wherein oil relief ports of the first and second variable displacement hydraulic actuators are each connected to the oil tank via a filter.

5. A power device for motor vehicles, comprising:

a planetary gear mechanism, which has an input side, an output side and a control terminal, wherein the input side is connected to an output shaft of the motor vehicle's engine, and the output side is connected to a power output shaft of the power device for motor vehicles via a mechanical transmission mechanism;

a first variable displacement hydraulic actuator, which is connected to the control terminal of the planetary gear mechanism and is connected to an oil tank via hydraulic lines;

a second variable displacement hydraulic actuator, a rotation shaft of which is connected to the power output shaft of the power device for motor vehicles, and which performs power input or output via the power output shaft and is connected to the first variable displacement hydraulic actuator and the oil tank via hydraulic lines, respectively;

an electronic control device, which collects operation parameters of the motor vehicle and control parameters over the motor vehicle, and output control signals according to these parameters; the first and second variable displacement hydraulic actuators carry out variable displacement adjustments in response to the control signals from the electronic control device;

a hydraulic control device, which is arranged on the hydraulic lines and controls the operating states of the first and second variable displacement hydraulic actuators in response to the control signals from the electronic control device, wherein the first variable displacement hydraulic actuator and the second variable displacement hydraulic actuator are connected to a hydraulic energy storage via said hydraulic control device; the hydraulic energy storage can not only absorb and store hydraulic energy output from the first variable displacement hydraulic actuator and/or the second variable displacement hydraulic actuator; but also output hydraulic energy to the first variable displacement hydraulic actuator and/or the second variable displacement hydraulic actuator;

wherein the power device for motor vehicles further comprises a hydraulic power assisted steering device, a hydraulic power assisted braking device and a hydraulic motor driven air conditioner, wherein a high pressure oil input of the hydraulic power assisted steering device is connected to the hydraulic energy storage.

6. A power device for motor vehicles, comprising:

a planetary gear mechanism, which has an input side, an output side and a control terminal, wherein the input side is connected to an output shaft of the motor vehicle's engine, and the output side is connected to a power output shaft of the power device for motor vehicles via a mechanical transmission mechanism;

a first variable displacement hydraulic actuator, which is connected to the control terminal of the planetary gear mechanism and is connected to an oil tank via hydraulic lines;

a second variable displacement hydraulic actuator, a rotation shaft of which is connected to the power output shaft of the power device for motor vehicles, and which performs power input or output via the power output shaft and is connected to the first variable displacement hydraulic actuator and the oil tank via hydraulic lines, respectively;

an electronic control device, which collects operation parameters of the motor vehicle and control parameters over the motor vehicle, and output control signals according to these parameters; the first and second variable displacement hydraulic actuators carry out variable displacement adjustments in response to the control signals from the electronic control device;

a hydraulic control device, which is arranged on the hydraulic lines and controls the operating states of the first and second variable displacement hydraulic actuators in response to the control signals from the electronic control device, wherein the electronic control device is connected to a position sensor which measures a position parameter of an ignition switch of the motor vehicle, a position sensor which measures a position parameter of the accelerator pedal, a position sensor which measures the position parameter of a mechanical braking pedal, displacement sensors which measure displacement parameters of the first and second variable displacement hydraulic actuators, a pressure sensor which measures a pressure of lubricant, a temperature sensor which measures temperature of cooling water in the engine, an automobile velocity sensor which measures a parameter of the motor vehicle velocity and an engine rotation speed sensor which measures a parameter of the engine rotation speed; a universal characteristic profile of the engine is stored in the electronic control device.

7. A power device for motor vehicles, comprising:

a planetary gear mechanism, which has an input side, an output side and a control terminal, wherein the input side is connected to an output shaft of the motor vehicle's engine, and the output side is connected to a power output shaft of the power device for motor vehicles via a mechanical transmission mechanism;

a first variable displacement hydraulic actuator, which is connected to the control terminal of the planetary gear mechanism and is connected to an oil tank via hydraulic lines;

a second variable displacement hydraulic actuator, a rotation shaft of which is connected to the power output shaft of the power device for motor vehicles, and which performs power input or output via the power output shaft and is connected to the first variable displacement hydraulic actuator and the oil tank via hydraulic lines, respectively;

an electronic control device, which collects operation parameters of the motor vehicle and control parameters over the motor vehicle, and output control signals according to these parameters; the first and second variable displacement hydraulic actuators carry out variable displacement adjustments in response to the control signals from the electronic control device;

a hydraulic control device, which is arranged on the hydraulic lines and controls the operating states of the first and second variable displacement hydraulic actuators in response to the control signals from the electronic control device; and an electric motor/generator which is connected to the planetary gear mechanism in the power device for motor vehicles, the electric motor/generator being connected to a chargeable battery cell via a motor/generator controller; the chargeable battery cell is connected to an onboard cell manager; and the motor controller and the onboard battery cell manager control the motor/generator and the chargeable battery cell, respectively, in response to the control signals from the electronic control device.

8. The power device for motor vehicles of claim 7, wherein the electronic control device can carry out the following controls, whereby when the engine outputs power, a portion of mechanical energy from the engine is converted into electric energy via the electric motor/generator to be stored in the chargeable battery cell; when the power requirement from the motor vehicle increases, the electric motor/generator is controlled via the electric motor/generator controller to convert battery cell's electric energy into mechanical power, in this way to assist the engine to drive the motor vehicle to travel; or alternatively, during a stop and go period let the engine stop outputting power, the electric motor/generator is controlled to output mechanical power to drive the motor vehicle to travel.

9. A power device for motor vehicles, comprising:

a planetary gear mechanism, which has an input side, an output side and a control terminal, wherein the input side is connected to an output shaft of the motor vehicle's engine, and the output side is connected to a power output shaft of the power device for motor vehicles via a mechanical transmission mechanism;

a first variable displacement hydraulic actuator, which is connected to the control terminal of the planetary gear mechanism and is connected to an oil tank via hydraulic lines;

a second variable displacement hydraulic actuator, a rotation shaft of which is connected to the power output shaft of the power device for motor vehicles, and which performs power input or output via the power output shaft and is connected to the first variable displacement hydraulic actuator and the oil tank via hydraulic lines, respectively;

an electronic control device, which collects operation parameters of the motor vehicle and control parameters over the motor vehicle, and output control signals according to these parameters; the first and second variable displacement hydraulic actuators carry out variable displacement adjustments in response to the control signals from the electronic control device;

a hydraulic control device, which is arranged on the hydraulic lines and controls the operating states of the first and second variable displacement hydraulic actuators in response to the control signals from the electronic control device;

wherein the hydraulic control device comprises of a first electromagnetic directional valve connected to a high pressure oil port of the first variable displacement hydraulic actuator and a second electromagnetic directional valve connected to a high pressure oil port of the second variable displacement hydraulic actuator; the first electromagnetic directional valve communicates the high pressure oil port of the first variable displacement hydraulic actuator with hydraulic lines which are directly connected to the oil tank or with hydraulic lines which are connected to the second electromagnetic directional valve in response to the control signals from the electronic control device; the second electromagnetic directional valve communicates the high pressure oil port of the second variable displacement hydraulic actuator with hydraulic lines which are directly connected to the oil tank or with hydraulic lines which are connected to the first electromagnetic directional valve in response to the control signals from the electronic control device, wherein the electronic control device can carry out the following controls, that is, when the motor vehicle is started and accelerated and an accelerator pedal is stepped on, the electronic control device controls the first electromagnetic directional valve and the second electromagnetic directional valve to communicate the hydraulic lines of the first and second hydraulic actuators, and cooperatively adjusts an engine throttle; the electronic control device obtains a value of the engine output torque from a universal characteristic profile of the engine according to the opening degree of the throttle and the rotation speed of the engine, calculates a torque of a sun gear according to torque relationship equations for the planetary gear mechanism, calculates a displacement value of the first hydraulic actuator under a rating pressure; the electronic control device outputs signals to control the variable displacement mechanism of the first hydraulic actuator, and the first variable displacement hydraulic actuator outputs pressurized oil accordingly, the rotation shaft of the second variable displacement hydraulic actuator is driven to rotate and output torque, the output of the rotation shaft amounts to the sum of a driving torque of the planetary gear mechanism and the torque output from a hydraulic motor; the motor vehicle is accelerated, and the displacement of the second hydraulic actuator is automatically controlled by the pressure at the high pressure oil port, that is, its displacement increases if the pressure increases and decreases if the pressure decreases, and when the pressure is 0, the displacement is 0, wherein when the motor vehicle velocity reaches a predetermined value, the hydraulic control device performs the following controls, that is, the second electromagnetic directional valve is controlled such that the second variable displacement hydraulic actuator is directly connected to the oil tank and thus the connection to the first variable displacement hydraulic actuator is disconnected, in this way, the first variable displacement hydraulic actuator is braked, and the control terminal of the planetary gear mechanism is locked and the planetary gear mechanism performs transmission at a fixed speed ratio; or the hydraulic control device controls the clutching device in the planetary gear mechanism such that the planetary gear mechanism performs transmission as a rigid body.

* * * * *